Figure 1:
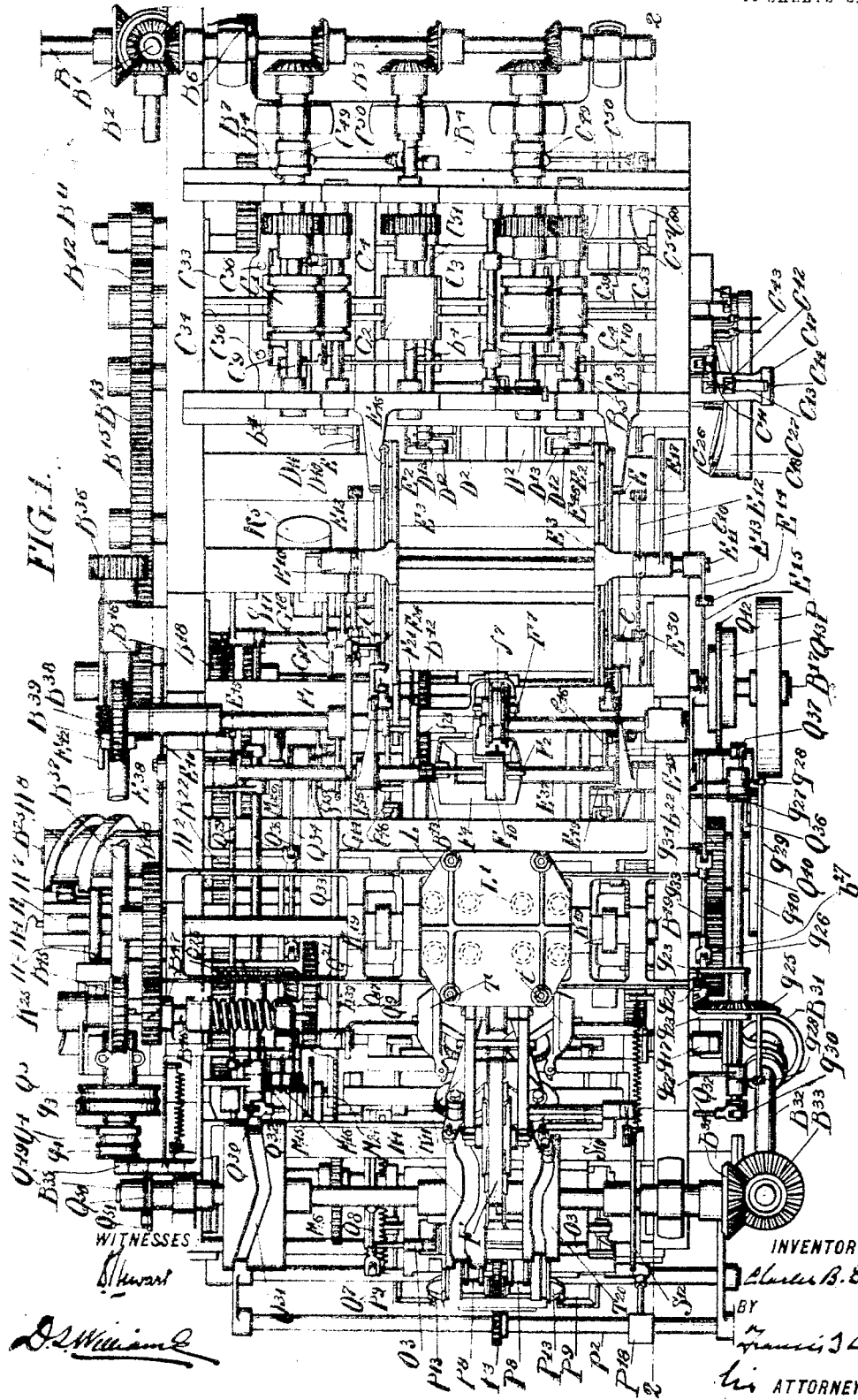

C. B. STILWELL.
PACKAGING MACHINE.
APPLICATION FILED APR. 26, 1906. RENEWED OCT. 13, 1911.

1,109,023.

Patented Sept. 1, 1914.
16 SHEETS—SHEET 1.

WITNESSES
INVENTOR
Charles B. Stilwell
BY
Francis J. Chambers
ATTORNEY.

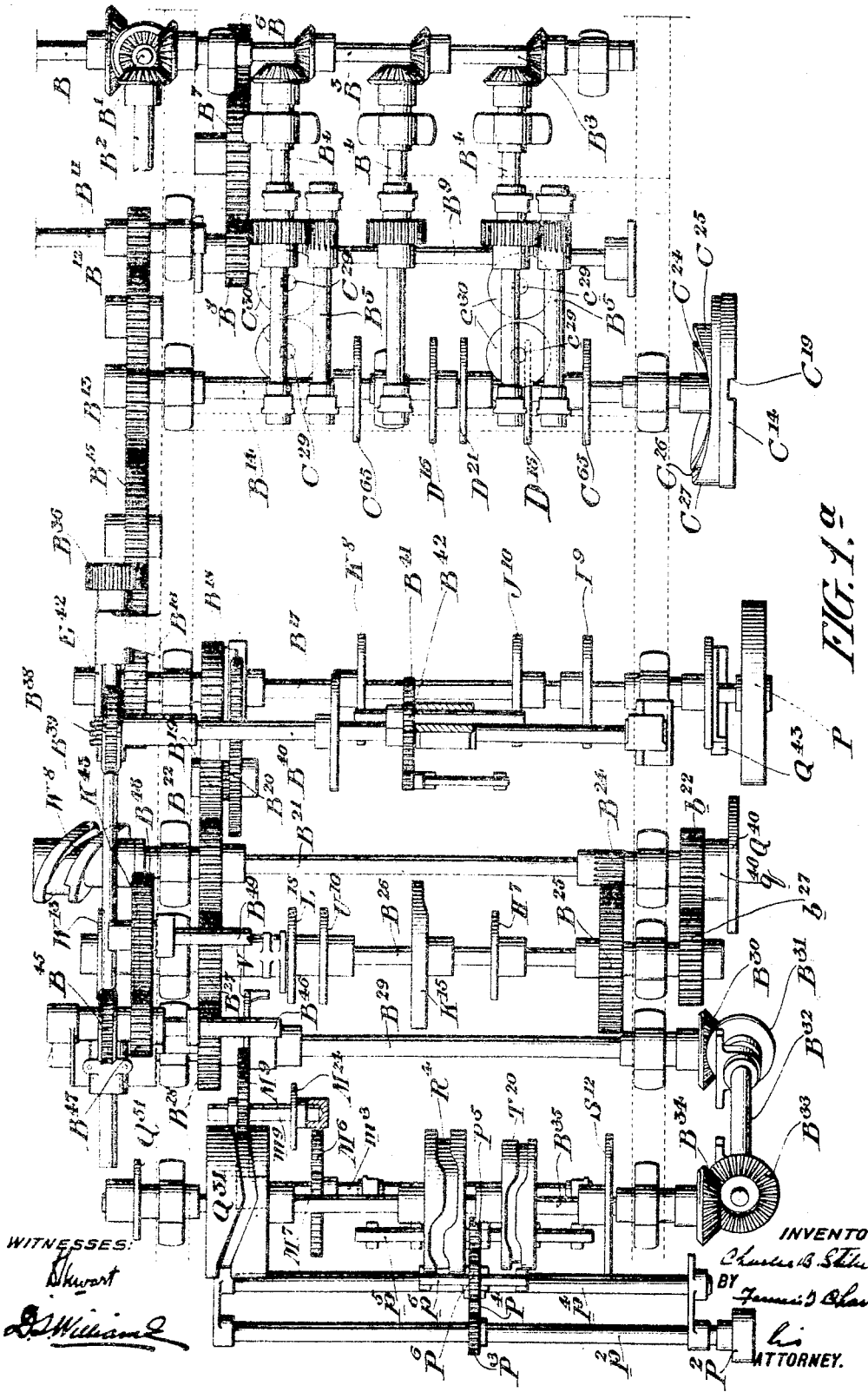

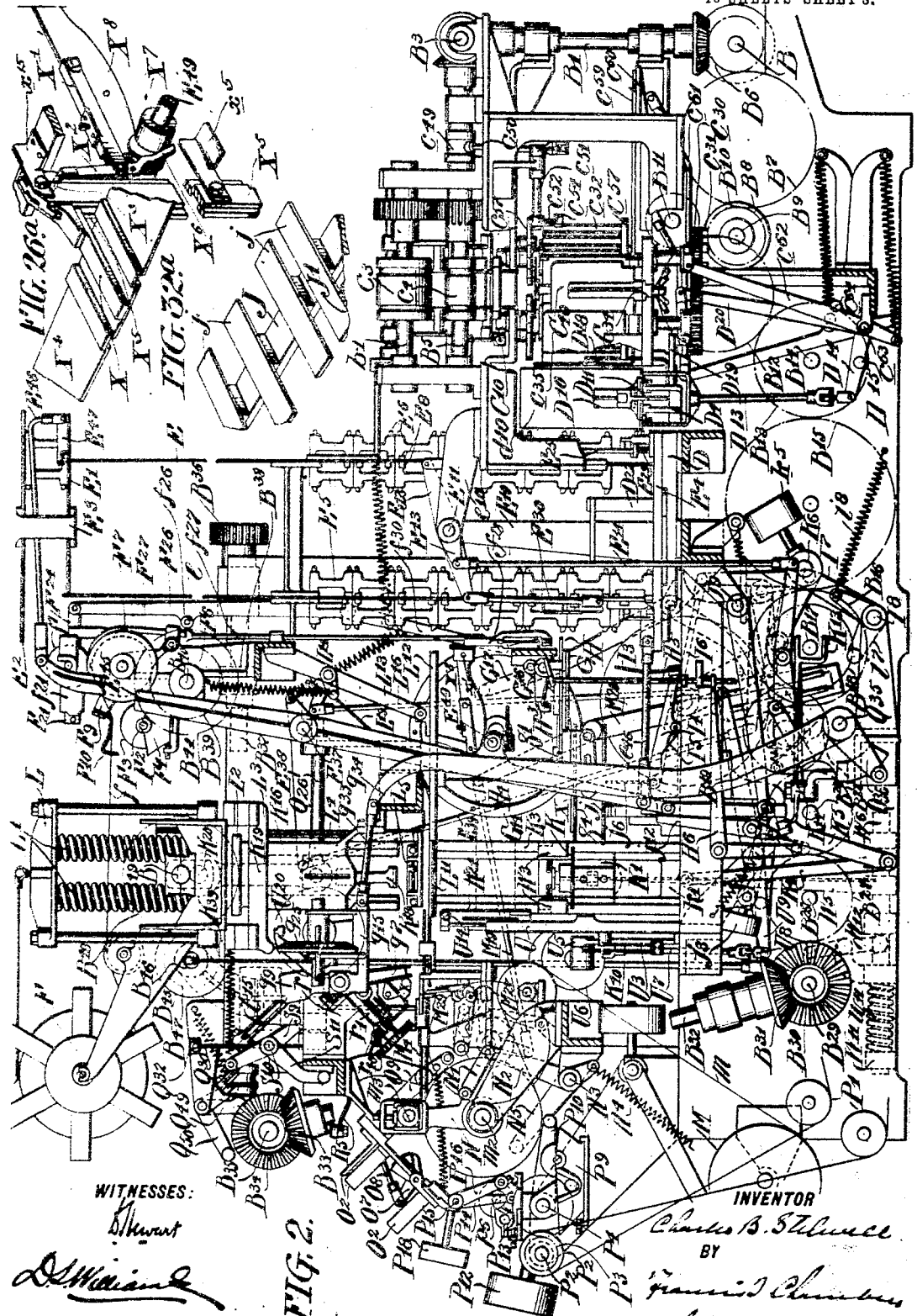

C. B. STILWELL.
PACKAGING MACHINE.
APPLICATION FILED APR. 25, 1906. RENEWED OCT. 13, 1911.
1,109,023.
Patented Sept. 1, 1914.
16 SHEETS—SHEET 4.
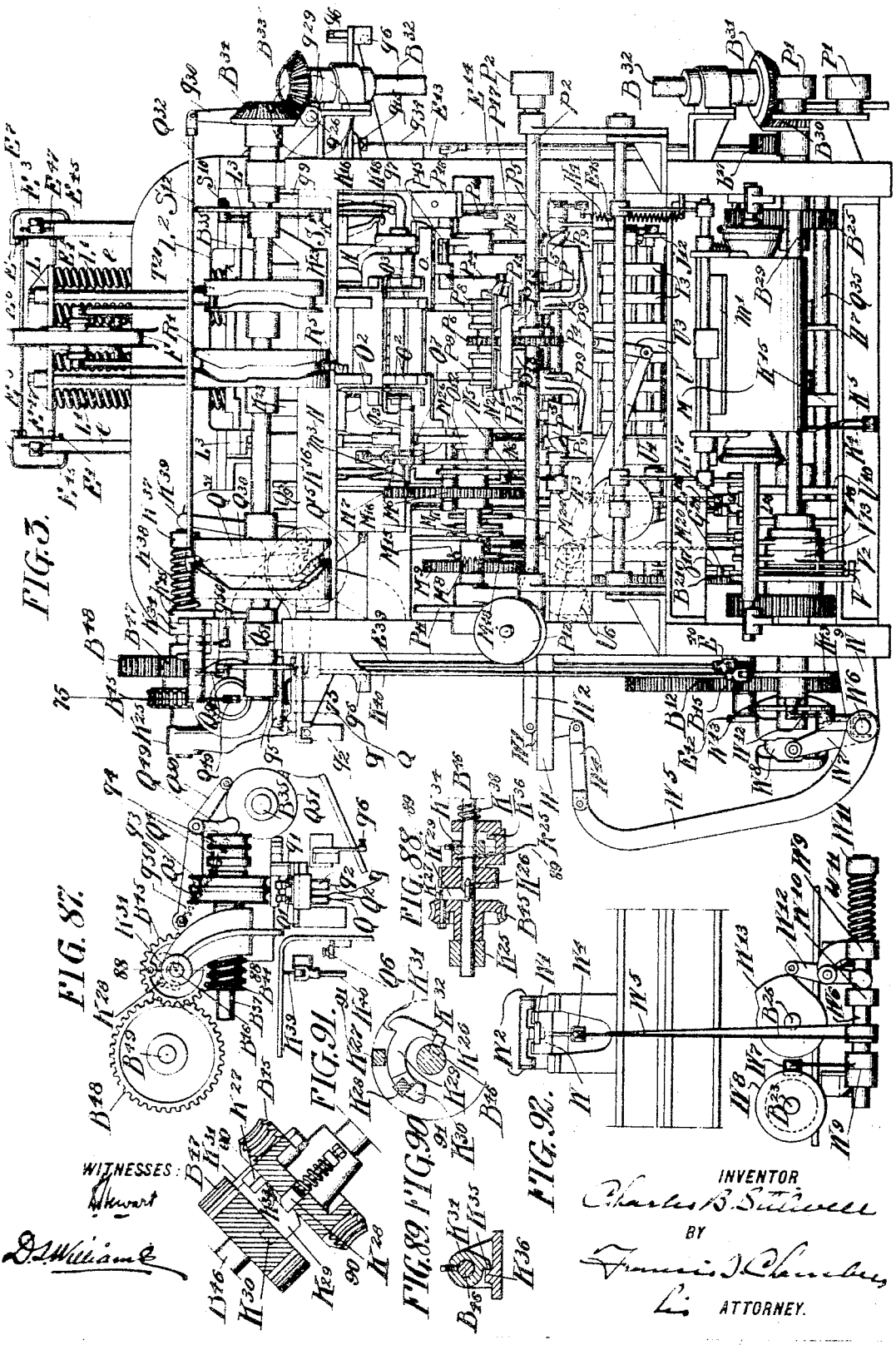

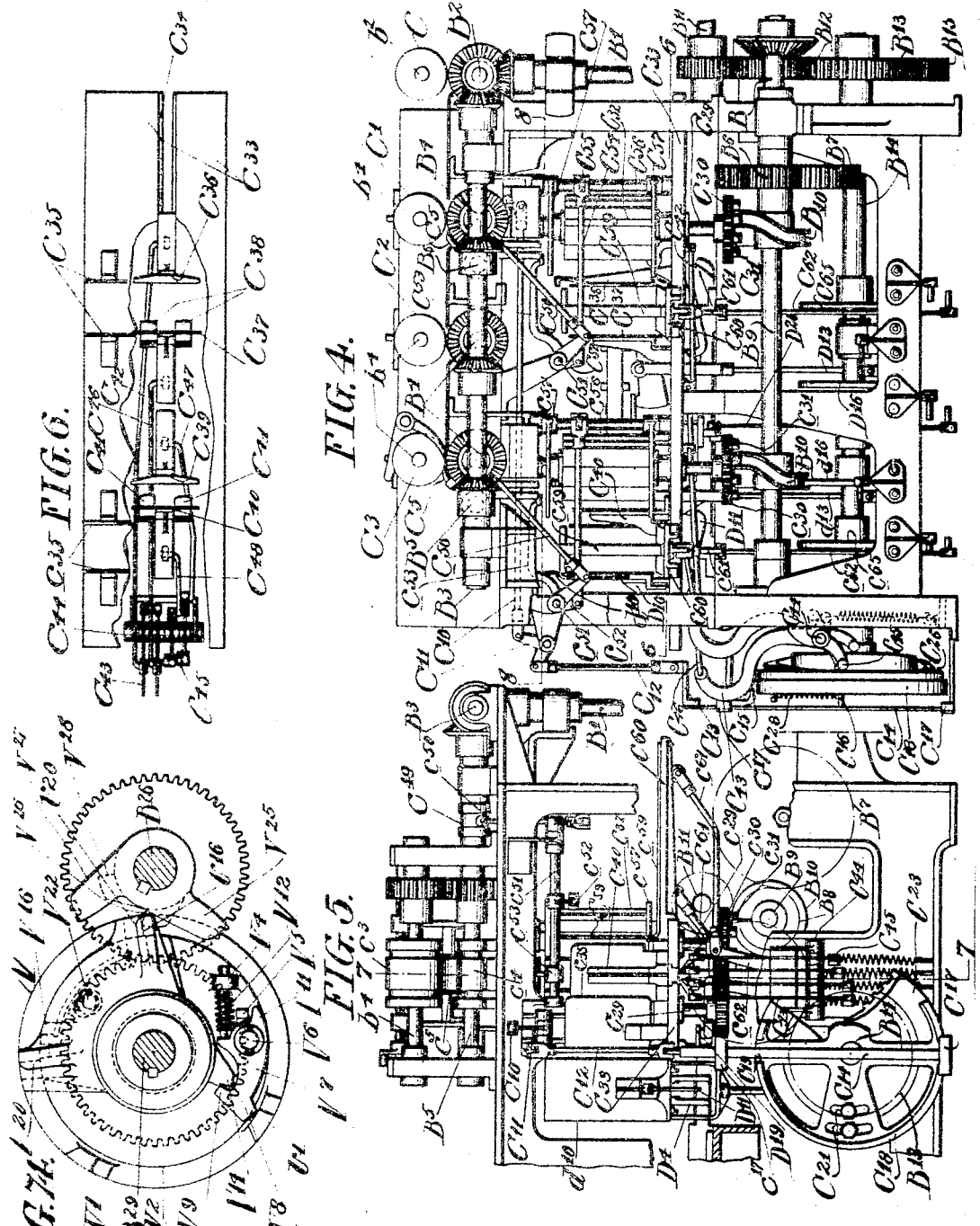

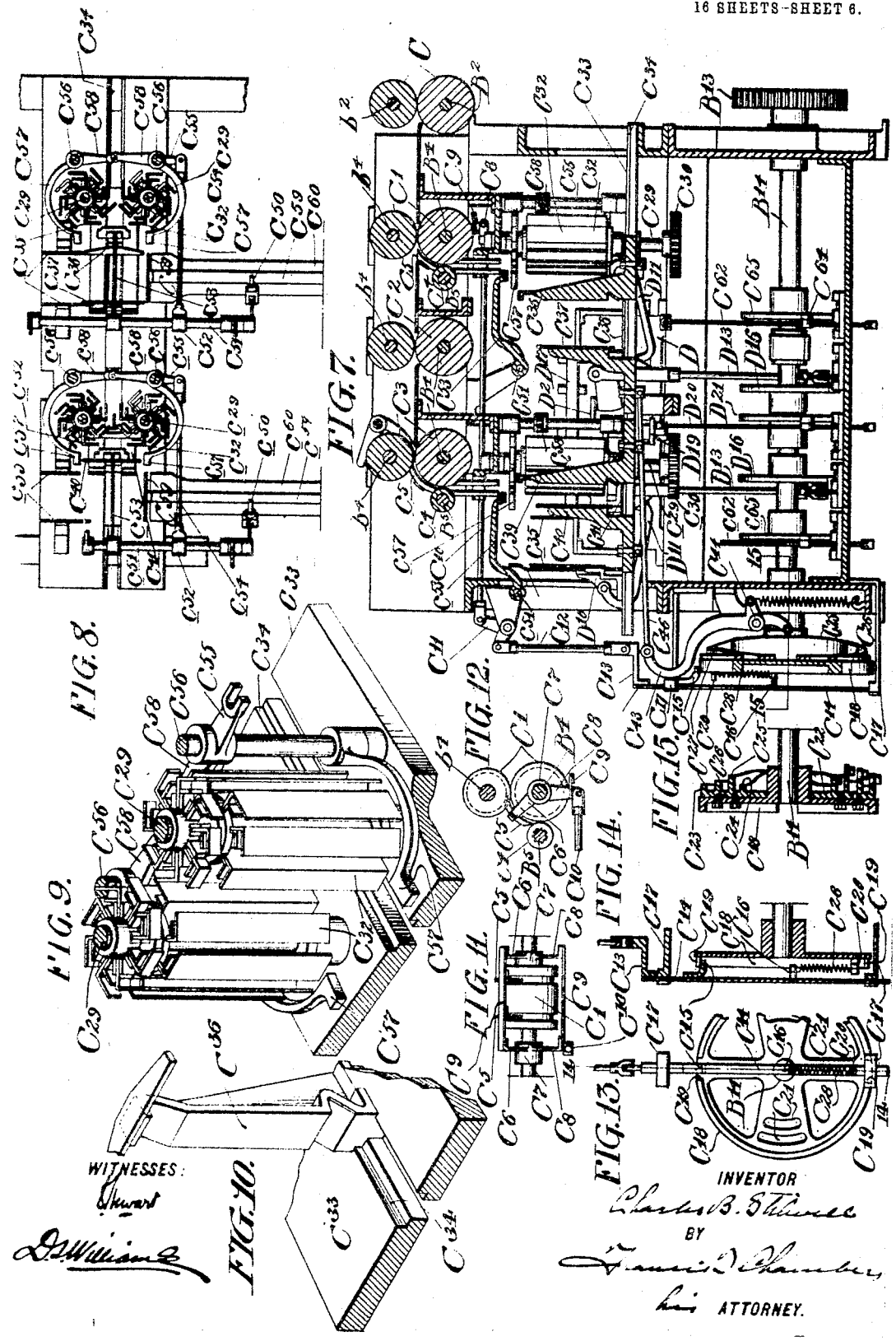

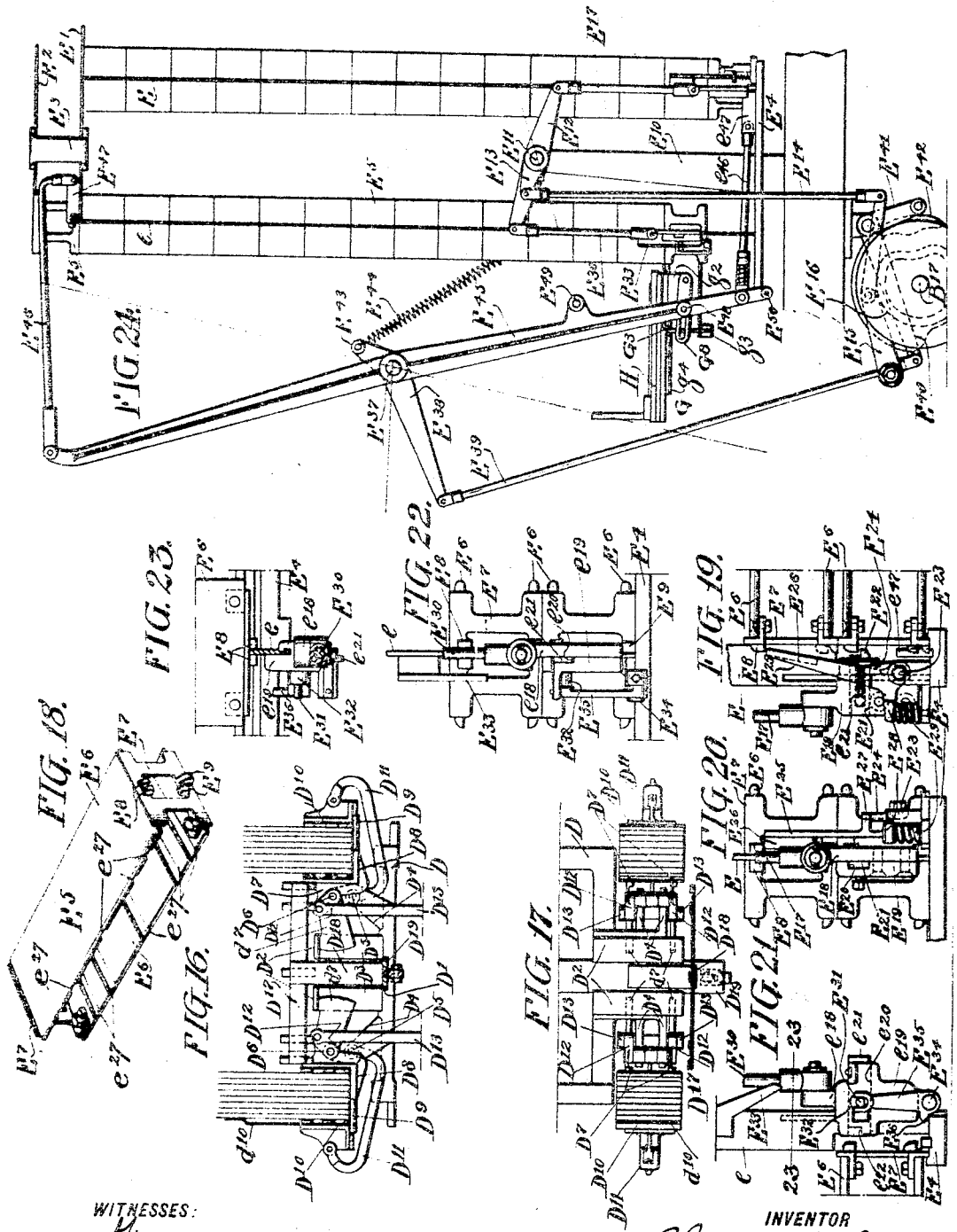

C. B. STILWELL.
PACKAGING MACHINE.
APPLICATION FILED APR. 26, 1906. RENEWED OCT. 13, 1911.
1,109,023.
Patented Sept. 1, 1914.
16 SHEETS—SHEET 8.
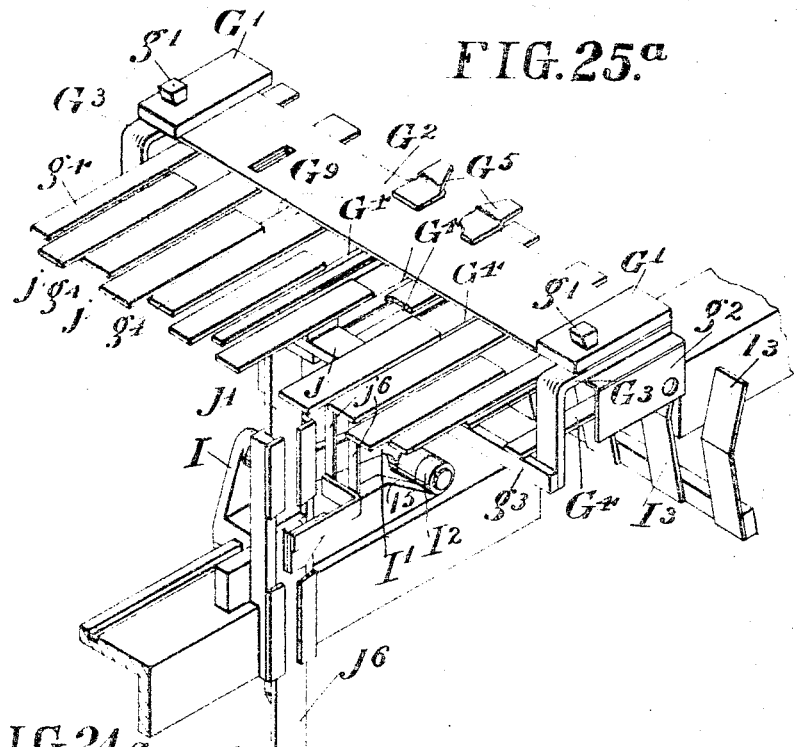
FIG. 25.a
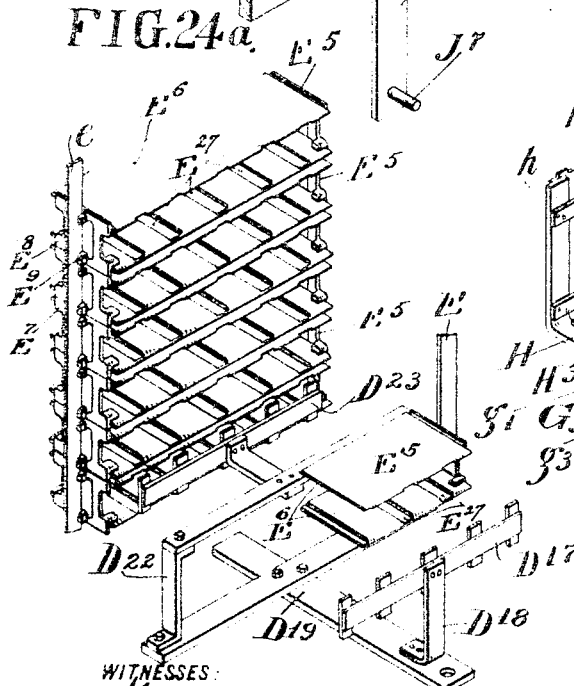
FIG. 24.a
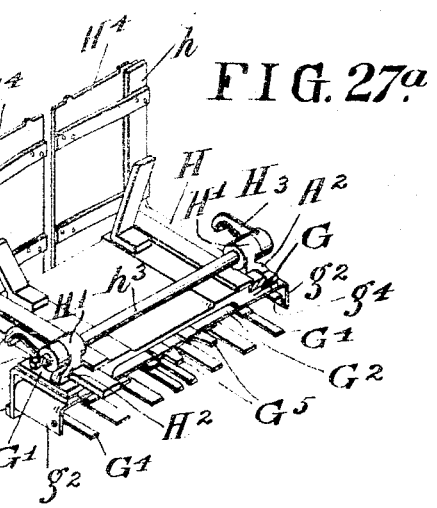
FIG. 27.a
INVENTOR
Charles B. Stilwell
BY
ATTORNEY.
WITNESSES:

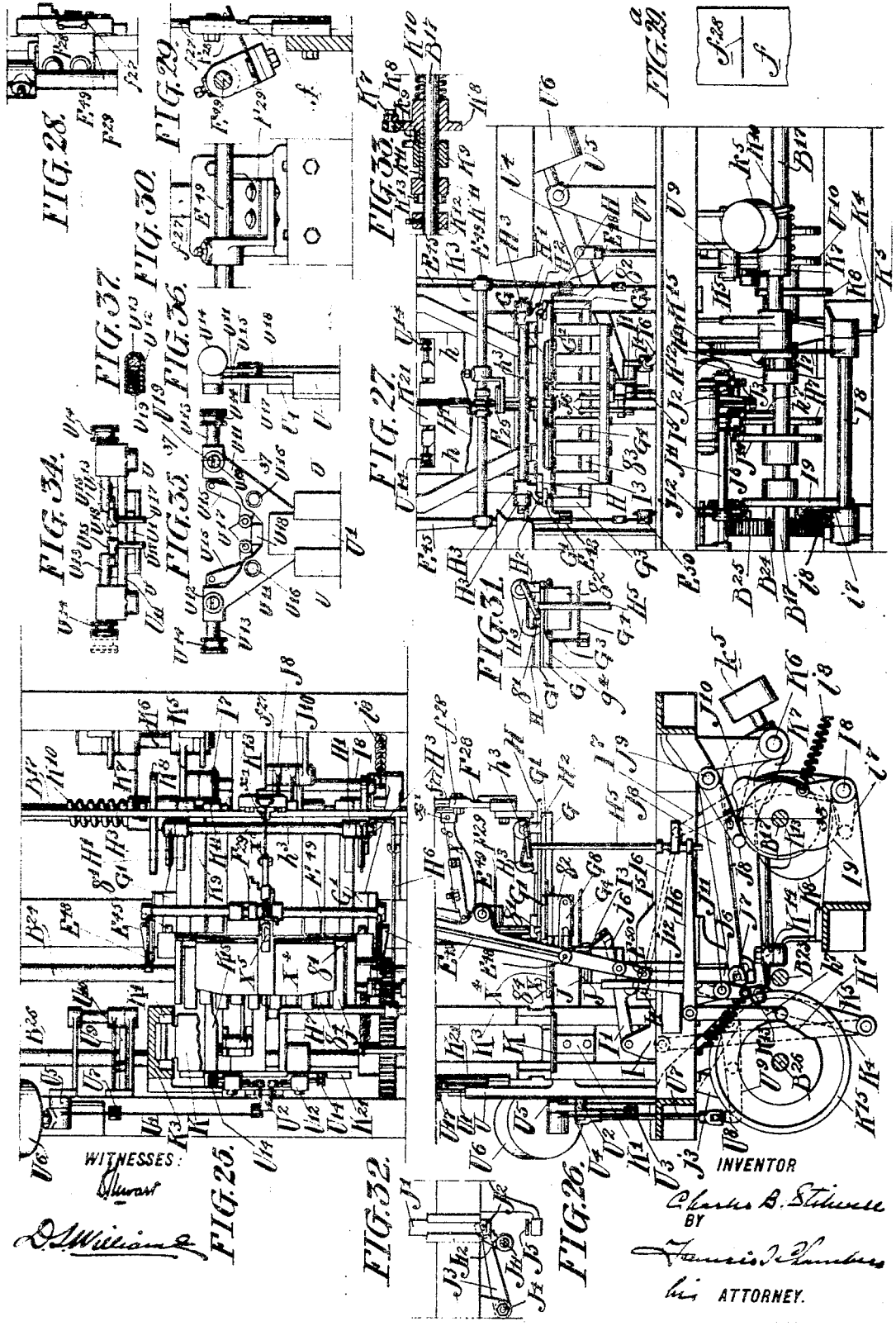

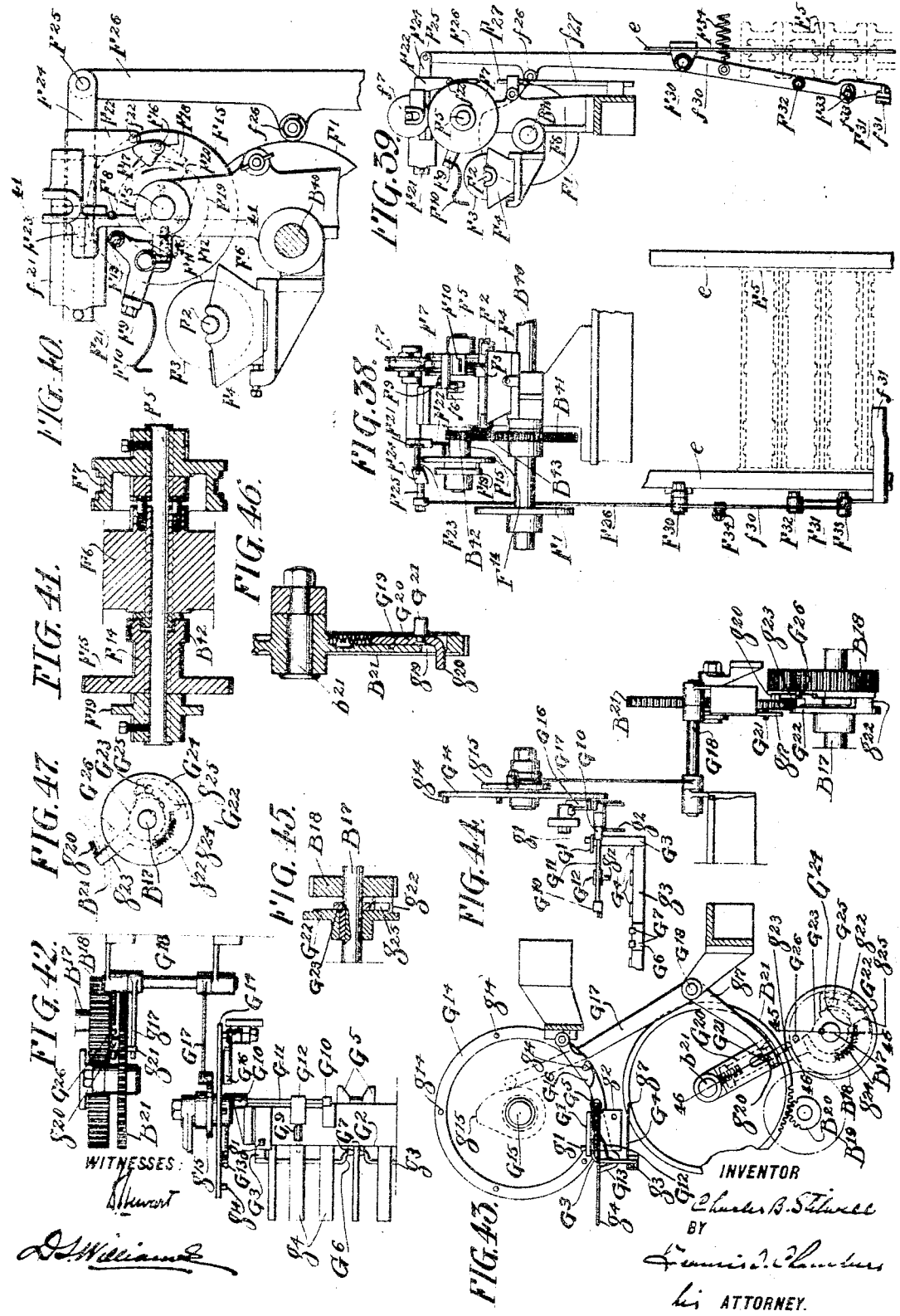

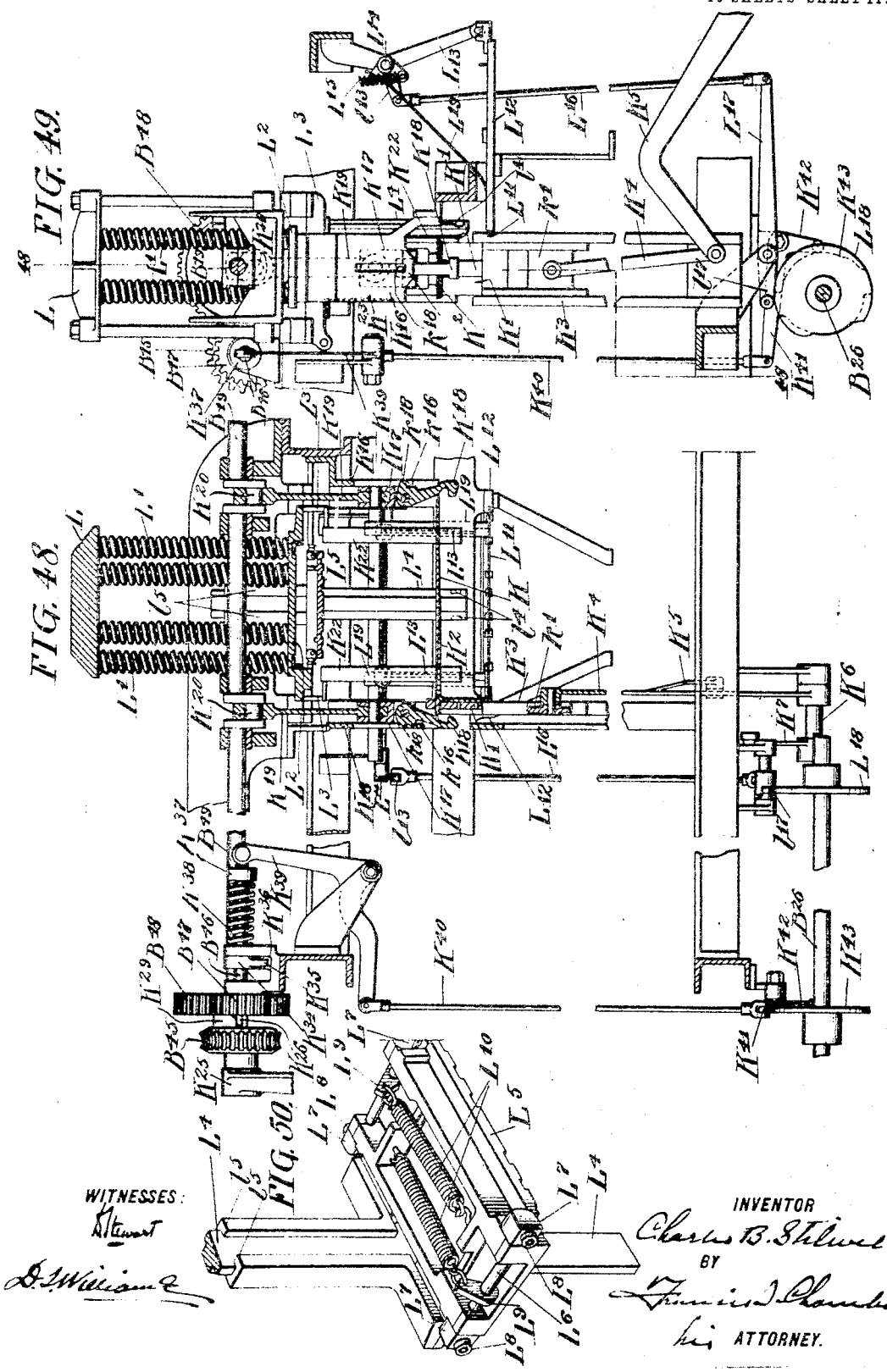

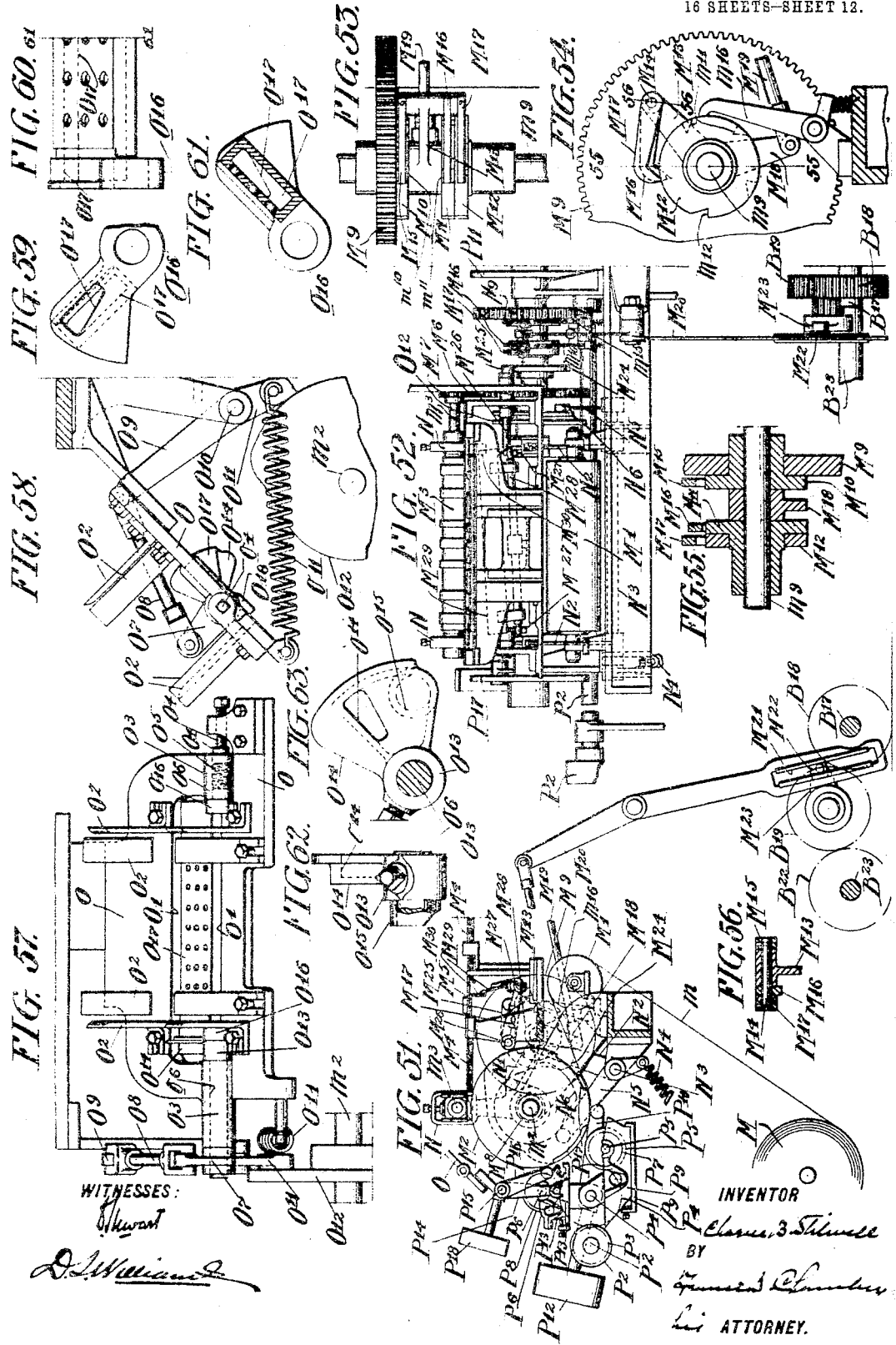
C. B. STILWELL.
PACKAGING MACHINE.
APPLICATION FILED APR. 26, 1906. RENEWED OCT. 13, 1911.
1,109,023.
Patented Sept. 1, 1914.
16 SHEETS—SHEET 12.

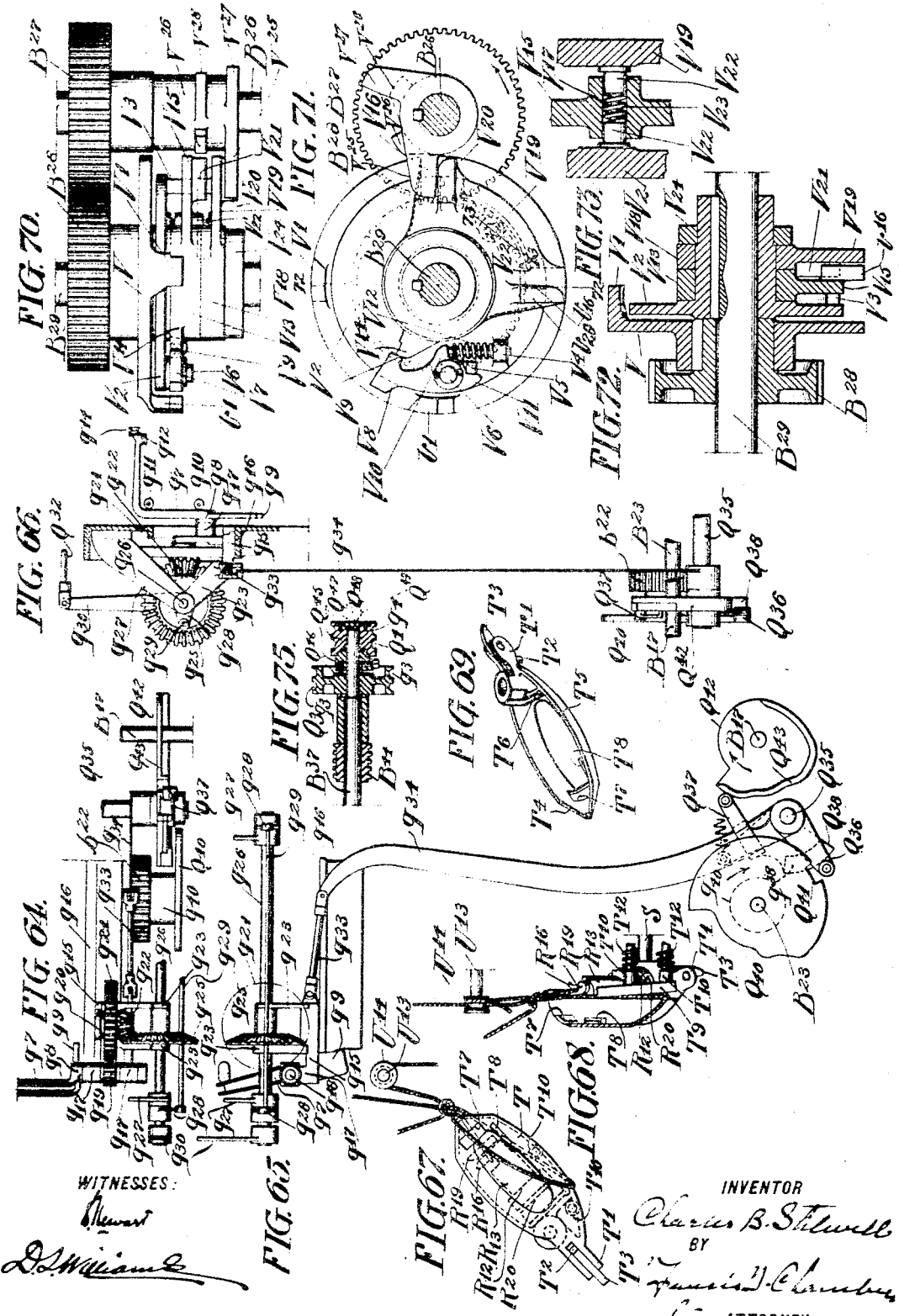

C. B. STILWELL.
PACKAGING MACHINE.
APPLICATION FILED APR. 26, 1906. RENEWED OCT. 13, 1911.
1,109,023.
Patented Sept. 1, 1914.
16 SHEETS—SHEET 14.
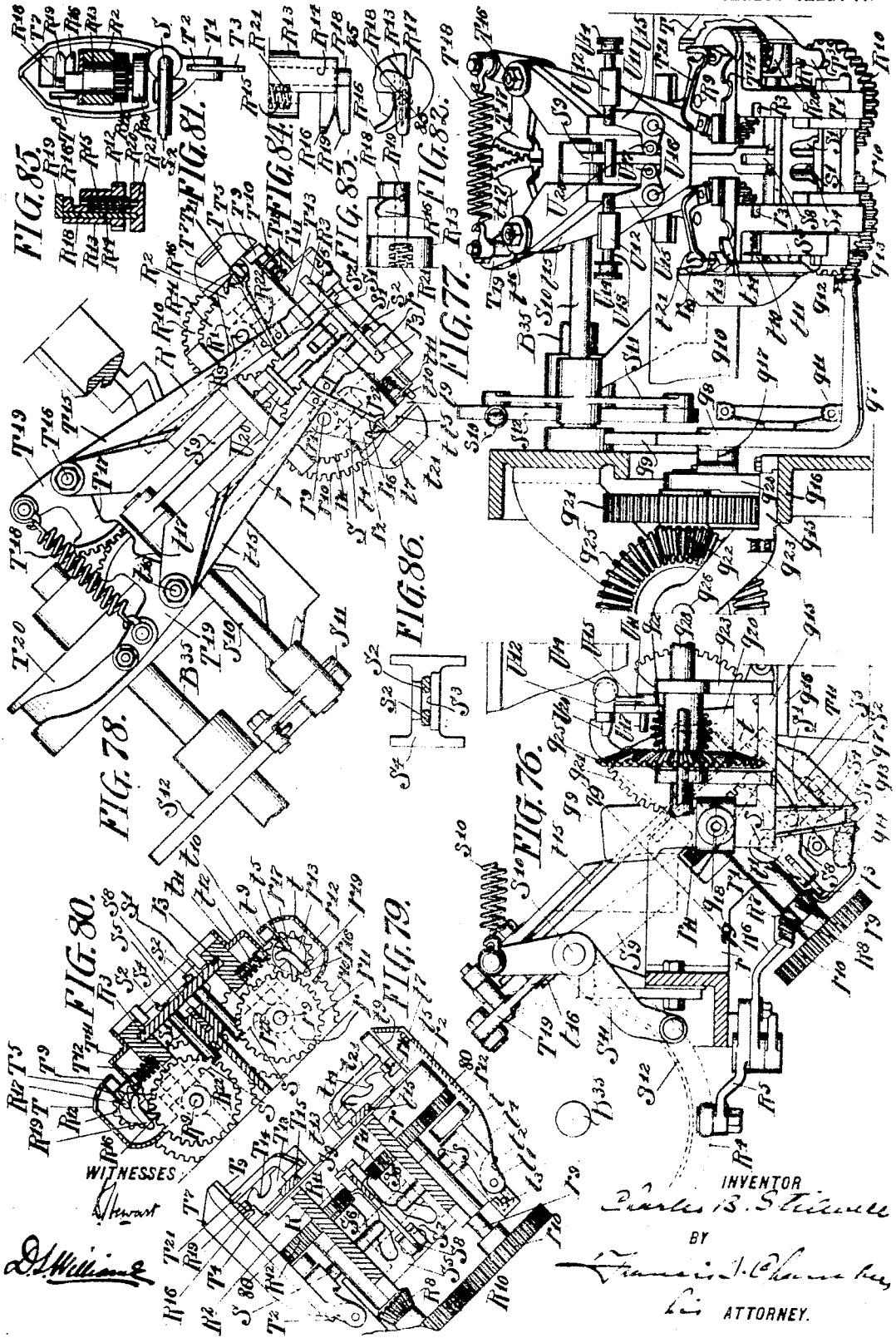
INVENTOR
Charles B. Stilwell
BY
Francis J. Chamberlin
ATTORNEY.
WITNESSES

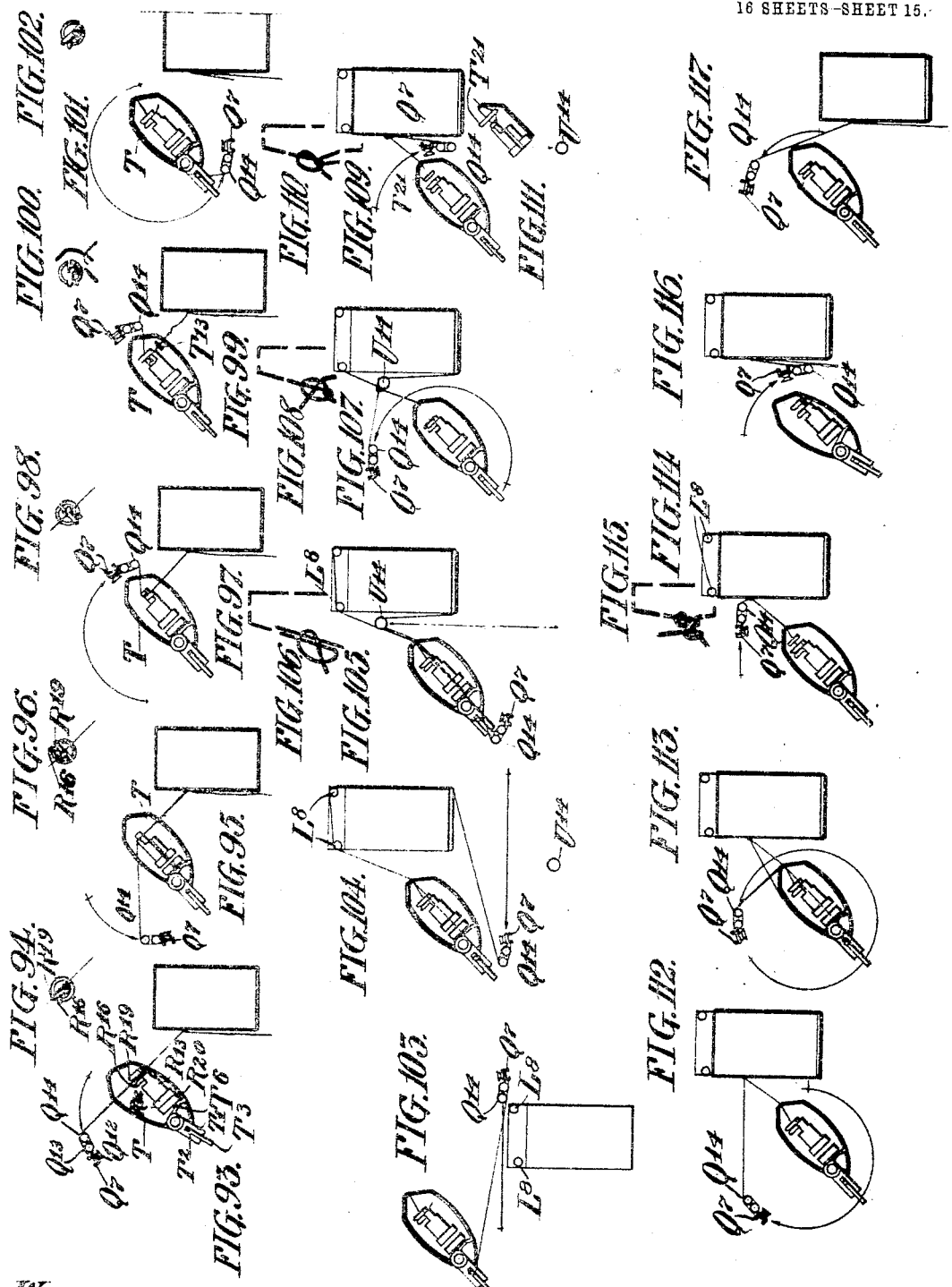

C. B. STILWELL.
PACKAGING MACHINE.
APPLICATION FILED APR. 26, 1906. RENEWED OCT. 13, 1911.
1,109,023.
Patented Sept. 1, 1914.
16 SHEETS—SHEET 16.
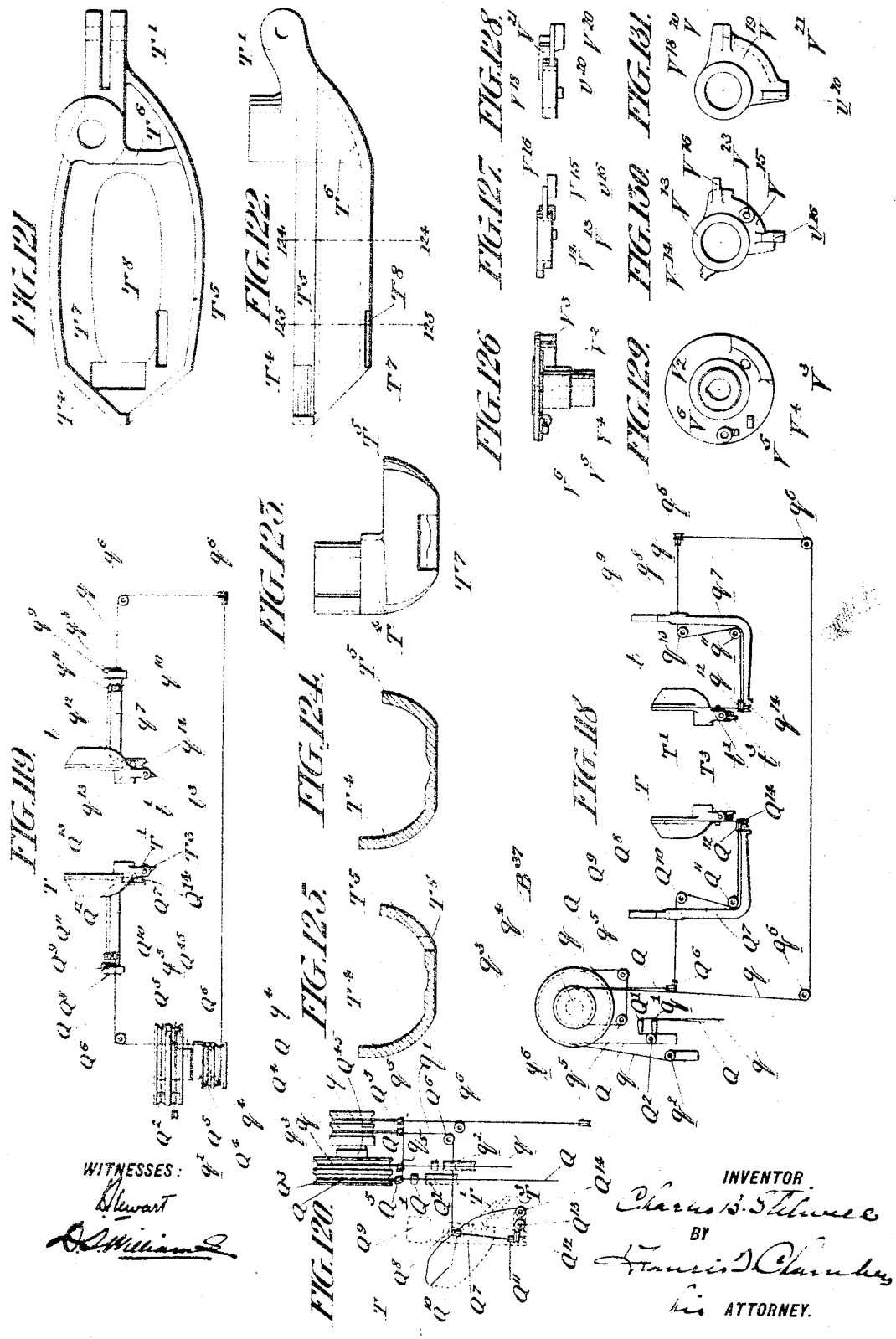
WITNESSES:
INVENTOR
BY
ATTORNEY.

UNITED STATES PATENT OFFICE.

CHARLES B. STILWELL, OF WAYNE, PENNSYLVANIA, ASSIGNOR TO THE UNION PAPER BAG MACHINE COMPANY, OF PHILADELPHIA, PENNSYLVANIA, A CORPORATION OF PENNSYLVANIA.

PACKAGING-MACHINE.

1,109,023.  Specification of Letters Patent.  Patented Sept. 1, 1914.

Application filed April 26, 1906, Serial No. 313,784. Renewed October 13, 1911. Serial No. 654,540.

*To all whom it may concern:*

Be it known that I, CHARLES B. STILWELL, a citizen of the United States of America, residing in Wayne, in the county of Delaware, in the State of Pennsylvania, have invented a certain new and useful Improvement in Packaging-Machines, of which the following is a true and exact description, reference being had to the accompanying drawings, which form a part thereof.

My invention relates to a machine for assembling a number of paper bags (say one hundred) in a package, encircling the package with a holding strip or band, assembling a number of such packages into a single bundle, inclosing the bundle in a wrapper and binding the wrapper and its contained bundle of individual packages, by means of binding twine or cord, suitably tied or knotted to form a reliable closure.

In the accompanying drawings, Figure 1 represents a plan view, with certain of the parts removed, of a machine embodying my improvements. Fig. 1ª represents a plan view of the power transmission and driving mechanism of the machine. Fig. 2 represents a vertical sectional elevation taken on a plane indicated by the line 2—2 of Fig. 1. Fig. 3 represents an elevation viewed from the left hand side of the machine as shown in Figs. 1 and 2. Fig. 4 represents an elevation of a portion of the machine viewed from the right hand end. Fig. 5 represents an end elevation of the parts shown in Fig. 4, portions of the frame being broken away. Fig. 6 represents a partial plan view taken on a plane indicated by the line 6—6 of Fig. 4. Fig. 7 represents a sectional view taken on the line 7—7 of Fig. 5. Fig. 8 represents a sectional view taken on the line 8—8 of Fig. 4. Fig. 9 represents, on a somewhat larger scale, a perspective view of one of the principal devices employed in the preliminary operation of receiving and piling the bags. Fig. 10 represents, in perspective, one of the pusher devices for removing the bags from the device shown in Fig. 9. Figs. 11 and 12 represent respectively an end view and a side elevation of the carrying roll and shifting switch for directing the bags in the preliminary piling operation. Fig. 13 represents an end view of a portion of the controlling wheel for the switch shown in Figs. 11 and 12. Fig. 14 represents a central vertical section taken on the line 14—14 of Fig. 13. Fig. 15 represents a horizontal sectional view taken on the line 15—15 of Fig. 7. Fig. 16 represents, in elevation, the device employed for receiving two separate piles of bags in a vertical position, and turning them over into a horizontal position, and assembling them into a single pile constituting one of the individual packages. Fig. 17 represents a plan view thereof. Fig. 18 is a perspective view of one of the drying boxes. Fig. 19 represents, in elevation, the devices for elevating one of the columns of drying boxes and for retaining the same in such elevated position. Fig. 20 is an end elevation of the devices shown in Fig. 19. Fig. 21 represents, in elevation, the devices for supporting one of the columns of drying boxes and for lowering the same. Fig. 22 is an end elevation of the devices shown in Fig. 21. Fig. 23 represents a horizontal section taken on a plane indicated by the line 23—23 of Fig. 21. Fig. 24 represents, in elevation, the columns of drying boxes, the devices for raising and lowering the said columns and the devices for transferring the boxes from one column to the other. Fig. 24ª is a perspective view of portions of the columns of drying boxes and the devices by which packages of bags are delivered to and ejected from such drying boxes. Fig. 25 represents a plan view of that portion of the machine which transfers the individual packages of bags from the drying boxes to the piling plunger and which places the band of paper around each package. Fig. 25ª is a perspective view of portions of the transfer case and the piling plunger. Fig. 26 represents, in side elevation, the portion of the machine shown in Fig. 25. Fig. 26ª is a perspective view of a portion of the piling plunger follower-weight and its controlling mechanism. Fig. 27 represents, in end elevation, looking toward the column of drying boxes, the portion of the machine shown in Fig. 25. Fig. 27ª is a perspective view of a portion of the transfer case and the device by which the pile of packages is transferred from the piling plunger to the vertically movable platen. Fig. 28 represents a plan view of the knives for cutting the band of paper placed around each component package of bags of the bundle. Fig. 29 is a side elevation of the devices shown in Fig. 28. Fig. 29a is a detail view of a portion of the band which encircles individual packages, showing the manner in which it is cut so that a suitable length may be detached. Fig. 30 is a front elevation of the devices shown in Fig. 29. Fig. 31 represents, in side elevation, certain latch devices of the case which transfer the individual packages from the drying boxes to the piling plunger. Fig. 32 represents, in side elevation, the devices for holding the piling plunger in raised and lowered positions. Fig. 32a is a perspective view of a portion of the piling plunger. Fig. 33 represents a vertical section taken in the plane indicated by the line 33—33, Fig. 26, showing a portion of the mechanism for actuating the platen by which a pile of packages is raised and lowered. Fig. 34 is a plan view of the tucker roll devices which place the strings and wrapper up one side of the bundle of packages. Fig. 35 is a front elevation of the devices shown in Fig. 34. Fig. 36 is an end elevation of the devices shown in Figs. 34 and 35. Fig. 37 is a vertical section in the plane indicated by the line 37—37, Fig. 35. Fig. 38 represents, in end elevation, that portion of the machine which feeds the band of paper placed around each package of bags, said view also showing the mechanism for applying paste to the band and the device by which the said mechanism is stopped when no packages are in the drying boxes. Fig. 39 is a side elevation of the devices shown in Fig. 38. Fig. 40 is an enlarged view showing, in side elevation, the band feeding and paste applying devices shown in Figs. 38 and 39. In this position the operating mechanism is shown tripped or thrown out of action. Fig. 41 is a vertical section taken in the plane indicated by the line 41—41, Fig. 40. Fig. 42 is a plan view of a portion of the transfer case, the mechanism which insures that the proper number of packages is present in each completed bundle, and the clutch mechanism for controlling those operations of the machine which relate to the bundle of packages. Fig. 43 represents, in side elevation, the devices shown in Fig. 42. Fig. 44 is an end elevation of the devices shown in Fig. 42, looking in the direction of the piling plunger. Fig. 45 is a vertical section taken in the plane indicated by the line 45—45, Fig. 43. Fig. 46 is a section taken in the plane indicated by the line 46—46, Fig. 43. Fig. 47 is a detail view of the clutch mechanism shown in Fig. 43, the clutch being out of operation. Fig. 48 is a vertical section in the plane indicated by the line 48—48, Fig. 49. Fig. 49, represents, in side elevation, the devices by which the pile of packages is compressed and held in an elevated position while the strings are tied around the bundle; also showing the paper bridge and its controlling mechanism. Fig. 50 is a perspective view of the package follower. Fig. 51 represents, in side elevation, the devices for pasting, feeding, and cutting the wrapper placed around each bundle of packages. Fig. 52 is a rear elevation of the devices shown in Fig. 51. Fig. 53 is an enlarged plan view of the mechanism controlling the wrapper feed. Fig. 54 is a side elevation of the devices shown in Fig. 53. Fig. 55 is a vertical section taken in the plane indicated by the line 55—55, Fig. 54. Fig. 56 is a section taken in the plane indicated by the line 56—56, Fig. 54. Fig. 57 represents, in front elevation, the label box and the devices for transferring the label to the web of wrapping paper. Fig. 58 is a side elevation of the devices shown in Fig. 57. Fig. 59 is an end elevation of the suction box of the labeling mechanism. Fig. 60, represents in side elevation, a portion of the suction box shown in Fig. 59. Fig. 61 is a vertical section of the suction box taken in the plane indicated by the line 61—61, Fig. 60. Fig. 62 is a front elevation of the air-box which coöperates with the suction box. Fig. 63 is a side elevation of the air-box. Fig. 64 is a plan view of a portion of the needle and the driving and controlling mechanism therefor. Fig. 65 is a side elevation of the devices shown in Fig. 64. Fig. 66 is a rear elevation of the devices shown in Fig. 64. Fig. 67 represents, in side elevation, the shuttle and one of the tucker rolls, the string (which passes around the tucker roll and the bundle) being shown as slipping off the shuttle to form a loop for the knot. Fig. 68 is a side elevation, looking toward the bundle, of the devices shown in Fig. 67. Fig. 69 is a perspective view of the shuttle. Fig. 70 is a plan view of the clutch mechanism which controls the knotting devices. Fig. 71 is a side elevation of the device shown in Fig. 70. Fig. 72 is a vertical section taken in the plane indicated by the line 72—72, Fig. 71. Fig. 73 is a detail sectional view taken in the plane indicated by the line 73—73, Fig. 71, showing the frictional devices for maintaining the relative positions of certain members of the clutch. Fig. 74 is a view corresponding to Fig. 71, but showing the relation of the parts when the clutch is not in operation. Fig. 75 is a vertical section taken in the plane indicated by the line 75—75, Fig. 3, showing the string reels and their driving mechanism. Fig. 76 represents, in side elevation, the needle, shutter, tucker rolls, the knife for cutting the string and certain mechanisms associated with these knotting devices. Fig. 77 is a rear elevation of the devices shown in Fig. 76. Fig. 78 is a plan view of the devices shown in Fig. 76. Fig. 79 is a sectional view taken in the plane indicated by the line 79—79, Fig. 76. Fig. 80 is a sectional view taken in the plane indicated by the line 80—80, Fig. 79. Fig. 81 is a view showing, in elevation, the normal relation of the shuttle and the twister. Fig. 82 is an end view of the twister looking toward the shuttle latch, showing the string receiving slot in the twister body. Fig. 83 is a side view of a portion of the twister. Fig. 84 represents, in plan, that portion of the twister shown in Figs. 82 and 83. Fig. 85 is a sectional view of the twister taken in the plane indicated by the line 85—85, Fig. 82, the jaws of the twister being closed. Fig. 86 is a detail view showing the guide for the ends of the rods by which the shuttles are actuated. Fig. 87 represents, in side elevation, the string reels and the clutch for controlling the mechanism by which the pile of packages is compressed. Fig. 88 is a vertical section taken in the plane indicated by the line 88—88, Fig. 87, the clutch being shown in driving position. Fig. 89 is a vertical section in the plane indicated by the line 89—89, Fig. 88, showing the parts in the positions they occupy when the clutch is disengaged. Fig. 90 is a sectional view taken in the plane indicated by the line 90—90, Fig. 91. Fig. 91 is a sectional view taken in the plane indicated by the line 91—91. Fig. 90, showing the details of the clutch mechanism for controlling the devices by which the pile of packages is compressed. Fig. 92 is a side elevation of the devices by which the completed bundle of packages is delivered from the machine. Figs. 93 to 117 inclusive, illustrate the relative positions of the knotting devices and the bundle of packages during the knotting operation. Figs. 93, 95, 97, 99, 101, 103, 104, 105, 107, 109, 112, 113, 114, 116 and 117 representing, respectively, in side elevation, successive positions of the parts during the knotting operation; Figs. 94, 96, 98, 100 and 102 being end views of the twister showing the successive positions of the jaws, corresponding respectively to Figs. 93, 95, 97, 99 and 101; Figs. 106, 108, 110 and 115 illustrating successive forms of the knot, corresponding to the positions of the knotting devices in Figs. 105, 107, 109 and 114 respectively, and Fig. 111 illustrating the position of shuttle, twister, and string take-up at the instant the latter is operating as shown in Fig. 109. Figs 118, 119 and 120 are, respectively, a rear elevation, a plan view, and a side elevation, of the needles, shuttles and associated string tension devices. Fig. 121 is a detail plan view of one of the shuttles. Fig. 122 is a detail view showing one of the shuttles in side elevation. Fig. 123 is a detail end elevation of one of the shuttles. Fig. 124 is a sectional view of the shuttle, taken on the line 124—124, Fig. 122. Fig. 125 is a sectional view of the shuttle, taken on the line 125—125, Fig. 122. Figs. 126, 127 and 128 are detached views showing, in plan, the several disks of the clutch mechanism controlling the knotting devices. Fig. 129 is a side elevation of the clutch disk shown in Fig. 126. Fig. 130 is a side elevation of the clutch disk shown in Fig. 127. Fig. 131 is a side elevation of the clutch disk shown in Fig. 128.

Like symbols refer to like parts wherever they occur.

The power for driving the machine may be derived from any suitable source as, for instance the driving shaft B, located at one end of the machine. By means of beveled gears, the driving shaft B actuates continuously the vertical shaft $B'$, mounted in suitable bearings upon the frame of the machine. The vertical shaft $B'$, through beveled gears actuates the horizontal shaft $B^2$ upon which is mounted one of a pair of feed rolls C (see Figs. 4 and 7), through which the paper bags are introduced into the machine in the preliminary operation of forming the individual piles or packages. The upper member of the set of feed rolls C is mounted upon a shaft $b^2$ which is driven from a spur gear upon the shafts $B^2$. The shaft $B^2$ (see Fig. 4), likewise drives the shaft $B^3$ which latter is provided with a number of beveled gears which in turn drive the horizontal shafts $B^4$ through the intermediacy of beveled gears upon said shafts. The several shafts $B^4$ have mounted upon them the lower members of the sets of feed rolls or carrier rolls $C'$, $C^2$, $C^3$, the upper member of these sets of rolls being mounted upon shafts $b^4$, which are driven by spur wheels, as shown in Figs. 1, 2 and 7, from the shafts $B^4$. Additional shafts $B^5$, having mounted upon them the rolls $C^4$ are likewise driven by spur gearing from individual members of the series of shafts $B^4$. The function of the sets of rolls C, $C'$, $C^2$ and $C^3$ is to feed the bags into the machine in a horizontal direction, and the function of the rolls $C^4$, coöperating with the lowermost of the pairs of rolls $C'$ and $C^3$ respectively, is to feed the bags downwardly into the piling mechanism, when the switches $C^5$ are appropriately adjusted for that purpose.

By reference to Figs. 11 and 12, it will be noted that the front shaft $B^4$ is provided with hubs $C^7$ mounted loosely to rock thereon, from which hubs project the arms $C^6$, $C^8$, the outer ends of the arms $C^6$ and outer ends of the arms $C^8$, being connected by cross plates $C^9$, so that the two hubs and their arms may rock together. Attached to the upper plate $C^9$ are the switch plates $C^5$, which, as above stated, serve as guides for directing the bags from a horizontal to a vertical path of movement.

One of the arms $C^8$ is connected, by means of a rod $C^{10}$ with a bell crank lever $C^{11}$ attached to the rod $C^{12}$ (see Figs. 4, 5 and 7), which, in turn is connected to the piece $C^{13}$ and consequently to the slide $C^{14}$ which works in the guides $C^{17}$. Attached to the slide $C^{14}$ is a stud or projection $C^{15}$ (see Figs. 13 and 14) near the upper end thereof, and below this stud $C^{15}$ is a pin $C^{16}$ to which is attached one end of a spiral spring $C^{28}$, whose other end is attached to a pin $C^{20}$ on the wheel $C^{18}$. The wheel $C^{18}$ is fixed upon and rotates with the shaft $B^{14}$, which is so geared to the piling mechanism as to make one revolution for the maximum number of bags (say one hundred) to be included in a single package.

The wheel $C^{18}$ is provided with two slots $C^{19}$ arranged diametrically opposite each other in a peripheral flange of the wheel. During one half of the revolution of the wheel $C^{18}$, the stud $C^{15}$ rides either upon the outer or inner periphery of the wheel flange, as the case may be, thereby maintaining the rod $C^{12}$ at the upper or lower limit of its throw and consequently maintaining the forward switch $C^5$ either in position to divert the bags downward to the first piling device, or to pass them on to the second piling device, whose switch is stationary and is not connected to the shifting mechanism. Inasmuch as the spring $C^{28}$ revolves with the wheel, the stud $C^{15}$, as soon as either of the slots $C^9$ come into alinement with it, is pulled through said slot, in the one direction or the other as the case may be, and the switch is accordingly shifted. As this shifting takes place with each half revolution of the wheel, it is evident that one half (say fifty) of the number of the bags fed into the machine during the period of revolution, is supplied to the first of the piling devices, and the second half (the remaining fifty) to the second of the piling devices, and so on alternately during continued revolutions of the wheel.

The rollers $C'$ and $C^4$ and the rollers $C^3$ and $C^4$ direct the bags one by one to the piling or assembling devices for the individual packages. These piling or assembling devices are shown as arranged in two sets and are preferably of the construction shown more particularly in Fig. 9. For convenience, I will designate them as paddle wheels, which they roughly resemble, and will describe them by the application of capital letters of reference only, it being understood that the parts denoted in the drawings by the corresponding small letters are of similar construction and perform similar functions. These paddle wheels $C^{32}$ are mounted upon shafts $C^{29}$ and on opposite sides of an intermediate guide way. Each paddle wheel is provided, in this instance, with eight sets of tangential pockets, the pockets of each pair of paddle wheels coöperating with each other to receive successively the individual bags as they are fed downward. The paddle wheels move in unison and in an intermittent manner, advancing one-eighth of a revolution after receiving and delivering a bag, so as to bring the next pair of pockets into position to receive the next succeeding bag. Each pair of shafts $C^{29}$ of the paddle wheels are provided with intermeshing gears $C^{30}$, and, as shown in Figs. 4 and 5, one of each of these sets of gears is provided on its lower surface with the cam rolls $C^{31}$, which engage with the cam tract $B^{10}$ upon the shaft $B^9$, whereby the progressive, intermittent motion above referred to is imparted to the two sets of paddle wheels. The shaft $B^9$ may conveniently be driven from the shaft B through the intermediacy of the spur gears $B^6$, $B^7$, $B^8$.

As the bags are successively delivered from the paddle wheels they are assembled against a back-stop $C^{37}$ or $C^{40}$, one of which is provided for each pair of paddle wheels. Plates $C^{38}$, $C^{41}$ (see Fig. 6) are fastened to the back-stop and serve as a moving platform to support the bags as they are discharged from the paddle wheels. Coöperating with the first set of paddle wheels is the pusher $C^{36}$ and with the second set of paddle wheels the pusher $C^{39}$. These pushers, together with the back-stops $C^{37}$ and $C^{40}$, are mounted to slide upon the slideways $C^{54}$. The pusher $C^{36}$ is provided with an actuating rod $C^{42}$ and the pusher $C^{39}$ is provided with an actuating rod $C^{47}$. So also the back-stop $C^{37}$ is provided with an actuating rod $C^{46}$ and the back plate $C^{40}$ is provided with an actuating rod $C^{48}$. These several actuating rods (see Figs. 4, 5 and 7) are connected to a corresponding series of cam-actuated levers $C^{43}$, whose free ends bear upon the outer edges of the cam tracts $C^{24}$, $C^{25}$, $C^{26}$ and $C^{27}$, which cam tracts are formed upon the disks $C^{22}$, $C^{23}$, which are attached to the wheel $C^{18}$ with a capacity for adjustment, by means of bolts and nuts engaging with the slots $C^{21}$ (see Fig. 5). The cam levers $C^{43}$ referred to are mounted upon a stationary pin or axis $C^{44}$, attached to the frame-work and the free ends of the cam levers are held in contact with the cam tracts, by means of springs, as shown. The cam tracts and cam levers are so constructed and arranged, that when say fifty bags have been delivered by the paddle wheels against each of the back plates, the back plates and pushers will move rearwardly into alinement with the stationary guides $C^{35}$ on the table $C^{53}$, as is indicated in Fig. 6 for the first set of paddle wheels which has, in its adjustment, received and delivered its full quota of bags to its back-stop $C^{37}$. In Fig. 6 and in the corresponding Fig. 8, it is assumed that the second set of paddle wheels has not completed the delivery of the second half of the bags to the back-stop $C^{40}$, for which reason the latter back-stop and its pusher are not yet in alinement with the corresponding stationary guides $c^{35}$.

As soon as the back-stops and their pushers have been shifted so as to bring the two sets of fifty bags opposite the stationary guides $C^{35}$ and $c^{35}$, the bags are in position to be pushed through the same guides, into the so called turn-overs, which are separately illustrated in Figs. 16 and 17.

In order to keep the series of bags even at top and bottom, as they are delivered from the paddle wheels to the back-stops or back plates $C^{37}$ and $C^{40}$, the corresponding shafts $B^4$ are each provided with an eccentric $C^{49}$ (see Figs. 1, 2, 4 and 5), to which is attached a connecting rod $C^{50}$, which through the intermediacy of an arm rocks the shaft $C^{51}$. A lever $C^{52}$ is fastened to the rock shaft $C^{51}$ and actuates a connecting rod $C^{54}$, which connecting rod, through lever $C^{55}$ actuates the vertical rock shafts $C^{56}$ which are provided with the arms or levers $C^{57}$, $C^{58}$ (see Figs. 8 and 9), each of these arms or levers $C^{57}$, $C^{58}$, coöperates with an oppositely disposed arm $C^{57}$, $C^{58}$. Additional arms $C^{53}$, likewise mounted upon the rock shaft $C^{51}$ and rocking therewith coöperate with the levers $C^{57}$, $C^{58}$, so that the bags receive a succession of taps or slight blows on their side and top edges, serving to keep them in any desired alinement.

The two sets of bags having been delivered from the paddle wheels and brought into alinement with the stationary guides $C^{35}$, $c^{35}$, they are thereupon pushed forward into the turn-overs $D^{10}$ by the transversely moving pushers $C^{59}$, (see Figs. 4 and 5). These pushers have each a horizontal extension which slides within the guide $C^{60}$. A connecting rod $c^{61}$ connects the pusher to a lever $C^{62}$ supported upon a shaft $C^{63}$ and having a cam-roll $C^{64}$, which is actuated by a cam $C^{65}$ on the shaft $B^{14}$ (see Figs. 2 and 7), suitable springs being provided as shown, for retaining the cam roll in contact with the cam.

The "turn-overs" above referred to, are so called for the reason that they receive the two sets of bags from the pushers $C^{59}$ as delivered to them, the bags then stand vertically upon their edges, and turn them over into a horizontal position, so that one of the sets rests upon the other for a portion of their length, thereby constituting a single horizontal pile of one hundred bags made up of the two sets of fifty bags.

In Figs. 16 and 17, the "turnover" is shown in its receiving position. It consists primarily of a bed plate D to which are attached the horizontal plates $D^2$ which act as supports for the outer or overlapping turns of the bags when they are brought into the horizontal position. Rods $D^{13}$, forked at their upper ends, are attached at their lower ends to levers $D^{14}$, which levers are provided with cam rolls $D^{15}$ actuated by cams $D^{16}$ mounted on the shaft $B^{14}$. The forked or yoke portions of the rods $D^{13}$ are connected to the crank arms $D^{12}$, pivoted at $D^6$ and having extensions $D^7$, $D^8$ to which are fastened the plates $D^9$ which serve as guides for the slides $D^{10}$. One of the slides $D^{10}$ has attached to it a resilient plate $d^{10}$, which is so shaped as to bear upon the bags above the region where they overlap when in horizontal position, and in such manner as not to interfere with the operation of the device which subsequently pushes the bags from the turn-over into one of the drying boxes, hereinafter described. A lever $D^{11}$ connects each plate $D^{10}$ with a fulcrum pin $D^5$ supported in the bearings $D^3$. It will now be evident that when the turn-over has received the two sets of bags, and the rods $D^{13}$ are forced downward by the operation of the cams referred to, the consequent downward swinging of the crank arms $D^{12}$ will result in bringing the extensions $D^7$ into a horizontal position. The cams are so timed that one of them will complete its operation before the other, with the resultant effect that one of the sets of fifty bags will be brought into horizontal position and immediately thereafter the other set will likewise be brought into a horizontal position, in such manner that the free ends of the one set will overlap the free ends of the other to the extent of say half the length of the bags, these overlapping portions resting upon and being supported by the plates $D^2$. In the construction illustrated, the left hand set of bags will be the overlapping set, for which reason, the arm $d^{10}$ is attached to the left hand plate $D^{10}$. The turned-down end of the arm $d^{10}$ will compress the horizontal pile of bags, as above noted, at their overlapping portions and somewhat beyond the center. This point of bearing of the turned down end of the plate $d^{10}$ is of advantage for the reason that it enables the vertical fingers of the discharging device to clear the main body portion of the plate $d^{10}$ in expelling the pile of bags from the turn-over into the drying box. The discharging device, referred to, consists of a horizontal strip $D^{19}$, sliding in a groove $D'$ of the bed plate D, said horizontal strip bearing the vertical strip $D^{18}$, to which is attached a cross piece $D^{17}$ having upon it the vertical fingers above mentioned. The strip $D^{19}$ is attached by a connecting rod to a lever $D^{20}$, having upon it a cam roll, which is actuated by a cam $D^{21}$ mounted upon the shaft $B^{14}$. It will also be noted that, as the turn-over brings the bags into the horizontal position, the levers $D^{11}$ will slide the plates $D^{10}$ inwardly, so as to compress each set of bags, thereby making the resultant pile or package more compact and consequently enabling it to be more readily introduced into the appropriate drying box. The bags, as they discharge from the turn-over are still somewhat moist, inasmuch as they are fed into the machine, as they issue from the paper bag making machine. It is found desirable, therefore, to permit the packages to dry to a greater or less extent at this stage of the operation, i. e. immediately before they are enveloped with a packaging strip or band. For this purpose, each horizontal pile as it is discharged from the turn-over is received in an appropriate drying box, the drying boxes employed being arranged in two vertical series or columns $E^5$, as shown more fully in Figs. 2 and 24. One of these vertical series of drying boxes is mounted to slide vertically upon the stationary guides E, and the other series of drying boxes is mounted to slide vertically upon the stationary guides e, these guides being held in position at the top by the cross pieces $E'$ and at the bottom by the cross pieces $E^4$, which latter are supported upon the bed plate D. Brackets $E^3$ support the top plate $E^2$ from the cross pieces $E'$, these brackets $E^3$ being so arranged with respect to the edges of the cross pieces $E'$ and $E^2$ as to guide the drying boxes when transferred from one of the vertical columns to the other. The uprights e extending slightly above the cross pieces $E'$ serve as stops to limit the movement of the drying boxes during the shifting operation and to bring them into alinement with the other boxes of the series to which they are successively shifted.

As shown more fully in Figs. 18 to 23, the drying boxes are made up of top and bottom pieces $E^6$, supported by and fastened to the side walls or ends $E^7$ which latter are provided with lugs $E^8$, $E^9$. These plates are provided with grooves $e^{27}$ for the purpose of permitting the passage of the uprights of the discharging cross piece $D^{23}$ (see Fig. 24$^a$), said discharging cross arm being mounted upon the frame $D^{22}$ which in turn is supported upon the slide $D^{19}$. The lugs $E^8$, $E^9$, straddle the uprights E and e, thereby holding the boxes in alinement as they are raised in one of the columns and lowered in the other. The lugs $E^9$, furthermore, have the function of serving as stop lugs in the transfer of the boxes from one column to the other, and also as the points of application of the shifting levers or pushers which effect this transfer. As shown in Figs. 19 and 21, the uprights E and e are cut away or recessed at their bottom portions to permit the passage of the lugs and also to give clearance for the lower pusher.

By reference to Figs. 2 and 24, it will now be noted that the arrangement of the drying boxes and their shifting is such that the lowermost box of the series proximate to the turn-over receives the horizontal pile of bags ejected from the turn-over. The said box is then raised and held in the raised position. In the meantime, the ejector $D^{23}$ has discharged the bags from the lowermost box of the other series. Thereupon the said second series is lowered until the empty box is on a level with the vacant space formerly occupied by the lower box of the first series, and the said empty box is then shifted into this vacant space, and simultaneously the topmost box of the first series is shifted to the top of the second series. By this expedient, a sufficient period of transit is provided for each of the boxes from the time it receives its charge of bags to the time when the bags are ejected therefrom, to permit the bags to be dried to the desired degree, each box advancing step by step upwardly in the first series and downwardly in the second series, as shown.

The mechanism for raising and lowering the drying boxes consists of levers $E^{12}$ to the opposite ends of which are secured connecting rods $E^{17}$, $E^{30}$, the former being operatively connected at its lower end with suitable devices for raising the column of drying boxes proximate to the turn over and for holding said column in such position, and the latter being provided with suitable devices for sustaining the other column of drying boxes in elevated position and subsequently lowering the same. The shaft $E^{11}$ to which the levers $E^{12}$ are connected is journaled in the standard $E^{10}$ forming a part of the frame and is oscillated by means of a lever $E^{13}$ attached thereto, said lever $E^{13}$ being flexibly connected by a rod $E^{14}$ with a lever $E^{15}$ that is provided with a cam roll which coöperates with the cam $E^{16}$ attached to horizontal shaft $B^{17}$.

To the lower end of the connecting rod $E^{17}$ is attached a guide member $E^{18}$ which slidingly engages the drying box guide E. Secured to said guide member $E^{18}$ is a member $E^{19}$ which is provided with a latch pocket $E^{20}$ in which is housed a reciprocating latch $E^{21}$, the latter having a recess to receive the latch actuating spring $e^{23}$. Mounted upon cross piece $E^4$ at the base of the upwardly moving column of drying boxes is a member $E^{23}$ to which is pivotally attached a bell crank lever $E^{25}$, the upwardly extending arm $E^{26}$ of which is adapted to engage the under side of the lug $E^8$ of the drying box and to support the latter in elevated position, and the other arm $E^{28}$ of which bears upon a spring $E^{29}$ seated upon a horizontally extending portion of member $E^{23}$. For the purpose of limiting the inward movement of the arm $E^{26}$ of lever $E^{25}$ under the influence of the spring $E^{29}$, said lever $E^{25}$ is provided with a transversely extending lug $E^{27}$ which is adapted to contact an upwardly extending lug or finger $E^{24}$ with which the member $E^{23}$ is provided. It will now be noted that as the connecting rod $E^{17}$ moves upwardly the lug $E^8$ of the lowermost drying box $E^5$, is engaged by the corresponding end $E^{22}$ of the latch $E^{21}$ and that the said box, together with those superposed upon it, is raised to the height of the upper end of the arm $E^{26}$ of the supporting latch or lever $E^{25}$, when such arm moves under the lug $E^8$ and supports the column of drying boxes in an elevated position. Upon the downward movement of the connecting rod $E^{17}$ the lever $E^{21}$ is forced inwardly by engagement with the lugs $E^9$, the under side of the end $E^{22}$ of said latch $E^{21}$ being slightly beveled for this purpose.

Pivotally attached to the lower end of the rod $E^{30}$ is a guide member $e^{18}$ movable vertically upon the drying box guide $e$ (see Figs. 21, 22, 23). Suitably secured to the member $e^{18}$ so as to move therewith is a member $e^{19}$ which is provided with a chamber $e^{20}$ for the reception of a sliding latch $e^{21}$, said latch $e^{21}$ having a transversely extending stud $E^{31}$ projecting outwardly through a slot which intersects the latch pocket $e^{20}$. The outer end of the stud $E^{31}$ is engaged by the forked end of the latch retracting lever $E^{35}$, which is pivoted at its lower end by a pin $E^{34}$ to the member $e^{19}$ and which is provided with a cam lug $E^{36}$ adapted to engage the cross piece $E^4$. Journaled on the stud $E^{31}$ and interposed between the forked end of the lever $E^{35}$ and the member $e^{19}$, is a cam roll $E^{32}$, which, near the end of its upward travel, engages the cam $E^{33}$ secured to the guide $e$, thus causing the end $e^{22}$ of of the latch $e^{21}$ to be forced under the guide lugs $E^8$ upon the drying box. When the drying box $E^5$ has been lowered the cam lug $E^{36}$ upon the latch retracting lever $E^{35}$ engages the cross piece $E^4$, turning the said lever upon its pivot pin $E^{34}$ and thus positively retracting the latch $e^{21}$. As the rods $E^{17}$ and $E^{30}$ attached to the levers $E^{12}$ simultaneously move in opposite directions, the drying boxes of one column are raised at the same time those of the other column are lowered, and by reason of the form of the cam $E^{16}$ there is a comparatively long interval of rest intervening between successive movements of the columns, thus affording ample time for forcing the bags into and out of the drying boxes and for transferring the drying boxes from one column to the other.

For the purpose of transferring drying boxes from one column to the other, a transfer lever $E^{45}$ is provided. Attached to the opposite ends of the transfer lever are rods $E^{46}$, $e^{46}$, which are respectively connected to the top and bottom pushers $E^{47}$ and $e^{47}$ that reciprocate horizontally in the guides $E^1$, $E^4$. These pushers are adapted to contact the lugs $E^6$ upon the drying boxes to cause the latter to be transferred from the top of one column to the top of the other column, or from the bottom of one column to the bottom of the other column, as the case may be. As a means of actuating the transfer levers $E^{45}$ and attached pushers, the horizontal shaft $E^{37}$ has secured thereto a lever $E^{38}$ which, through rod $E^{39}$, is connected to the end $E^{40}$ of bell crank lever $E^{41}$, the latter being suitably pivoted on the frame and being provided with a cam roll which contacts cam $E^{42}$ upon the shaft $B^{17}$. The shaft $E^{37}$ is also provided with a lever $E^{43}$ to the end of which is attached spring $E^{44}$ which, operating through the shaft $E^{37}$, returns the transfer levers $E^{45}$ and attached pushers to their initial positions after the drying boxes have been transferred. The cam $E^{42}$ upon the shaft $B^{17}$ is so related to the cam $E^{16}$ upon the same shaft that the transfer levers $E^{45}$ are operated to actuate the attached pushers while both columns of drying boxes are in elevated positions.

The transfer levers $E^{45}$ are provided near their lower ends with studs $E^{48}$ which form a pin and slot connection with the strap links $G^8$ which are pivotally connected to portions $g^2$ of the reciprocating case. This case receives the package of bags ejected from the lowermost drying box of the descending column and transfers it to the piling plunger J.

The mechanism just described for storing and drying the bags without interfering with the continuous operation of the packaging machine as a whole, is not claimed herein, but forms the subject of my divisional application. Serial No. 377,680, filed June 7, 1907.

Extending between the transfer levers $E^{45}$ is a rod or shaft $E^{49}$ having thereon a bracket to which is suitably secured a knife $F^{29}$ (see Figs. 25, 26, 27, 28, 29, 30), said knife co-acting with a knife $F^{28}$ attached to a bracket connected to the frame. By the coöperation of these knives $F^{28}$ and $F^{29}$, the band of paper is slitted, as indicated at $f^{28}$, at proper intervals (see Fig. 29ª) so that it may be subsequently separated into proper length to encircle a package of bags, as the latter is forced from the drying box into the reciprocating transfer case. One of the transfer levers $E^{45}$ is further provided with a boss $E^{50}$ to which a cam roll is attached by means of a stud. This roll, through intermediate mechanism hereafter to be described, controls the operation of the piling plunger J, which receives the packages of bags as they are ejected from the transfer case, so timing the movement of the said piling plunger as to allow it to receive a package of bags and to lift such package and any other packages which may be superposed thereon to the height of the top of the transfer case (see Figs. 24, 26, 27).

The band of paper $f$ which is passed around each package of bags is supplied from a roll F journaled in suitable standards of the machine frame, said paper passing from said roll over a suitable guide roll, thence between a paste disk $F^3$ and a downwardly movable plate $F^{10}$, and thence between rolls $F^7$ and $f^7$ through tubes $F^{27}$ and $f^{27}$, past the knives $F^{28}$ and $F^{29}$, so that the lower portion of said band depends between the transfer case and the adjacent drying box $E^5$. The several devices constituting the paste applying mechanism are driven from shaft $B^{37}$ through worm $B^{38}$ and worm wheel $B^{39}$, which is attached to a shaft $B^{40}$ journaled in the standard $F^6$. Attached to the shaft $B^{40}$ is a spur gear $B^{41}$ which drives the spur gears $B^{42}$ and $B^{43}$, the former being loosely mounted on shaft $F^5$, and the latter being attached to the shaft $F^2$ of the paste disk $F^3$. The shaft $F^2$ of the paste disk is supported in bearings upon the paste pot $F^4$ in such manner as to permit the paste disk $F^3$ to revolve therein. The shaft $F^5$, which is also journaled in the standard $F^6$, has secured thereto on the opposite side of the standard from the gear $B^{42}$ a band feed roll $F^7$ which is peripherally grooved so as to avoid contact with the paste upon the paper band, and which is also provided with guide flanges for the said band. Mounted in a yoke-like bracket upon the standard $F^6$ is a feed roll $f^7$ which engages the feed roll $F^7$ and is frictionally driven thereby, the two rolls thus confining the paper band $f$, so that it is constrained to move in the direction of its length without buckling.

The paste is intermittently applied to the paper band at proper intervals by means of the plate $F^{10}$ which forces the band into contact with the paste disk $F^3$. To accomplish this, the plate $F^{10}$ is suitably secured to one end of a bell crank lever $F^9$ which, upon its other end, carries a lug or pin $F^{13}$, said lever $F^9$ being pivotally mounted upon a bracket lug $f^6$ of the standard $F^6$ and being provided with a stop-lug $F^{11}$ which, by coming in contact with a portion of the bracket lug $f^6$, limits the extent of movement of the lever $F^9$ and attached plate $F^{10}$ away from the paste disk $F^3$ and maintains the lug $F^{13}$ in the path of the pin $F^8$. A reciprocating plug housed within the bracket lug $f^6$ and operated upon by a spring $F^{12}$, also housed within said bracket lug, normally maintains the plate $F^{10}$ out of contact with the paste disk by engaging a lug upon the lever $F^9$ adjacent to said plug. When the pin $F^8$ upon the feed roll $F^7$ revolves to a position in which it engages the lug $F^{13}$ upon the lever $F^9$, the latter is rotated to cause the plate $F^{10}$ to press the paper band into engagement with the paste disk, the spring $F^{12}$ being thereby compressed. After the pin $F^8$ has moved sufficiently far to withdraw its support from the lug $F^{13}$, the said spring actuates the lever $F^9$ to lift the plate $F^{10}$, thus allowing the paper band to pass between said plate and the paste disk without any more paste being applied.

In order to so drive the feed rolls $F^7$ and $f^7$ that they may be automatically stopped if no bags are in the lowermost box $E^5$ of the descending column, a disk $F^{15}$ is connected by a hub $F^{14}$ to the spur gear $B^{42}$. This disk $F^{15}$ has journaled therein a pin $F^{16}$ having upon its ends lugs $F^{17}$ and $F^{18}$ lying upon opposite sides of the said disk. Adjacent to the disk $F^{15}$ and secured to rotate with the shaft $F^5$ is a somewhat smaller disk $F^{19}$, which is provided with a lug $F^{20}$, extending in the direction of the shaft $F^5$ and adapted to engage the lug $F^{18}$ when the latter is in the normal, or driving position. At such time, it will be observed, the feed roll $F^7$ attached to the shaft $F^5$ is driven through the loosely mounted spur gear $B^{42}$ and attached disk $F^{15}$, and disk $F^{19}$, which latter is secured to the said shaft, the dog $F^{18}$ being then in engagement with the lug $F^{20}$ upon the disk $F^{19}$. The telltale, or device for automatically stopping the band feed roll $F^7$ when no bags are being delivered from the drying box, consists of a lever $F^{26}$ pivotally mounted at $F^{30}$ to one of the drying box guides $e$, the upper end of said lever being connected with a slide $F^{21}$ by means of pins $F^{23}$ and $F^{25}$ and intermediate strip or link $F^{24}$, and the lower arm of said lever $f^{30}$ having attached to it by a stud at $F^{32}$, an arm $F^{31}$ which is provided with an inwardly extending finger $f^{31}$ and which is adapted to have a slight adjustment with respect to the arm $f^{30}$ of lever $F^{26}$ by reason of its connection to the said arm $f^{30}$ through the pin $F^{33}$ and slot $f^{33}$, as shown. The slide $F^{21}$, which is supported in the guide $f^{21}$ attached to the standard $F^6$, is provided with a bracket or finger $F^{22}$, secured to which is a transversely extending pin $f^{22}$, said pin $f^{22}$ being adapted to be moved into and out of the path of the lug $F^{17}$ pivoted on the disk $F^{15}$. The upper arm or lever $F^{26}$ is provided with a cam roll which coöperates with the cam $F^1$ secured to the shaft $B^{40}$, and the lower arm $f^{30}$ of said lever has attached thereto a spring $F^{34}$, the other end of which is attached to a portion of the frame. The shaft $B^{40}$ makes one revolution while the disk $F^{15}$, mounted upon the shaft $F^5$, makes four revolutions, and, since the cam $F^1$ has a long dwell corresponding to several (say three) revolutions of the disk $F^{15}$, it follows that the finger $F^{22}$ remains in the position shown in Fig. 40 during the interval that the cam roll upon the lever $F^{26}$ follows the high portion of the said cam $F^1$. During this interval, the dog $F^{18}$ is in such a position that it does not come into engagement with the lug F²⁰ upon the disk F¹⁹, and there is consequently no feeding of the paper band. A second position of these parts in which there is no feed of the paper band, occurs when there are no bags in the drying box adjacent to the finger f³¹ at the time the depressed portion of the cam F¹ comes into apposition with the cam roll upon the upper arm of the lever F²⁶. At such time, the spring F³⁴ causes the transversely extending finger f³¹ to enter the drying box, and the upper arm of the lever F²⁶ to move inwardly the full extent of its travel, thus moving the slide F²¹, with its bracket F²² and attached pin f²², into such a position that the said pin f²² will clear the lug F¹⁷ and permit the dog F¹⁸ to clear the lug F²⁰ upon the disk F¹⁹.

A third position which the band feeding may assume is caused by the presence of the bags in the drying box E⁵ adjacent to the finger f³¹, such bags, by engagement with the finger f³¹, preventing the cam roll upon the lever F²⁶ from following the lowermost path of the cam F¹. In this position the pin f²², carried by the bracket F²², engages the inner side of the lug F¹⁷ as the disk F¹⁵ revolves, and throws the dog F¹⁸ into driving engagement with the lug F²⁰ of the disk F¹⁹, thereby causing the paper band to be fed. As now, through the continued rotation of the cam F¹, the cam roll upon the lever F²⁶ returns to the high part or dwell of said cam, the finger F²² is moved outwardly to such a position that, upon the next revolution of the disk F¹⁵, the outer surface of the lug F¹⁷ comes into contact with the pin f²², carried by said finger, and, as shown in Fig. 40, causes the dog F¹⁸ to be withdrawn from driving engagement with the lug F²⁰ upon the disk F¹⁵, thereby permitting the band feed roll F⁷ to stand stationary.

The band of paper after passing between the rolls F⁷ and f⁷, passes downwardly through the flattened tubes F²⁷ and f²⁷ between the knives F²⁸ and F²⁹. The tube F²⁷ is supported by the standard F⁶ and its upper end curves inwardly toward the rolls F⁷ and f⁷ to receive the paper band as it passes between the latter. The tube f²⁷ is supported by a girt and by the bracket of the knife F²⁸. As the package of bags is pushed from the drying box E⁵ by the ejector D²⁸, the knife F²⁹, which is operated through the transfer levers E⁴⁵, engages the knife F²⁸, and the band of paper is partially separated from the strip f, and passes around the package of bags as the latter moves into the transfer case.

The case by which successive packages of bags are transferred from the drying boxes E⁵ to the piling plunger J, is mounted to reciprocate horizontally upon a platform G which is suspended by brackets from a girt attached to the frame (see Figs. 26 and 27). Platform G also acts as a support and guide for the slides H forming a part of the device which pushes the pile of (say five) packages of bags from the piling plunger J to the platen K.

The transfer case is formed of guide plates G¹ which are connected by a transversely extending plate G², the ends g² of which extend downwardly and are pivotally connected to the straps or links G⁸ operatively attached to the transfer levers E⁴⁵. Each of the guide plates G¹ is provided with a lug g¹ which is adapted to engage a hook H² to actuate the device for pushing the packages of bags from the piling plunger J to the platen K. Attached also to the transversely extending plate G² are spaced or separated strips g⁴ which extend rearwardly sufficiently far to occupy a position in vertical alinement with the piling plunger J and to form a temporary support for those packages of bags which have been delivered to the piling plunger but have not been forced onto the platen K. Secured to the members G¹ of the case is a transversely extending plate G³ having depending ends to which is attached a cross bar g³, the latter having at its center a recess or offset G⁶ (see Figs. 42 and 44) which provides clearance for the tucking fingers j⁸ by which the encircling of the paper band around the package of bags is completed. To the cross bar g³ are fastened strips G⁴ which form the bottom of the case. The spaced strips G⁴ are of less length than the corresponding strips g⁴ forming the top of the case, thus permitting the top of the piling plunger J to be brought in the same plane with the strips G⁴ when a package of bags is transferred from the case to the piling plunger. For the purpose of holding the paper band while a package of bags is being forced into the transfer case from a drying box E⁵, by which action the said band is formed around three sides of the package, the cross bar g³ has attached to it strips G⁷ which form a portion of the bottom of the case and which are provided with rounded ends g⁷ (see Fig. 43) adapted to hold the paper band against the side of the drying box. Attached or formed upon the plate G² of the transfer case are separate plates G⁵, which, when the case is at the drying box E⁵, overlap the upper portion E⁶ of the latter, and form a guide for the paper band.

The mechanism which insures that five packages of bags shall be delivered to the piling plunger J before the said packages are transferred to the platen K, and which also controls the operation of the platen K and mechanism operative to complete the bundling, may now be described. A shaft $G^{11}$ is supported in bearings $G^{10}$ attached to the transverse plate $G^2$ of the transfer case. This shaft is provided with an arm or finger $G^{12}$, which passes into the transfer case through a hole $G^9$ in the plate $G^2$ thereof, and said shaft is further provided with a hook $G^{13}$ which is adapted to successively engage pins $g^{14}$ which border the periphery of a wheel or disk $G^{14}$ supported on a stud $G^{15}$ attached to the frame. The hub of the wheel is provided with a cam $g^{15}$ which, by coöperating with a cam roll upon the end of lever $G^{17}$, operates the shaft $G^{18}$ and the lever $g^{17}$ attached to the latter. The shaft $G^{18}$ is journaled in suitable brackets upon the frame. $G^{16}$ is a hook which is pivoted by a stud to a bracket secured to a girt of the frame. $B^{21}$ is a gear wheel which is journaled by a pin $b^{21}$ to the frame, and which is provided with a spring pressed slide $G^{20}$ adapted to move in the guide $G^{19}$. The slide $G^{20}$ is provided at its outer end with a lug or stop $g^{20}$ which extends outwardly beyond the face of the gear wheel $B^{21}$ through a slot therein, and said slide is also provided with a pin $G^{21}$ extending through the opposite face of the said gear at such a point that it may be engaged by the end of the lever $g^{17}$. Keyed to the shaft $B^{17}$ is a disk $G^{22}$ having a lug $g^{22}$ which, when in engagement with the dog $g^{25}$, drives the gear $B^{18}$ to which the latter is attached. Loosely mounted on the shaft $B^{17}$ is a hub $G^{23}$ having an arm $g^{23}$ which is adapted to contact the lug $g^{20}$ upon the slide $G^{20}$ when the latter is not retracted. The gear $B^{18}$ which is loosely mounted upon the shaft $B^{17}$ is provided with a pin $G^{26}$ adapted to control the extent of rotation of the hub $G^{23}$ and attached finger $g^{23}$ under the influence of the spring $g^{24}$, which bears upon said hub and gear; and the said gear is also provided with a dog $g^{25}$ which is pivotally attached thereto at $G^{25}$. Gear $B^{18}$, through intermediate gear $B^{19}$, which meshes with the gear $B^{22}$, drives the shaft $B^{23}$ which controls the operation of the platen K and the mechanism subsequently acting upon the bundle of bags. The hub of the gear $B^{19}$ is also provided with a gear $B^{20}$ which meshes with the gear $B^{21}$ carrying the clutch controlling slide $G^{20}$.

It will now be understood that when there are no bags in the transfer case, or after the bags have been pushed therefrom to the piling plunger J, the finger $G^{12}$, acting through the attached shaft $G^{11}$, permits the hook $G^{13}$ to occupy a position out of contact with the pins $g^{14}$ of the wheel $G^{14}$. The number of pins $g^{14}$ upon this wheel or disk correspond to the number of packages of bags that it is desired to form into a single bundle (say five). At the end of the forward stroke of the transfer case one of the pins $g^{14}$ is brought into such position that the hook $G^{16}$ may gravitate into engagement therewith. On the return of the transfer case for another package of bags, and upon such package being forced into said case, the finger $G^{12}$ is forced upwardly and the hook $G^{13}$ thereby comes in contact with the hook $G^{16}$, forcing the latter from engagement with the pin $g^{14}$ and itself engaging such pin. Thereafter, upon the forward movement of the case, the disk $G^{14}$ is driven a portion (say $\frac{1}{5}$) of a revolution. When the wheel $G^{14}$ has made one complete revolution, which it will be noted can only be accomplished after the desired number of packages of bags have been passed through the transfer case, the cam $g^{15}$, attached to or forming a part of the hub of said wheel, engages the cam roll upon the end of the pivoted lever $G^{17}$ and actuates the shaft $G^{18}$ and attached lever $g^{17}$. This movement of the lever $G^{17}$ causes the slide $G^{20}$ of the gear $B^{21}$ to be retracted, thus permitting the arm $g^{23}$ of the hub $G^{23}$ to pass the stop $g^{20}$ upon the lower end of said slide and, under the action of the spring $g^{24}$, to rotate into engagement with the stop pin or lug $G^{26}$ upon the gear $B^{18}$. When the hub $G^{23}$ is in this position, the lug $g^{22}$ upon the disk $G^{22}$ engages the dog $g^{25}$ attached to the gear $B^{18}$, thus driving said gear and the gears which it controls. When the gear $B^{21}$ has made a complete revolution, the cam $g^{15}$ upon the hub of the disk $G^{15}$ will, if the full number of packages of bags have passed through the transfer case, again actuate the levers $G^{17}$ and $g^{17}$ to move the lug $g^{20}$ of the slide $G^{20}$ out of the path of travel of the arm $g^{23}$ of the hub $G^{23}$, thus permitting the continued driving of the gear $B^{18}$ and the gears dependent thereon for their movement. If, however, the requisite number of packages have not passed through the transfer case, the cam $g^{15}$ will not be in a position to actuate the levers $G^{17}$ and $g^{17}$ at the time the arm $g^{23}$ of the hub $G^{23}$ comes into contact with the lug $g^{20}$ upon the slide, the result being that the arm $g^{23}$ of the hub $G^{23}$ compresses the spring $g^{24}$ and permits the gear $B^{18}$ to so move relatively to the hub $G^{23}$ that the dog $g^{25}$ is forced out of engagement with the lug $g^{22}$ upon the disk $G^{22}$ and moves in behind the lug $G^{24}$ upon the hub $G^{23}$. The gear $B^{18}$ and all parts of the mechanism controlled thereby are thus stopped until the requisite number of packages have passed through the transfer case.

For the purpose of delivering the packages of bags from the transfer case to the piling plunger J, an ejector, which comes into operation when the transfer case is in juxtaposition to the said piling plunger, is employed. This ejector consists of an arm $I^1$ which at one end is pivotally attached to a sliding bracket I mounted upon a girt attached to the machine frame, and which is provided at its other end with a cross bar to which are attached upwardly extending strips or fingers I³, as shown. The arm I¹ of the ejector is also provided intermediate its length with a cam roll I² which, by coöperation with the cam I⁵ mounted upon the girt upon which the bracket I slides, causes the arm I¹ to rise, thus inducing the fingers I³ attached thereto to come in at the rear of the transfer case and force the package of bags onto the piling plunger J. The sliding bracket I is also provided with a lug I⁴ to which is pivotally attached a connecting rod I⁶ which is, in turn, flexibly secured to a lever I⁷, the latter being attached to the shaft I⁸ and being provided with an arm to which the spring $i^8$ is secured (see Figs. 2, 25, 25ª, 26, and 27). Attached also to the shaft I⁸ is a lever $i^7$ having a cam roll which engages a cam I⁹ secured to the shaft B¹⁷, said shaft B¹⁷, as before stated, controlling the operation of the transfer levers E⁴⁵ and mechanism actuated thereby.

The piling plunger, upon which the packages of bags are delivered from the transfer case, is mounted to reciprocate vertically in such manner that it receives the package of bags ejected from the case, elevates the said package against the action of a follower weight and any other packages which may be superposed thereon to the height of the top of the case, retains said packages in such elevated position until the strips $g^4$ of the said transfer case come into position to support such packages, then lowers until it registers with the bottom of the case, receives a succeeding package of bags, and finally forms a support for the several packages when the transfer case is returned to the column of drying boxes E⁵. This cycle of operations is repeated with each reciprocation of the transfer case.

The piling plunger J is comprised of a vertical standard J¹ which is mounted to slide in guide-ways attached to a girt of the frame, said standard J¹ having at its upper end a cross bar bearing strips or plates $j$, which are so spaced that, when the piling plunger is at the upper end of its stroke, they lie between the separated plates $g^4$ forming the top of the transfer case, thereby retaining the packages of bags in such an elevated position that the said strips $g^4$ may be brought into position to support the bags when the support of the piling plunger is withdrawn. The lower end of the standard J¹ carries a pin J² which engages the forked end of a lever J³, the latter being pivoted to the frame at J⁴ and being provided on the opposite side of its pivot with a counterweight $j^3$ (see Fig. 2) by which the piling plunger J is counterbalanced. Adjacent to the standard J¹ of the piling plunger J is the vertically movable slide J⁶ having at its lower end a pin J⁷ and at its upper end a transversely extending bracket to which are attached vertically extending tucking fingers $j^6$ which are adapted to pass the cross bar $g^3$ of the transfer case at the central offset G⁶ thereof. The pin J⁷ is engaged by the forked end of a lever J⁸ secured to the shaft J⁹. Secured also to the shaft J⁹ is a lever $j^8$ having at its end a cam roll which engages the cam J¹⁰ upon the shaft B¹⁷.

As a means for supporting the piling plunger J in its elevated position, a dog J¹² is attached to a shaft J¹¹ which is journaled on the machine frame. The shaft J¹¹ has attached thereto a lever $j^{12}$ the upwardly extending arm of which engages the cam roll E⁵⁰ upon the transfer lever E⁴⁵, and the downwardly extending arm of which is attached to a spring secured to the frame. A bracket J⁵, likewise attached to the frame, affords a support for the lower end of the vertical standard J¹ of the piling plunger when the latter is in its lower position. It will now be noted that when the cam J¹⁰ upon the shaft B¹⁷ actuates the lever $j^8$, the lever J⁸, through the pin J⁷, causes the slide J⁶ to rise, whereby the bracket which carries the tucking fingers $j^6$ is caused to engage the cross-bar of the piling plunger at the top of the standard J¹ and to raise said piling plunger to such a height that the dog J¹² upon the shaft J¹¹ may move under the end of the standard J¹ and support the piling plunger. When the cam roll E⁵⁰ upon the transfer lever E⁴⁵ engages the arm $j^{12}$ attached to the shaft J¹¹, the dog J¹² is moved out of supporting engagement with the sliding standard J¹ and the latter drops until its lower end rests upon the support J⁵, at which time the piling plunger J is in position to receive from the transfer case another package of bags. It will also be noted that as the slide J⁶ carrying the tucking fingers $j^6$ moves upwardly, said tucking fingers come in contact with the loose end of the paper band and carry it up into place so that the band completely encircles the package.

For the purpose of preserving the alinement of the packages of bags delivered to the piling plunger J, a follower-weight X having a plate X⁴ which is adapted to lightly rest upon the topmost package of bags is provided. This piling plunger follower-weight X is movable vertically up and down in alinement with the piling plunger, being for this purpose slidably mounted upon an upright guide X⁵ which is secured to the machine frame at its bottom by a bracket such as $x^5$ and at its top by a similar bracket $x^{15}$.

Pivoted to the bracket $f^{28}$ at $x^1$ is a cam plate X³ upon which, at a point adjacent to its upper edge, is journaled a lever X¹ bearing a latch X², said latch X² having at its upper end a finger $X^3$ which is adapted to engage and support the guided portion of the follower weight X and having at its lower end an arm or plunger $X^6$ which is adapted to be actuated by a roller $X^7$ mounted upon the shaft $E^{49}$.

When the requisite number of packages of bags have been assembled in a pile upon the piling plunger J, the piling plunger follower weight X, which rests upon the topmost package, is in such position that the finger $X^3$ of the latch $X^2$ stands under an extended portion of said follower weight. At this time, which is just prior to the delivery of the pile of packages from the piling plunger, the shaft $E^{49}$ and its roller $X^7$ move toward the latch $X^2$, thereby elevating the cam plate $X^8$ together with the lever $X^1$ and latch $X^2$ and thus lifting the follower weight from engagement with the pile of packages a moment or two before said packages are delivered from the piling plunger. The continued movement in the same direction of the shaft $E^{49}$ causes the roller $X^7$ thereof to engage the lower end $X^6$ of the latch $X^2$, after the packages have been delivered, thereby tripping the latch $X^2$ and permitting the follower weight to drop to a lowermost position in which it may rest upon the topmost package of the succeeding pile of bags assembled by the piling plunger J.

The device for shifting the pile of packages from the piling plunger to the platen is slidably mounted upon the platform G and consists of slides H having upwardly extending ends $h$ to which are suitably attached plates $H^4$ adapted to engage the bags. Mounted upon the slides H in bearings $H^1$ is a shaft $h^3$ having upon its opposite ends upwardly extending hooks $H^3$ which are adapted to engage lugs $g^1$ of the transfer case, and having upon one end an arm or finger which, by engagement with the upper end of a vertically extending rod $H^5$, controls the movements of the said hooks and shaft. The rod $H^5$ is supported upon a lever $H^6$ which is secured to a shaft bearing an arm $h^7$ which is provided with a cam roll that engages the cam $H^7$ keyed to the shaft $B^{26}$. This shaft $B^{26}$ is driven from gear $B^{18}$ through the clutch mechanism heretofore described, the intermediate gears $B^{19}$ and $B^{22}$, shaft $B^{23}$, and gear $B^{24}$ which drives the gear $B^{25}$ attached to the shaft $B^{26}$. It thus results that when the desired number of packages of bags have been placed upon the piling plunger, the cam $H^7$ will permit the levers $h^7$ and $H^6$ to so move that the rod $H^5$ controlling the movement of the hooks $H^3$ is allowed to drop from supporting engagement with the finger upon the end of the shaft $h^3$. This permits the hooks $H^3$ to engage the lugs $g^1$ of the transfer case and to be drawn forward by said case, thereby causing the plates $H^4$ to push the packages of bags from the piling plunger J to the platen K. As the transfer case returns to the column of drying boxes, the lugs $g^1$ thereon engage the lugs $H^2$ forming a part of the journals $H^1$ in which the shaft $h^3$ is secured and the pusher slides H are drawn back to their initial position, at which time the cam $H^7$ has caused the rod $H^5$ to move upwardly to engage the finger upon the end of the shaft $h^3$ and elevate the hooks $H^3$, so that, upon the next movement of the transfer case, the lugs $g^1$ clear said hooks.

After the packages of bags have been transferred to the platen K they are elevated by the latter and subjected to pressure while in the elevated position. During their upward movement a band of paper, which has been cut to the proper length to encircle the bundle of packages and to which a label has been affixed, is caused to partially encircle the said bundle. Binding twine is tied around the bundle and the band of paper is caused to be formed completely around the same while the packages are retained under pressure in the elevated position.

K is the platen which receives the pile of (say five) packages of bags when they are pushed from the piling plunger J by the plates $H^4$. This platen is supported on one side only by a slide $K^1$ which has attached to it a plate spring $K^2$ extending outwardly under the platen. The slide $K^1$ is movable vertically in the guide $K^3$, which is secured to girts attached to the machine frame. $k^1$ is a cross head which is also movable vertically in said guide and which supports the slide $K^1$, said cross head having attached thereto a connecting rod $K^4$ which in turn is flexibly connected to the lever $K^5$ secured to the shaft $K^6$ as shown. The horizontally extending shaft $K^6$, which is mounted in brackets upon the frame and which carries a counterweight $k^5$, is rigidly connected to the cam lever $K^7$ whose cam roll engages the cam $K^8$ (see Figs. 25, 26, 27) loosely mounted on the shaft $B^{17}$. This cam $K^8$ is moved into and out of engagement with the cam roll upon the lever $K^7$ to intermittently actuate the latter by the following mechanism in the following manner. $K^{10}$ is a spring encircling the shaft $B^{17}$ and normally holding the cam $K^8$ out of engagement with the cam roll upon the lever $K^7$. $K^{11}$ (see Fig. 33) is a collar slidingly mounted upon the shaft $B^{17}$ and provided with a key $k^{11}$ passing through a slot in the collar $K^9$ which is rigidly secured to the said shaft. The collar $K^9$ is provided with a laterally extending pin or lug $k^9$ which, by engagement with a corresponding lug upon the cam $K^8$, drives the latter. Pivoted on a bracket at $K^{14}$ is a lever, one arm $K^{13}$ of which is provided with a fork which straddles the shaft $B^{17}$ between the key collar $K^{11}$ and a limit collar $K^{12}$ secured to the shaft, and the other arm $k^{13}$ of which is provided with a cam roll which is actuated by the cam $K^{15}$ upon the shaft $B^{26}$. The shaft $B^{17}$ makes one rotation for each package of bags, and the shaft $B^{26}$ makes one rotation for each five packages of bags. It thus results that when the cam $K^{15}$ actuates the lever pivoted at $K^{14}$ the key collar $K^{11}$ is moved laterally upon the shaft $B^{17}$ and the key $k^{11}$ forces the cam $K^{8}$ into alinement with the cam roll upon the lever $K^{7}$, compressing the spring $K^{10}$ and permitting the lever $K^{7}$ to be operated. The movement of lever $K^{7}$, acting through shaft $K^{6}$ attached lever $K^{5}$ and through connecting rod $K^{4}$, causes the cross heads $k^{1}$ to rise in the guide $K^{3}$, thereby elevating the platen $K$.

$K^{16}$ are guides suspended from girts attached to the frame. Sliding vertically within these guides are blocks $K^{17}$ to which are pivotally attached hooks $K^{18}$ which are adapted to engage the platen $K$ and further elevate the latter. Upon each of the hooks $K^{18}$ is a lug $k^{18}$ which, by engagement with the bottom portion $k^{16}$ of the guide $K^{16}$, causes the hooks to be moved outwardly to permit the platen $K$ to pass. The sliding blocks $K^{17}$ to which the hooks $K^{18}$ are pivoted are attached to cranks $K^{20}$ of the shaft $B^{49}$ by means of links $K^{19}$. The upward movement of the cranks $K^{20}$ permits the hooks $K^{18}$ to engage the platen $K$ and elevate the latter.

The shaft $B^{49}$ with its cranks $K^{20}$ is actuated by the mechanism now to be described. Journaled in brackets $K^{25}$, $k^{25}$ of the frame is a longitudinally movable shaft $B^{46}$ having loosely journaled therein a worm wheel $B^{45}$ which is driven by the worm $B^{44}$ of the shaft $B^{37}$. The shaft $B^{37}$ is driven through the attached gear $B^{56}$ in any suitable manner (Fig. 1). Also loosely journaled upon the shaft $B^{46}$ is a spur gear $B^{47}$ to which is pivotally attached by a pin $K^{30}$ a dog $K^{29}$, said dog having a beveled notch $K^{32}$, a shoulder $K^{31}$ and a portion $K^{32}$ which is adapted to engage a key or feather $K^{26}$ with which the shaft $B^{46}$ is provided. The worm wheel $B^{45}$ is provided with a stud $K^{27}$ extending laterally in a direction to engage the shoulder $K^{31}$ of the dog $K^{29}$ when the latter is supported by the key $K^{26}$ upon the shaft $B^{46}$, and said worm wheel is also provided with a spring pressed latch $K^{28}$ which is adapted to enter the depression $K^{33}$ of the dog $K^{29}$ for the purpose of preventing spur gear $B^{47}$ from forging ahead of the worm wheel $B^{45}$ as the cranks $K^{20}$ move downwardly under the influence of the springs. Encircling the shaft $B^{46}$ is a spring $K^{38}$ which is interposed between the bracket bearing $k^{25}$ of the frame and a collar $K^{37}$ secured to the shaft, said spring tending to move said shaft longitudinally to cause the key $K^{26}$ thereof to be withdrawn from beneath the dog $K^{29}$. Secured to the shaft $B^{46}$ is a collar $K^{34}$ having a lug $K^{35}$ (Fig. 89) which is adapted, by the sliding and rotating movements of the shaft, to engage a lug $K^{36}$ upon the bracket $k^{25}$, thus forming a stop for the said shaft $B^{46}$, and, through spur gears $B^{47}$ and $B^{48}$, retaining the cranks $K^{20}$ of the shaft $B^{49}$ in their upper position. It will now be observed that when the shaft $B^{46}$ is moved to cause a compression of the spring $K^{38}$, the key $K^{26}$ upon the said shaft engages the dog $K^{29}$ and causes the latter to assume such a position that the lug $K^{27}$ of the worm wheel $B^{45}$ may engage the shoulder $K^{31}$ of said dog to thus drive attached spur gear $B^{47}$ and, through the gear $B^{48}$, the shaft $B^{49}$ having the cranks $K^{20}$. By this movement of the shaft the spring-pressed latch $K^{28}$ carried by the worm wheel $B^{45}$ is also permitted to engage the depression $K^{33}$ of the latch $K^{29}$, as heretofore described. When the shaft $B^{46}$ is moved in the opposite direction by the expansion of the spring $K^{38}$ the support of the key $K^{26}$ is withdrawn from the dog $K^{29}$, permitting the latter to move inwardly toward the shaft $B^{46}$, whereby the shoulder $K^{31}$ of the said dog is withdrawn from the path of the lug $K^{27}$ of the worm wheel $B^{45}$ so that the latter no longer drives the spur gear $B^{47}$.

For the purpose of causing a longitudinal motion of the shaft $B^{46}$ against the resistance of the spring $K^{38}$, the bell crank lever $K^{39}$, which is pivotally attached to the frame, bears at one end upon said shaft and has attached to its other end a connecting rod $K^{40}$ which is in turn flexibly secured to the arm $K^{41}$ of a bell crank lever having an arm $K^{42}$ provided with a cam roll engaging the cam $K^{43}$ upon the shaft $B^{26}$. By the operation of the shaft $B^{26}$, which, as heretofore stated, revolves once for each five packages of bags, the cam $K^{43}$ causes the connecting rod $K^{40}$ to actuate the bell crank lever $K^{39}$, with the result that the cranks $K^{20}$ are raised and lowered through the intermediacy of the clutch mechanism.

$K^{21}$ is a guide plate (Figs. 2, 25 and 26) which is secured to the stationary guide $K^{3}$ and which, in conjunction with the plates $H^{4}$ of the device which transfers the packages from the piling plunger $J$ to the platen $K$, guides the packages during a part of their upward movement.

$K^{22}$ and $K^{23}$ (Figs. 48 and 49) are plates or strips which are secured to an attached portion $L^{3}$ of the frame and depend vertically therefrom in such position as to form guides for the packages during the latter part of their upward movement; said plates serve to place the wrapper around the sides of the pile of packages.

Suitably secured to the frame, as by rods as shown, is a spring cap L, between which and the spring seat $L^2$, springs $L^1$ are interposed. When the cranks $K^{20}$ are in their lowest positions, the spring seat $L^2$ engages and is supported by an abutment member $L^3$ which is rigidly mounted upon the frame.

$L^5$ is a package follower which, by means of guide members $l^5$, (Figs. 48, 49, 50) is slidably mounted upon the vertically extending guide $L^4$ attached to the frame. Mounted upon opposite ends of the follower, $L^5$ are shafts $L^6$ each of which is provided with blocks $L^7$ to which string reels $L^8$ are attached. Each of the shafts $L^6$ has also attached to it an arm $L^9$ to which a spring $L^{10}$, that is fastened to the follower is secured. By this arrangement the string reels $L^8$ are permitted to dip to release the binding twine which engages them during a portion of the operation of tying the knot, as will hereafter appear. When the platen K is down, the package follower $L^5$ is supported by the engagement of its guides $l^5$ with pockets $l^4$ at the lower end of the guide member $L^4$, said follower at such time occupying a position in vertical alinement with the platen and sufficiently above the paper bridge $L^{11}$ to afford clearance for the wrapping paper. In this position also the binding twine is caused to engage the string reels $L^8$, being passed over the same through the instrumentality of the needles $Q^7$ and $q^7$. As the platen K rises, the follower $L^5$ is engaged by the topmost package of bags and carried upwardly. This operation causes the string and the wrapping paper to be placed around the top and sides of the pile of packages, the string passing over the string reels $L^8$ of the follower and the paper passing between said follower and the topmost package of bags. When the platen K has thus elevated the package follower $L^5$, the latter engages the spring seat $L^2$, and transmits to the pile of packages the pressure of the spring $L^1$ when the operation of the shaft $B^{19}$, as heretofore described, causes the cranks $K^{20}$ to lift the platen K through the hooks $K^{18}$.

While the platen K is down the wrapping paper $m$ is fed across the opening between the plate guide $K^{23}$ and members $H^4$ so that the subsequent elevation of the packages causes the web of paper to form around the top and sides of the bundle, the depending guides $K^{22}$ and $K^{23}$ assisting in this operation.

In order to carry the web of paper $m$ across the opening between the guide $K^{23}$ and plate $H^4$, a bridge $L^{11}$ is provided. This bridge $L^{11}$ over which the wrapping paper slides is supported to reciprocate horizontally in guides $L^{12}$ which are fastened to parts of the frame. Journaled in brackets is a shaft $L^{14}$ to which is attached an arm or lever $L^{13}$ flexibly connected to the bridge $L^{11}$, said shaft being also provided with a lever $l^{13}$ which is connected by a rod $L^{16}$ with a lever $L^{17}$ which is pivotally mounted upon the frame and which, upon its arm $l^{17}$, is provided with a cam roll engaging the cam $L^{18}$ of the shaft $B^{26}$. A spring $L^{15}$ is attached to a lever on the shaft $L^{14}$ for the purpose of moving the bridge $L^{11}$ forward after the platen K has descended. $L^{19}$ (Figs. 48, 49) are guides for the web or paper, said guides being supported by a cross bar which extends between and is attached to the brackets in which the shaft $L^{14}$ is journaled. The web of paper passing over the bridge $L^{11}$ when the latter is extended across the path of the platen, passes up these guides $L^{19}$ and, after being cut to the proper length, is withdrawn from the same by the upward movement of the package. The cam $L^{18}$ which actuates the paper bridge $L^{11}$ is carried by the shaft $B^{26}$ which also has attached thereto the cam $K^{15}$ controlling the operation of the platen K and the cam $K^{43}$ controlling the operation of the cranks $K^{20}$. These several cams thus attached to the same shaft are so related that the following cycle of operations occur. The paper bridge $L^{11}$ is retracted, following which the platen K rises and is engaged by the hooks $K^{18}$ upon the subsequent movement of the cranks $K^{20}$. After the strings have been tied around the bundle, the cranks $K^{20}$ are lowered to free the platen K from engagement with the hooks $K^{18}$, the platen K descends to a position in which the bundle may be discharged and further packages of bags received, and the paper bridge $L^{11}$ is thereafter advanced to receive the web $m$ of wrapping paper.

The web of paper $m$ which is passed around each bundle of packages after having an appropriate label affixed thereto, may be supplied from any suitable source, as for example the roll M journaled in brackets upon the frame. From the supply roll M the paper passes over an idler $M^1$ and is fed by the rolls $M^2$ and $M^3$ through guides $M^4$ across the paper bridge $L^{11}$ and up the guides $L^{19}$. As the web of paper passes from the idler $M^1$ between the feed rolls $M^2$ and $M^3$, paste and a label are applied thereto, the web of paper being subsequently cut into proper lengths by the coöperation of the knife $M^{29}$ and the plate or strip $M^5$ extending transversely across the guides $M^4$.

The shaft $m^2$ to which the feed roll $M^2$ is secured is mounted in suitable bearings upon the frame and has attached thereto spur gear $M^8$ which is driven by the gear $M^9$ loosely journaled on the shaft $m^9$ (Figs. 3, 51, 52, 53 and 54). Through an arm fixed to the hub of the gear $B^{19}$ and certain interposed lever and ratchet and pawl mechanisms, the gear $M^9$ is driven in a step by step manner to cause a corresponding intermittent feed of the paper web. By this means also the feed roll $M^3$, which is formed with a series of annular grooves for the purpose of allowing the paper to pass without interfering with the portions to which paste has been applied, is driven in a similar manner through the intermediacy of the gear $M^6$ upon the shaft $m^2$ and the gear $M^7$ attached to the shaft $m^3$ carrying the feed roll $M^3$. The shaft $m^3$ is supported in brackets N journaled upon the shaft $m^2$, for purposes which will hereafter appear.

Attached to the spur gear $M^9$ is a ratchet disk $M^{10}$, having upon its circumference notches $m^{10}$ corresponding in number to the number of packages (say five) to be formed in a single bundle. Rigidly mounted upon the shaft $m^9$ is a second ratchet disk or wheel $M^{11}$ having on its periphery notches $m^{11}$ corresponding in number and arrangement to the similar notches upon the ratchet wheel $M^{10}$. Upon the hub of this disk $M^{11}$ is rigidly mounted a disk $M^{12}$ which is provided on its periphery with a single notch $m^{12}$. Interposed between the disks $M^{10}$, $M^{11}$, and loosely mounted on the shaft $m^9$ is a collar, upon the radially extending arm $M^{13}$ of which is journaled a shaft $M^{14}$ having rigidly secured thereto pawls $M^{15}$ and $M^{17}$ which are adapted to engage the respective ratchets $M^{10}$ and $M^{12}$, and also having loosely mounted thereon a similar pawl $M^{16}$ which engages the ratchet disk $M^{11}$. The arm $M^{18}$ of the pawl carrying collar is attached by a connecting rod $M^{19}$ to the lever $M^{20}$, which is suitably pivoted to the frame and which is provided at its lower end with a slot $M^{21}$ in which moves a sliding block $M^{22}$ secured to an arm $M^{23}$ upon the hub of the gear $B^{19}$. The spring-pressed pawls $m^{15}$ and $m^{16}$ which engage the ratchet disks $M^{10}$ and $M^{11}$ respectively, (Figs. 52, 54) prevent the said disks from turning except to feed the paper forwardly.

By the revolution of the gear $B^{19}$, which makes one revolution for each package of bags, the pivoted lever $M^{20}$, acting through the connecting rod $M^{19}$, causes the pawl $M^{16}$ to engage a notch $m^{11}$ of the disk $M^{11}$ and rotate the latter through a short distance (1/5 of a revolution) at each revolution of the said gear $B^{19}$. When the disk $M^{12}$, which turns with the disk $M^{11}$, has made a complete revolution its single notch $m^{12}$ will be in such position that the pawl $M^{17}$ may drop, thus allowing the pawl $M^{15}$ to engage a notch $m^{10}$ of the disk $M^{10}$ and drive the gear $M^9$ a portion of a revolution during the next vibration of the lever $M^{20}$. By this means the wrapping paper is caused to be fed forwardly in the interval between the descent of the platen K and its subsequent elevation.

The knife $M^{29}$ for cutting the web of paper into proper lengths is supported by suitable brackets upon a rod or shaft $M^{28}$, the ends of which are engaged by the forward levers $M^{27}$ which are attached to and movable with the shaft $M^{26}$. The shaft $M^{26}$, which is journaled in the frame, is actuated by means of the cam $M^{24}$ (Figs. 51 and 52) upon the shaft $m^0$ and the lever $M^{25}$ which is secured to said shaft $M^{26}$ and is provided with a cam roll engaging the cam $M^{24}$. By the elevation of the knife $M^{29}$, whose cutting edge is at an angle to the coöperating plate or strip $M^5$, the web of paper is severed. When the knife is in a lowered position its cutting edge rests against and is supported by a downwardly extending plate $M^{30}$ attached to the member $M^5$, the latter extending transversely of the separated strips forming the guides $M^4$ carried by the frame.

During the passage of the web of wrapping paper through the feed rolls $M^2$, $M^3$, a label is affixed thereto, said label being delivered from a label box or holder to the web and being pressed upon the previously applied paste by the said rolls. For this purpose a suction box, which withdraws a label from the holder and carries it to the web, is employed, the feed roll $M^2$ being so arranged that it may move toward the suction box to receive the label and then, in returning to its normal position, draw the said label between the rolls and thus press it upon the paste applied to a portion of the web. The movement of the feed roll $M^3$ is caused by the cam $N^6$ which is mounted upon the shaft $m^2$. This cam, through a cam roll, actuates a lever $N^5$ which is attached to a horizontally extending shaft $N^3$ journaled on the frame. The shaft $N^3$, through the attached lever $N^2$ and connecting rod $N^1$, is attached to the bracket N, which is journaled upon the shaft $m^2$, and which carries the feed roll $M^3$. The shaft $N^3$ has attached to it by means of a lever secured thereto, a spring $N^4$ which operates to hold the lever $N^5$ in contact with the cam $N^6$ upon the shaft $m^2$. By this arrangement the feed roll $M^3$ is caused to move toward the suction box $O^{17}$ after the label has been discharged from the holder, said roll being returned to its normal position by means of the spring $N^4$.

The label box or holder is formed of a plurality of upwardly extending standards $O^2$ which are attached to a platform O supported on a bracket attached to the frame. The bottom of the label box is formed with an opening $O^1$ with which the perforated portion of a suction box $O^{17}$ is adapted to come into alinement and apposition. Upon the platforms O are formed journal bearings $O^3$ and $o^3$ in which are respectively journaled the shafts $O^6$ and $o^6$ upon which, by means of the respective bosses $o^{16}$ and $O^{16}$, the suction box $O^{17}$ is pivotally mounted. This suction box is actuated through frictional engagement had with the air box $O^{14}$, such engagement being maintained by means of a spring $O^5$ which is housed within the journal bearing $O^6$ and which is adjusted by means of the adjusting block $O^4$ and the screw $o^4$ passing through a bracket and bearing thereon. The interior chamber of the suction box communicates with the air box by means of a port $o^{17}$ which is adapted to be opened and closed by the relative movement of said boxes, the suction box thus having the air partially exhausted therefrom to allow a label to be picked up and transferred to the web and to be thereafter released by the closing of the port $o^{17}$ communicating with the air box $O^{14}$.

Rigidly mounted upon the shaft $o^6$ by means of the boss $O^{13}$ is an air box $O^{14}$ which contacts the suction box $O^{17}$ and which is provided with a port $o^{14}$ adapted to communicate with the corresponding port $o^{17}$ of the said suction box. The air box is also provided with a flanged orifice $O^{15}$ communicating with the interior of the air box and forming an appropriate means for attaching a flexible pipe leading to an exhaust fan, or the like.

For operating the air box and suction box, the shaft $o^6$ has secured thereto a lever $O^7$, which, by means of connecting rod $O^8$, is flexibly attached to a lever $O^9$ that is pivotally mounted upon the stud $O^{10}$ (Figs. 57, 58) carried by a bracket of the frame. The arm $O^{11}$ of the lever $O^9$ is provided with a cam roll which co-acts with the cam $O^{12}$ mounted upon and movable with the shaft $m^2$. The arm $O^{11}$ of the lever $O^9$ is attached to a spring $o^{11}$ which holds the cam roll of said lever in engagement with the cam $O^{12}$. By this means the spring $o^{11}$, whenever the cam $O^{12}$ permits it to do so, rotates the air box $O^{14}$, and with it the frictionally engaged suction-box $O^{17}$. The air box and suction box during a portion of their travel move in unison with their respective ports $o^{14}$ and $o^{17}$ in communication. When, however, the suction box has been rotated to a position in which it is ready to deliver the label to the web of wrapping paper, it is stopped by engaging a lug $O^{18}$ upon the platform O. After the suction box is arrested the continued rotation of the air box $O^{14}$ causes the port $o^{14}$ thereof to pass the port $o^{17}$ of the said suction box, thus releasing the label and permitting the same to be withdrawn by the feed rolls $M^2$ and $M^3$. The air and suction boxes are positively returned to a position in which they are ready to withdraw another label from the label holder by means of the cam $O^{12}$, which, by reason of its attachment to the shaft $m^2$ upon which the feed roll $M^2$ is mounted, controls the operation of applying the label in such manner that the latter is affixed at the proper place upon the web of paper.

The paste for connecting the ends of the web, and for the label is applied by a plurality of revoluble paste disks or rolls, the paste being applied at the edges of the web adjacent to its point of severance by a pair of suitably spaced disks, and that for the middle portion of the web at the point of severance and for the label being applied by a paste roll operating subsequently thereto. For this purpose the pulley P upon the shaft $B^{17}$ drives, by means of a belt passing over the pulleys $P^1$, $P^1$ mounted upon the frame, the pulley $P^2$ which is secured to the shaft $p^2$ upon which is rigidly mounted the gear wheel $P^3$ which drives the gear $P^4$ loosely mounted upon the shaft $p^4$. The shaft $p^4$, which is journaled in suitable brackets attached to the frame, has secured thereto, through the instrumentality of the brackets $p^6$, $p^6$, paste boxes $P^9$ forming journals for the shaft $p^5$ having a gear $P^7$ meshing with the gear $P^4$, and carrying paste disks $P^5$, one of the latter running in each paste box $P^9$. The paste disks $P^5$ are caused to come into engagement with the web of paper to apply paste thereto by the operation of the cam $P^{11}$ mounted upon shaft $m^2$, such cam engaging the cam roll upon a lever $P^{10}$ which is attached to the shaft $p^4$ and permitting the counterweight $P^{12}$, which is mounted upon an arm also attached to the shaft $p^4$, to move the paste boxes $P^9$ a sufficient distance toward the feed roll $M^2$ to cause the paste disks to contact the paper. This operation places paste on the edges of the wrapper at the point where it is subsequently severed.

Journaled upon the shaft $p^4$ by means of appropriate upwardly extending brackets are platforms $p^{13}$ each of which carries a paste box $P^{13}$, said paste boxes forming journals for a shaft $p^6$ which is driven from the spur gear $p^4$ through the intermediacy of the gear $P^6$ interposed between the said paste boxes. The shaft $p^6$ is provided with a plurality of paste rolls $P^8$ which are preferably formed with a series of peripheral corrugations or depressions extending around the rolls in such manner that the paste is applied to the web of wrapping paper in bands (Fig. 3). One of the paste box supporting platforms has a horizontally extending lug which is engaged by the forked end of a lever $P^{14}$ which is rigidly secured to a horizontally extending shaft $P^{15}$ mounted in brackets on the frame. The shaft $P^{15}$ is also provided with an attached counterweight $P^{18}$ and with a lever $P^{16}$ whose cam roll contacts the cam $P^{17}$ mounted upon the shaft $m^2$. When the cam roll upon the lever $P^{16}$ comes into apposition with either of the depressions upon the cam B$^{17}$, the counterweight B$^{18}$ attached to the shaft B$^{16}$ is permitted to actuate the latter, thus tipping the paste boxes P$^{13}$ and moving the paste rolls P$^8$ into contact with the web of paper passing over the feed roll M$^2$. In the present construction the cam P$^{17}$ is provided with two such depressions, the first of which causes the paste disks P$^9$ to be actuated to apply paste to the web at its point of severance, and the second of which causes the said paste rolls to apply paste for the label. It will also be noted that the application of paste to the web of wrapping paper is governed through the paper feeding mechanism, since the cams controlling the paste disks are mounted upon the shaft $m^2$ to which the feed roll M$^2$ is attached.

In knotting the strings around each bundle of (say five) packages, four principal devices are employed, namely, a needle, a shuttle, a twister, and a tucker roll. These devices by their relative movements tie the knots in the binding twine, and, in conjunction with the guides, heretofore described, which engage the pile of packages during the upward movement of the platen K, assist in causing the string and wrapper to completely encircle the bundle. Two strings are tied around each bundle, one at a short distance from each end, and for this purpose two of each of the devices are employed, such devices being arranged in pairs and each, through common driving mechanism, operating in unison upon the separate strings.

The relative movements of needle, shuttle, twister and tucker roll in knotting the string are shown in Figs. 93 to 117 inclusive, and will be hereinafter more particularly described. Since these devices are duplicated, for convenience only one each of the needles, twisters and shuttles will be described, it being understood that for each of the parts denoted by a small reference letter there exists upon the opposite side of the machine a similar part indicatd by the corresponding capital letter.

The strings Q and $q$ which are to be knotted around the bundle while it is under pressure, respectively lead from any convenient or suitable supply over tension blocks Q$^1$, $q^1$, thence around rolls carried at the upper end of suspended weights Q$^2$, $q^2$ to a reel loosely journaled up the shaft B$^{37}$ and provided with string grooves Q$^3$, $q^3$ (Figs. 1, 3, 75, 87, 119 and 120). After passing around the grooves last referred to, the strings Q, $q$ pass, by means of the rolls mounted upon the guides Q$^5$, $q^5$, to a reel having grooves Q$^4$, $q^4$, which is also loosely journaled upon the shaft B$^{37}$ at its end, thence over the guide rolls Q$^6$ $q^6$, through longitudinally extending apertures in the shafts Q$^{18}$ $q^{18}$ upon which the needles Q$^7$ $q^7$ are mounted, over the rolls Q$^{10}$ $q^{10}$, Q$^{11}$ $q^{11}$, Q$^{12}$ $q^{12}$, Q$^{13}$ $q^{13}$, Q$^{14}$ $q^{14}$ carried by the respective needles Q$^7$ $q^7$ (Figs. 64, 65, 66, and 77), and finally into the jaws R$^{16}$ $r^{16}$ and R$^{19}$ $r^{19}$ of the twisters R$^{18}$ $r^{18}$. The reels upon the shaft B$^{37}$ which are provided with the guide grooves Q$^3$ $q^3$ and Q$^4$ $q^4$ are so arranged that, through clutch mechanism, they may be driven with the said shaft B$^{37}$ and cause the strings Q, $q$ to be fed forward intermittently. For this purpose a cone hub Q$^{45}$ is secured upon the shaft B$^{37}$ to rotate with it. Interposed between the hub Q$^{45}$ and the pulley having the grooves Q$^3$, $q^3$ (Fig. 75) is a spring-pressed friction plate, which by bearing against the said pulley, operates as a brake to counteract the downward pull of the weights attached to the guide rolls Q$^2$ $q^2$. The reel having the grooves Q$^4$ $q^4$ is provided at its outer end with a cap plate Q$^{48}$ upon which an arm Q$^{49}$, which is attached to a shaft mounted upon the frame, bears. Attached also to this last mentioned shaft is an arm Q$^{50}$ having a cam roll which engages the cam Q$^{51}$ upon the shaft B$^{35}$, a spring $q^{50}$ being attached to a portion of the frame and operating upon said shaft through an attached arm to maintain the engagement of the said cam roll and cam. By this arrangement the cam Q$^{51}$ operating through the arms Q$^{50}$ and Q$^{49}$ causes the reel having the string guides Q$^4$ $q^4$ to engage the cone hub Q$^{45}$ and to be driven thereby. The reel carrying the grooves Q$^3$ $q^3$ is also driven at this time by means of the strings which pass from one reel to the other.

The knot tying devices Q$^7$ $q^7$ herein termed " needles ", which reciprocate toward and from the bundle of packages to place the string around the latter and which coöperate with the other knotting devices to subsequently tie the knot, are each formed with a vertical arm and a horizontal arm meeting at substantially a right angle, the vertical arm being secured to a horizontal shaft in such manner that said arm may move in a vertical plane while the horizontal arm moves about the axis of said shaft. The string is held by the needle and follows the general contour thereof by being threaded around string reels which are pivotally mounted upon the needles.

Describing now one only of the devices, the needle $q^7$ it attached to a hub $q^8$ which is secured to a shaft $q^{16}$ supported in bearings $q^{17}$ $q^{17}$ forming a part of the needle slide $q^{18}$. The needle $q^7$ is balanced by means of a counterweight $q^9$ attached to the hub $q^8$. The needle $q^7$ is also provided with the pivotally mounted string guide rolls $q^{10}$, $q^{11}$, $q^{12}$, $q^{13}$, $q^{14}$, as shown. Secured to the needle shaft $q^{16}$ between the bearings $q^{17}$ (Figs. 64 and 118) is a spur gear $q^{19}$ which meshes with and is driven by the spur gear $q^{21}$ mounted upon a stud, carried by the bracket $q^{20}$ of the sliding head $q^{15}$. To this stud is also firmly secured a bevel gear $q^{22}$ which engages another bevel gear $q^{25}$ loosely mounted on the horizontally extending shaft $q^{26}$ between brackets $q^{23}$ mounted upon, and movable with the needle slide $q^{15}$. The shaft $q^{26}$ is journaled in supporting brackets $q^{27}$ attached to the frame (Figs. 1, 3, 64, 65, 66) and has rigidly attached thereto arms or levers $q^{28}$ $q^{28}$ by and between which is carried a horizontally extending rod $q^{29}$ which passes through a suitable opening in the bevel gear $q^{25}$. By this arrangement, it will be noted, the needle $q^{7}$ is caused to rotate back and forth by the rocking of the shaft $q^{26}$, while at the same time being permitted a bodily longitudinal reciprocation between the brackets $q^{27}$ $q^{27}$.

For the purpose of rocking the shaft $q^{26}$ back and forth to cause the oscillation of the needle $q^{7}$, a lever $q^{30}$ is rigidly secured thereto, said lever being connected by a horizontally extending rod $Q^{32}$ with the corresponding lever $Q^{30}$ of the opposite needle mechanism. The lever $Q^{30}$ (Figs. 1 and 3) is provided with a cam roll which operates in the cam race of the cam $Q^{31}$ fixed upon the shaft $B^{35}$. The cam $Q^{31}$, through connecting rod $Q^{32}$, thus causes the bevel gears to impart to the needles the rotary movements necessary in tying the knots.

In order that the needle slide or sliding head $q^{15}$ may move toward and from the bundle of packages to place the string over the guide rolls $L^{8}$ of the package follower weight, and to have the necessary reciprocating motion to bring the needle $q^{7}$ into proper relation with the other knotting devices during the subsequent operation of tying the knot, the said slide $q^{15}$ is mounted in guides forming a portion of the frame. Attached to this slide by means of a connecting rod $q^{33}$ is a lever $q^{34}$ which is rigidly mounted upon the horizontally extending shaft $Q^{35}$ mounted in bearings upon the frame. Attached also to the shaft $Q^{35}$ is a cam lever $Q^{36}$ whose cam roll works upon the cam $Q^{40}$, the latter being connected to the gear wheel $b^{22}$, which moves loose upon the shaft $B^{23}$ and which is driven by the spur gear $b^{27}$ attached to the shaft $B^{26}$ (Fig. 1). Loosely mounted upon the shaft $Q^{35}$ is a cam lever $Q^{37}$ to which is attached a counterweight $Q^{38}$ having a projecting lug $q^{38}$ which is adapted to engage a lever $Q^{36}$. The shaft $Q^{35}$ is provided with a rigidly attached arm through which a spring fastened to the frame moves the needle slide $q^{15}$ toward the bundle of packages whenever permitted so to do by the cams $Q^{40}$ and $Q^{42}$, which are respectively mounted upon the shafts $B^{23}$ and $B^{17}$.

It will be noted that the cams $Q^{40}$ and $Q^{42}$, which control the movements of the needle slide, move at different speeds, the cam $Q^{40}$ making but one revolution while the cam $Q^{42}$ makes the number of revolutions corresponding to the number (say five) of packages to be formed into a single bundle. It thus results that when the depression $Q^{41}$ in the cam $Q^{40}$ is opposite the cam roll on the lever $Q^{36}$, the cam path $Q^{43}$ of the cam $Q^{42}$, acting through the cam lever $Q^{37}$ and its counterweight arm $Q^{38}$ the lug $q^{38}$ of which is in engagement with the lever $Q^{36}$, permits the cam roll upon the lever $Q^{36}$ to be drawn into the said depression $Q^{41}$ by the action of the spring upon the shaft $Q^{35}$, thereby causing the needle slide $Q^{15}$ to move toward the bundle of packages. When the cam $Q^{42}$ has made a complete revolution, the cam roll upon the lever $Q^{37}$ is again engaged to lift the cam roll $Q^{36}$ out of the depression $Q^{41}$ of the cam $Q^{40}$ and permit the last named cam roll to travel upon the curved periphery of the said cam $Q^{40}$. This operation returns the needle slide $q^{15}$ to its original position. After the depression $Q^{41}$ in the cam $Q^{40}$ has been passed, and until the drop in said cam is reached, the engagement of the cam roll upon the lever $Q^{36}$ with the said cam $Q^{40}$ allows the counterweighted lever $Q^{38}$ to move downwardly sufficiently far to permit the cam $Q^{42}$ to revolve freely without actuating the cam roll upon the lever $Q^{37}$. When, however, the drop in the cam $Q^{40}$ is opposite the cam roll upon the lever $Q^{36}$, the cam path $Q^{43}$ of the cam $Q^{42}$ engages the cam roll upon the lever $Q^{37}$ and, through the engagement of the counterweighted lever $Q^{38}$ and lever $Q^{36}$, enables the spring to communicate to the needle slide $Q^{15}$ the reciprocation corresponding to the form of the cam path $Q^{43}$. When the cam roll upon the lever $Q^{36}$ is in contact with the lowest part of the cam $Q^{40}$, the said lever $Q^{36}$ by its engagement with the lug $q^{38}$ upon the counterweighted arm $Q^{38}$, will cause the lever $Q^{37}$ to approach the shaft $B^{17}$, so that upon the next revolution of the cam $Q^{42}$ the cam roll upon the lever $Q^{37}$ will lie inside of the cam path $Q^{43}$. When the cam roll upon the lever $Q^{36}$ again reaches the highest point of the cam $Q^{40}$, the lever $Q^{36}$ will occupy such a position that the counterweight $Q^{38}$ is enabled to so move the lever $Q^{37}$ relative to the cam $Q^{42}$ that the latter clears the cam roll of the lever $Q^{37}$ upon the shaft $B^{17}$. In this manner the reciprocatory movements of the needles necessary in placing the string around the bundle and in tying the knots are controlled.

The twisters are each comprised of a body portion $R^{13}$ $r^{13}$ and a head portion $R^{20}$ $r^{20}$. Each of said twisters holds one end of the string during the operation of tying the knot and is adapted to be rotated to permit the string to be loaded into the jaws thereof by the needle preparatory to tying the string around the succeeding bundle. The twisters are mounted in extended bearing arms $R^2$ $r^2$ of the brackets R, r respectively. The brackets R, r are secured to the frame and are provided with bearings $R^1$ $r^1$, in which are journaled the respective shafts $R^9$ $r^9$. Upon the shaft $R^9$ is a bevel gear $R^8$ which is driven by means of a bevel segment $R^7$ attached to the end $R^6$ of a lever pivotally mounted upon the frame, the other end $R^5$ of said lever being provided with a cam roll which co-acts with the cam $R^4$ rigidly mounted upon the shaft $B^{35}$. The shaft $R^9$ is also provided with an attached spur gear $R^{10}$ which meshes with the similar gear $r^{10}$ secured to the shaft $r^2$. The shaft $R^9$ is further provided with an attached spur gear $R^{11}$ which drives the twister through its attached spur gear $R^{12}$, and the shaft $r^9$ is similarly provided with a spur gear $r^{11}$ which, through the intermediacy of the gear $r^{12}$, drives its twister $r^{13}$. By this means, it will be observed, both the twisters are caused to rotate in unison, so that they simultaneously operate in a corresponding manner upon each of the strings.

Describing now one only of the devices, it being understood that the other twister of the pair is of a similar construction and that whenever a small reference letter is used the similar part is indicated by the corresponding capital letter, $r^{13}$ is the body of the twister which is held in place by a bearing sleeve $r^2$ attached to the bracket r. The body of the twister is provided at its upper end with a transversely extending jaw $r^{16}$ and with a longitudinally extending hole $r^{14}$ for the reception of a rod $r^{18}$ which has at its upper end a jaw $r^{19}$ adapted to move into and out of engagement with the corresponding jaw $r^{16}$, said jaw $r^{19}$ being formed upon the end of a rod $r^{18}$, which is slidably mounted in the longitudinally extending aperture $r^{14}$ of the twister body $r^{13}$ and which is secured to the twister head $r^{20}$. The twister body $r^{13}$ is also provided with a longitudinally extending slot $r^{17}$ which permits the string to be brought to the center of the shuttle and remain there during the operation of the latter. The rod $r^{18}$ carrying the jaw $r^{19}$ is mounted in a head $r^{20}$ between which and the body of the twister $r^{13}$ is inserted a compression spring which keeps the jaws $r^{16}$ and $r^{19}$ together, said compression spring being housed in the body of the twister $r^{13}$ and encircling a rod $r^{21}$, which is attached to the head $r^{20}$ and passes upwardly therefrom through the body of the twister. The rod $r^{21}$ in conjunction with the rod $r^{18}$ carrying the jaw $r^{19}$ serves to prevent the relative rotation of the members $r^{13}$ and $r^{20}$. The jaws $r^{16}$ and $r^{19}$ of the twister are normally maintained in engagement and hold the string between them, but are opened to release the string by exerting pressure upon the head $r^{20}$, whereby the spring $r^{15}$ is compressed. This opening of the twister jaws is accomplished by causing the shuttle $t$ to tilt and engage the head $r^{20}$ of the twister, as will hereafter appear.

The shuttles T, t, around which the strings are looped and which are adapted to come into engagement with the heads of the twisters to cause the jaws of the latter to open, are attached to rods S and s supported in bearings secured to the brackets R and r respectively. These rods are bent at an angle and the portions $S^1$ $s^1$ pass through and are guided by the respective cam paths $S^6$ $s^6$ of a cam plate $S^5$ which is slidably mounted in grooves or guide-ways $R^3$ $r^3$ formed in the brackets R, r. The respective ends $S^2$ $s^2$ of the rods S and s move in a groove or guide $S^3$ formed in the bridge $S^4$ extending between the brackets R, r, one wall of the said groove or guide $S^3$ being cut away so that the ends $S^2$ $s^2$ of the rods S, S, respectively, may permit the cam plate $S^5$ to tip the bent portions $S^1$ $s^1$ of their respective rods S, s, thereby causing the attached shuttles to tip and open the twister jaws by pressing upon the twister heads $R^{20}$ $r^{20}$. The similar cam paths S, s of the cam plate $S^5$ thus give the shuttles the motion required for throwing off the string and forming the loop therein.

For the purpose of actuating the sliding cam plate $S^5$ which controls the movements of the shuttles, a connecting lever $S^8$ is pivotally attached thereto by means of a pin passing through the lug $S^7$ thereon. The connecting rod $S^8$ is flexibly attached to an arm or lever $S^9$ secured to the shaft $S^{10}$, which is mounted in journals upon a bracket connected to the frame. The lever $S^9$ is provided intermediate its length with a transversely extending head $U^{20}$ which is adapted to coöperate with certain bell crank levers for the purpose of moving the tucker rolls, as will hereinafter appear. Secured also to the shaft $S^{10}$ is a cam lever $S^{11}$ having a cam roll which engages the cam $S^{12}$ rigidly mounted upon the shaft $B^{35}$ and also having an arm to which is attached a spring $s^{10}$ which holds the cam roll in engagement with the said cam.

One of the shuttles will now be described, the corresponding letters of reference referring to similar parts in each as heretofore when describing the needles and twisters.

The shuttle t, which is attached to the end of the rod s as heretofore described, has the twister supported within it by means of the bracket bearing $r^2$. Upon the end of the shuttle t near the rod s are lugs or jaws $t^1$ in which is pivotally mounted a latch, the hook $t^2$ of which retains the string until the loop is slipped off the shuttle in the tying operation, and the end $t^3$ of which is adapted to come into contact with a pin (Fig. 79) to trip the said latch and permit the string to slip off the shuttle. One side, $t^4$, of the shuttle is higher than the opposite side. $t^5$, thereof, the string being thus permitted to form a loop by passing from the twister jaws, around the high side of the shuttle to the hook $t^2$ of the pivoted latch, and thence into the slot $r^{17}$ of the twister body $r^{13}$. Within the shuttle is an integrally formed rib $t^6$ (Fig. 69) which, when the shuttle is tipped by the cam plate $S^5$ acting on the rod $s$, engages the twister head $r^{20}$ and causes the spring $r^{15}$ of the twister to be compressed, thereby opening the jaws $r^{16}$ and $r^{19}$ of the latter.

The bottom of the shuttle $t$ is pierced near the nose thereof by openings $t^7$, $t^8$, the former affording clearance for the passage of a string take-up finger $t^{21}$, which is adapted to enter the shuttle on a line with the string and press the latter taut between the twister and shuttle to assist in pulling the knot tight, and the latter affording clearance for the knife $t^{13}$ when the take-up finger $t^{21}$ is in operation, said take-up finger and knife being both attached to the lever $t^{15}$ which is pivoted upon a bracket at $t^{16}$.

For the purpose of assisting the twister jaws to hold the string so that it may be severed by the knife $t^{13}$, the shuttle $t$ is provided with a tension strip $t^9$ (Figs. 68, 77, 78, 79, 80) which is attached to the headed rods $t^{10}$, the latter being guided in the brackets $t^{11}$ and $r$, and being acted upon by springs $t^{12}$ resting upon the said bracket $r$.

The lever $t^{15}$ to which the knife $t^{13}$ and the string take-up $t^{21}$ are attached, has an extended arm $t^{19}$ which is provided with a cam roll operating in the raceway of the cam $T^{20}$ mounted upon the shaft $B^{35}$. In order to simultaneously operate the corresponding lever $T^{15}$ with its attached string take-up $T^{21}$ and knife $T^{13}$, the lever $t^{15}$ is also provided with an inwardly extending arm having a gear segment $t^{17}$ which meshes with a corresponding gear segment $T^{17}$ similarly attached to the lever $T^{15}$ (Figs. 77, 78). The arms $T^{19}$ of the levers $t^{15}$ and $T^{15}$ are connected by a spring $T^{18}$ which serves to take up any lost motion between the gear segments $T^{17}$ and $t^{17}$.

The knife $t^{13}$, which extends transversely of the lever $t^{15}$, is formed with a notch having a cutting edge $t^{14}$. When the lever $t^{15}$ is actuated by the cam $T^{20}$ through the lever arm $T^{19}$, the knife $t^{13}$ is moved toward the shuttle and the string slips into the recess in the knife. As the knife returns to its original position the string, which at this time is held by the jaws of the twister and the tension piece $t^9$ of the shuttle, is pulled against the cutting edge $t^{14}$ of the knife and thereby severed. Thereafter, the bundle of packages is free to be lowered by the platen K and delivered from the machine.

The tucker rolls $U^{14}$, by which the strings and wrapper are carried up the side of the bundle, are journaled upon shafts $U^{13}$ which are slidably mounted in the arms of a bracket $U^{11}$ which is attached to a slide $U^1$ mounted to move vertically in guides U attached to a portion of the frame. The shafts $U^{13}$ are slightly flattened upon one side, and have bearing against each of them a spring-pressed tension block whose pressure upon the adjacent shaft may be regulated by means of a screw plug $U^{10}$ threaded into the bracket $U^{11}$ and bearing upon said spring. By this means the shafts and attached rolls are frictionally held in the positions to which they are moved by the bell crank levers $U^{15}$. Attached to the ends of the shafts $U^{13}$ opposite the tucker rolls $U^{14}$ are bell crank levers $U^{15}$ which are each pivoted to the bracket $U^{11}$ by means of studs $U^{16}$, and each of which is provided with a pin or lug $U^{17}$ which is adapted to engage a stationary stop $U^{18}$ mounted upon the guide member U. It will now be noted that when the slide $U^1$ is in its lowered position, the engagement of the stop $U^{18}$ with the pins $U^{17}$ of the bell crank levers $U^{15}$ cause the latter to separate the tucker rolls $U^{14}$ by sliding the shafts $U^{13}$ outwardly. In this position, the tucker rolls $U^{14}$ are in alinement with the strings Q, $q$ which have been passed partially around the bundle, the result being that when the slide $U^1$ is next actuated to move the tucker rolls upwardly, the said strings Q, $q$ are engaged and carried up the side of the bundle. When the slide $U^1$ is in its highest position, the transversely extending pins $U^{17}$ upon the bell crank levers $U^{15}$ come into engagement with the head $U^{20}$ upon the lever $S^9$, which is attached to the shaft $S^{10}$ and actuates the cam plate $S^5$, as heretofore described. By the engagement of the said pins $U^{17}$ with the head $U^{20}$, the shafts $U^{13}$ are drawn toward each other, thereby moving the tucker rolls $U^{14}$ inwardly and disengaging them from the strings.

For the purpose of actuating the slide $U^1$, which carries the tucker rolls, a lever $U^3$ is connected to the said slide by a hub $U^2$. Flexibly attached to the lever $U^3$ is a lever $U^4$ which is attached to the shaft $U^5$ journaled upon the frame and which is provided with a counterweight $U^6$ (Figs. 25, 26, 27) and with a vertically extending connecting rod, which, in turn, is connected to the lever $U^9$ by a flexible joint $U^8$ as shown. The lever $U^9$ has upon it a cam roll which coöperates with the cam $U^{10}$ mounted upon the shaft $B^{26}$. By this means the slide $U^1$, which carries the tucker rolls, is caused to reciprocate vertically in the guide U.

The shaft $B^{35}$, which is provided with the cams for driving the mechanism by which the knots are tied after the strings have been placed around the bundle of packages, is driven by the shaft $B^{32}$ through the intermediacy of the bevel gears $B^{33}$ and $B^{34}$. The shaft $B^{32}$ is driven from the shaft $B^{29}$ through the bevel gears $B^{31}$ and $B^{30}$, which are respectively attached to the said shafts (Figs. 1, 2, 3). The shaft $B^{29}$, having loosely mounted thereon a spur gear $B^{28}$ which meshes with the gear $B^{27}$ similarly mounted upon the shaft $B^{26}$, is driven by said gear $B^{28}$ through the intermediacy of certain clutch mechanism to be presently described, such clutch mechanism being controlled by a hub revoluble with the shaft $B^{26}$ upon which the said gear $B^{27}$ is journaled. The said gear $B^{27}$ is driven from a gear $B^{22}$ attached to the shaft $B^{23}$, the latter having also attached thereto a spur gear $B^{24}$ which meshes with the gear $B^{25}$ attached to the shaft $B^{26}$ upon which the hub controlling the clutch mechanism referred to is mounted. Primarily, the shaft $B^{23}$ is driven from a driving shaft $B^{11}$ (Figs. 1 and 4) which is suitably mounted in the frame and to which power is applied in any convenient manner. Through its attached spur gear and the intermediate gear $B^{12}$, the shaft $B^{11}$ drives the gear $B^{13}$ which is secured to the shaft $B^{14}$, the latter, through its attached spur gear $B^{18}$, which meshes with the intermediate gear $B^{15}$ journaled upon the frame, driving the shaft $B^{17}$ by means of the attached gear $B^{16}$. As has been heretofore explained and as shown particularly in Figs. 42, 43, 44, 45 and 46, the shaft $B^{17}$ drives a gear $B^{18}$ through the intermediacy of a clutch mechanism, the said gear $B^{18}$ through the intermediate gear $B^{19}$ itself driving the gear $B^{22}$ attached to the shaft $B^{23}$.

The clutch mechanism by which the shaft $B^{29}$ is driven from the gear $B^{28}$ loosely mounted thereon, will now be more particularly described.

V is a disk which is keyed to the hub of the gear $B^{28}$, and which is provided with inwardly extending lugs $V^1$, $v^1$ that are adapted to engage the head $V^8$ of a dog $V^7$ which is mounted upon a disk $V^2$ rigidly secured to the shaft $B^{29}$ (Figs. 3, 70, 71, 72, 73, 74). Keyed to the shaft $B^{29}$ adjacent to the disk V is a disk $V^2$ upon the extended hub of which are loosely mounted the collars $V^{13}$ and $V^{18}$, said collars being retained in position by an annulus $V^{24}$ secured to the hub of the said disk $V^2$. Pivotally mounted upon the face of the disk $V^2$ by means of a stud $V^6$ is a dog $V^7$ having a head $V^8$ which is adapted to come into engagement with the lugs $V^1$, $v^1$ of the disk V to permit the latter to drive the shaft $B^{29}$ to which the said disk $V^2$ is attached. The disk $V^2$ is also provided with a perforated lug $V^4$ which forms a support for a spring $V^{12}$ that, acting upon a pin which is guided by the said lug and bears upon a shoulder $V^{10}$ of the dog $V^7$, holds the said dog in such position that the shoulder $V^9$ thereof may be cleared by a radially extending lug $V^{14}$ upon the collar $V^{13}$ whenever the lugs $V^1$, $v^1$ of the disk V do not interfere. The disk $V^2$ is further provided with a stop lug $V^5$ which is adapted to be engaged by a portion $V^{11}$ of the dog $V^7$ to limit the movement of the said dog under the influence of the spring $V^{12}$. Extending inwardly from the face of the disk $V^2$ is an arc shaped lug $V^3$ which is adapted to engage portions of the web $V^{15}$ of the collar $V^{13}$ between the lugs $V^{16}$ and $v^{16}$ thereof to limit the relative movement of the said disk $V^2$ and collar $V^{13}$. The collar $V^{13}$, which is mounted upon the hub of the disk $V^2$ adjacent to the web thereof, is provided with a radially extending web portion $V^{15}$ upon which is formed lugs $V^{16}$ and $v^{16}$ which are adapted to engage an arc shaped lug $V^{21}$ secured to the corresponding web $V^{19}$ of the adjacent collar $V^{18}$. The lug $V^{21}$ is of slightly less length than the distance between the lugs $V^{16}$ and $v^{16}$, thereby permitting a slight relative movement of the collars $V^{13}$ and $V^{18}$. The lugs $V^{16}$ and $v^{16}$ carried by the collar $V^{13}$ are adapted to respectively engage the fingers $V^{26}$ and $V^{28}$ carried by the hub attached to the shaft $B^{26}$ to cause the clutch to be thrown out of operation, as will hereinafter appear. The collar $V^{18}$ has formed upon its web $V^{19}$ lugs $V^{20}$ and $v^{20}$ which are adapted to be engaged by the fingers $V^{25}$ and $V^{27}$, respectively, upon the hub carried by the shaft $B^{26}$, and said collar is further provided with an inwardly extending lug $V^{21}$, which is adapted to engage the adjacent lug $v^{16}$ upon the collar $V^{13}$ to rotate the latter so that the radially extending lug $V^{14}$ may be moved into engagement with the nose $V^9$ of the dog $V^7$ to support the latter in such position that it may be engaged and driven by the lugs $V^1$, $v^1$ of the disk V. The clutch is thrown into operation by the engagement of the lugs $V^{20}$ $v^{20}$ with the appropriate fingers upon the hub carried by the shaft $B^{26}$. The disk $V^2$ and collars $V^{13}$ and $V^{18}$ thereof are caused to maintain their proper relations after having been moved relatively by means of the friction members $V^{22}$ which are mounted in the web $V^{15}$ of the collar $V^{13}$, which are mounted in an opening $V^{23}$, and which are caused to frictionally engage the disk $V^2$ and the web $V^{19}$ of the collar $V^{18}$ by means of a spring $V^{17}$ carried by and housed within the web $V^{15}$ of the said collar $V^{13}$.

It will be noted that the shaft $B^{26}$ makes but one revolution while the gear $B^{28}$ with its attached disk V makes the number of revolutions (say five) corresponding to the number of single packages in the bundle.

As shown in the drawings, the machine is so arranged that five packages of one hundred bags each are formed into a single bundle.

When, through the movement of the shaft $B^{26}$, the finger $V^{25}$ engages the lug $V^{20}$ upon the collar $V^{18}$, the lug $V^{21}$ is brought into engagement with the lug $v^{16}$ upon the collar $V^{13}$, the latter being thus rotated to cause the radial lug $V^{14}$ thereof to move under and form a support for the dog $V^{8}$ pivotally mounted upon the disk $V^{2}$ which is keyed to the shaft. When the lug $V^{14}$ of the collar $V^{13}$ is in supporting engagement with the shoulder $V^{9}$ of the dog $V^{8}$, the annular lug $V^{3}$ of the disk $V^{2}$ prevents its further movement by coming into contact with a portion of the web $V^{15}$ of the said collar $V^{13}$. The clutch is thus thrown into operation and the shaft $B^{29}$ driven by the lug $v^{1}$ upon the disk V, which is secured to the hub of the constantly running gear $B^{28}$. After having revolved for a period corresponding to seventy-five bags, the finger $V^{26}$ upon the hub attached to the shaft $B^{26}$ occupies such a position that the lower side of the lug $v^{16}$ comes into contact therewith and is retarded thereby. This permits the radially extending lug $V^{14}$ of the collar $V^{13}$ to move out of supporting engagement with the shoulder $V^{9}$ of the dog $V^{8}$ as the latter is carried forward a small distance by the continued movement of the driving lug $v^{1}$, thus permitting the lug $v^{1}$ to push the dog out of its path. The clutch is thus thrown out of engagement and the shaft $B^{29}$ stops for a period corresponding to seventy-five bags. The clutch is again thrown into operation in a similar manner by the finger $V^{27}$ coming in contact with the lug $v^{20}$ upon the collar $V^{18}$, thus causing the dog $V^{8}$ to engage the driving lug $V^{1}$ of the disk V. After the shaft $B^{29}$ has revolved for a period corresponding to twenty-five bags, the clutch is thrown out of operation in a manner similar to that heretofore described, by the lug $V^{16}$ coming into contact with the finger $V^{28}$ carried by the hub upon the shaft $B^{26}$. The shaft $B^{29}$ then remains stationary for a period of three hundred and twenty-five bags, when the cycle of operations is again repeated by the finger $V^{25}$ engaging the lug $V^{20}$ upon the disk $V^{18}$ as heretofore described. This last period of rest affords a sufficient interval for the lowering of a bundle of bags by the platen K and the elevation of the succeeding pile of five packages of bags.

The movements of the several knotting devices during the operation of tying the strings around the bundle are particularly illustrated in Figs. 93 to 117 inclusive, of the drawings, and such knotting operation will now be described.

The operation of knotting one string only will be described, it being understood that the other string is tied in a similar manner and by identical devices.

Assuming, as shown in Fig. 93, that the bundle has been tied and that the pressure thereon has been released and the said bundle lowered and supported upon the platen K in its upper position, the shuttle T will occupy a tipped position so that the lug $T^{6}$ thereof is in engagement with the head $R^{20}$ of the twister and the jaws $R^{10}$ $R^{19}$ of the latter are open, as has been heretofore described. One end of the string is thus freed from the jaws of the twister and the needle $Q^{7}$ is in such position that the string is brought into alinement with the opening between the jaws of the twister. The relation of the string and twister jaws $R^{16}$ $R^{19}$ in this position is shown in Fig. 94, which is an end view of the said twister. The bundle remaining in this position, the needle $Q^{7}$ is rotated slightly (Figs. 95 and 96) to carry the string between the jaws $R^{10}$ $R^{19}$ of the twister, which are rotated slightly to receive the said string. The shuttle T then assumes its normal position and permits the jaws of the twister to close upon the string and hold it firmly. The shuttle T now remaining in its normal position, the needle $Q^{7}$ rotates toward the bundle and draws the string over the top of the twister jaws, which, still holding the string, have rotated somewhat farther around (Figs. 97 and 98). As the twister continues to rotate (Figs. 99 and 100), the string is drawn taut between the latter and the tension strip $T^{9}$ of the shuttle T, the knife $T^{13}$ cutting the string as heretofore described.

While the bundle is still supported in an elevated position by the platen K, the needle $Q^{7}$, which remains stationary during the operation of the knife $T^{13}$, is rotated (Figs. 101 and 102) to pass the string around the high side $T^{4}$ of the shuttle and over the hook $T^{2}$ of the shuttle latch, a loop being thus formed in the binding twine. During the latter operation the twister returns to the original position shown in Fig. 94, but the jaws $R^{10}$ $R^{19}$ of said twister are now closed and the string is held between them. The completed bundle of packages is then lowered by the platen K and delivered from the machine in a manner presently to be described. The shuttle and twister now remaining stationary, the needle $Q^{7}$ is moved by its needle slide $Q^{15}$ so that the string is brought into alinement with the string rolls $L^{8}$ (Fig. 103) of the package follower $L^{5}$, as heretofore described. Upon the upward movement of the pile of packages, over the top of which the web of wrapping paper has been placed and upon which rests the package follower $L^{5}$, as heretofore noted, the string rolls $L^{8}$ engage the string and the latter, being held by the twister and guided by the needle, is placed over the top and down one side of the bundle: the web of wrapping paper is at this time partially formed around the bundle by the depending guides $K^{22}$ and $K^{23}$ (Figs. 48 and 49), as has been previously described. By this movement of the pile of packages the string is also brought into the longitudinal slot $R^{17}$ of the twister.

The pile of packages having been elevated by the platen K and thereafter having been further elevated and compressed by the operation of the cranks $K^{20}$ (Figs. 48 and 49), the needle slide $Q^{15}$ is actuated to cause the needle $Q^7$ to move under the pile of packages and assume a position adjacent to the pivoted latch of the shuttle, as shown in Fig. 104. This movement of the needle causes the string to draw the web of wrapping paper under the bottom of the bundle. In this position of the bundle, the tucker roll $U^{14}$ moves upwardly, engages the string and wrapper and carries them up the side of the bundle adjacent to the shuttle, as shown in Fig. 105. As the tucker roll $U^{14}$ moves upwardly, the needle $Q^7$ moves into such position relative to the shuttle T that the string leading from the said needle to the bundle is carried into the slot $R^{17}$ of the twister. The shuttle T now moving in causes the end $T^3$ of its latch to engage a pin carried by the frame and trip said latch so that the string is released from engagement with the hook $T^2$ thereof, the twister turning slightly, and the loop, which has slipped from the shuttle, being formed as shown in Fig. 106. The needle at this time revolves (Fig. 107) so that the spring is pulled off the shuttle and the loop, which rests upon the tucker roll $U^{14}$, is pulled up by the string rolls of the needle to form the loop shown in Fig. 108. As shown in Fig. 109, the needle now revolves toward the bundle while the shuttle remains in its normal position. By this movement of the needle the string is pulled off the string rolls $L^5$ of the package follower $L^5$ and the knot is pulled up hard with the assistance of the string take-up $T^{21}$ which comes into the shuttle and presses the string taut between the twister and shuttle, as heretofore explained. Fig. 110 illustrates the knot just prior to being pulled up tight, and Fig. 111 illustrates the string take-up $T^{21}$ pressing down upon the string between the shuttle and twister to take up the slack between the twister and the knot. While the bundle still remains in this position, the needle revolves (Fig. 112) to bring the string over the shuttle, the latter being moved back into line with the string. The needle then revolves around the shuttle in the opposite direction (Fig. 113) so as to once more bring the string on the high side $T^4$ of the shuttle and into the slot $R^{17}$ of the twister, the loop for the second knot being thus formed. The twister now turns and the shuttle moves in (Fig. 114) so that the loop is allowed to slip off the latter, the needle having moved close to the bundle and the backward pull of the string rolls thereof having tightened the knot. Fig. 115 shows the knot at this time just before it is pulled tight. The shuttle T is now tipped to open the jaws $R^{16}$ $R^{19}$ of the twister so that the downward movement of the needle $Q^7$ may withdraw the string from the said jaws (Fig. 116). The bundle is now ready to be lowered by the platen K, which at this time is in an elevated position. As the bundle is lowered to the initial elevated position of the platen and the pressure on said bundle is released, the shuttle returns to its normal position, the jaws of the twister are permitted to close, and the needle (Fig. 117) moves to a position over the shuttle preparatory to beginning the operation of leading the string into the jaws of the twister, as heretofore described when referring to Figs. 93 and 94.

The platen K with the completed bundle supported thereon is now lowered to a position in which said bundle may be delivered from the machine and a new pile of packages received. For this purpose a slide $W^1$ is movably mounted in the grooved guide W (Figs. 1, 2, 3, and 92) supported upon the frame. The slide $W^1$ has attached to it horizontally extending straps or arms $W^2$ which are formed with downwardly extending ends $W^3$ that are guided by the sides of the member $K^3$ which forms a guide for the platen slide $K^1$. These downwardly extending ends of the straps $W^2$ are adapted to come into engagement with the finished bundle and push it from the platen K after the latter has returned to its lower position. The platen, being supported only upon one side, as heretofore described, permits the said bundle to be forced out of the machine and the said platen to slip out from between the bags and the paper wrapper. Pivotally attached to the slide $W^1$ by means of a downwardly extending lug is a connecting lever $W^4$ which in turn is connected to the lever $W^5$ rigidly mounted upon the shaft $W^6$, the latter being supported by brackets $W^9$ of the frame. Attached also to the shaft $W^6$ is a cam lever $W^7$ having a cam roll which engages the track of the cam $W^8$ rigidly mounted upon shaft $B^{23}$. Mounted upon one of the brackets $W^9$ is a lever $W^{12}$ whose cam roll working upon the cam $W^{13}$ mounted upon the shaft $B^{26}$ causes the forward end of said lever to engage a collar $W^{10}$ secured upon the shaft $W^6$, to thus force the cam roll upon the lever $W^7$ into the raceway of the cam $W^8$, the spring $W^{11}$, encircling the shaft between one of the brackets $W^9$ and a collar $W^{11}$ secured to said shaft, being thereby compressed. Whenever the cam $W^{18}$ upon the shaft $B^{26}$ enables it to do so, the spring $w^{11}$ expands and withdraws the cam roll upon the lever $W^7$ from engagement with the cam $W^8$.

Since the shaft $B^{23}$ to which the cam $W^8$ is secured makes one revolution for each package of bags while the shaft $B^{26}$ to which the cam $W^{15}$ is attached makes but one revolution for five of such packages, the lever $W^{12}$ is actuated but once for each bundle of packages. When the cam roll upon the lever $W^7$ is thus actuated, however, the more rapidly revolving cam $W^8$ causes slide $W^1$, through the lever $W^5$ and connecting rod $W^4$, to move inward, eject the completed bundle from the machine and then be withdrawn from the path of the platen K.

What I claim is:—

1. In a machine for packaging paper bags, the combination with feed rolls for supplying the bags to the machine, two sets of bag assembling devices arranged in the line of feed, switching mechanism for diverting the supply of bags from one set of assembling devices to the other, timing mechanism for actuating the switch, said timing mechanism consisting of a series of switch actuating levers, a spring tending to shift the lever system so as to throw the switch and means for suppressing the switch throwing action of the spring except at predetermined intervals; substantially as described.

2. In a machine for packaging paper bags, the combination with feed rolls for supplying the bags to the machine, two sets of bag assembling devices arranged in the line of feed, switching mechanism for diverting the supply of bags from one set of assembling devices to the other, timing mechanism for actuating the switch, said timing mechanism consisting of a series of switch actuating levers, a spring tending to shift the lever system so as to throw the switch and means for suppressing the switch throwing action of the spring except at predetermined intervals, said means consisting of a flange wheel having diametrically opposite slots, to which wheel the spring is connected, and a stud or projection connected to the lever system and bearing upon the wheel flange; substantially as described.

3. In a machine for packaging paper bags, a bag assembling device consisting of a pair of paddle wheels having bag receiving and discharging pockets, the pockets of each wheel coöperating, each with a corresponding pocket of the other wheel to form a bag receiver a back-stop against which the bags are delivered and means for tapping the bags on their edges as they are received by the back-stop so as to bring the edges into alinement; substantially as described.

4. In a machine for packaging paper bags, a bag assembling device consisting of coöperating paddle wheels having bag receiving and discharging pockets, a back-stop against which the bags are delivered and means for tapping the bags on their edges as they are received by the back-stop so as to bring the edges into alinement, said means consisting of reciprocating tapper arms operating against the side and top edges of the bags; substantially as described.

5. In a machine for packaging paper bags, a bag assembling device, consisting of coöperating paddle wheels having bag receiving and discharging pockets, a back-stop, a pusher coöperating with the back-stop and mechanism for shifting the back-stop and pusher with respect to the paddle wheels, so as to shift the assembled bags bodily.

6. In a machine for packaging paper bags, a bag assembling device consisting of coöperating paddle wheels having bag receiving and discharging pockets, a back-stop, a pusher coöperating with the back-stop, mechanism for shifting the back-stop and pusher with respect to the paddle wheels, so as to shift the assembled bags bodily, and timing mechanism for effecting the shifting movement at a predetermined interval; substantially as described.

7. In a machine for packaging paper bags, a bag assembling device, consisting of coöperating paddle wheels having bag receiving and discharging pockets, a back-stop, a pusher coöperating with the back-stop, mechanism for shifting the back-stop and pusher with respect to the paddle wheels, so as to shift the assembled bags bodily, and a supplemental pusher for discharging the assembled bags from the back-stop and into stationary guides provided for their reception; substantially as described.

8. In a machine for packaging paper bags, a bag assembling device, consisting of coöperating paddle wheels having bag receiving and discharging pockets, a back-stop, a pusher coöperating with the back-stop, mechanism for shifting the back-stop and pusher with respect to the paddle wheels, so as to shift the assembled bags bodily, a supplemental pusher for discharging the assembled bags from the back-stop and into stationary guides provided for their reception, and timing mechanism for effecting the said movements at predetermined intervals and successively; substantially as described.

9. In a machine for packaging paper bags, a device for receiving and delivering bags successively one against another, consisting of a pair of paddle wheels provided with tangential pockets mounted upon upright shafts and means for feeding the bags in succession into said pockets on the discharge side of the paddle wheels; substantially as described.

10. In a machine for packaging paper bags, a device for assembling in a single pile two separate sets of bags fed thereto upon edge, said device comprising two receiving pockets, and means for swinging said pockets toward each other from a vertical to a horizontal position; substantially as described.

11. In a machine for packaging paper bags, a device for assembling in a single pile two separate sets of bags fed thereto upon edge, said device comprising two receiving pockets, and means for swinging said pockets toward each other from a vertical to a horizontal position, the constituent members of said means being so timed that one of the pockets will reach the horizontal position before the other, thereby causing the bags in one pocket to overlap those in the other when brought to the horizontal position; substantially as described.

12. In a machine for packaging paper bags, a device for assembling in a single pile two separate sets of bags fed thereto upon edge, said device comprising two receiving pockets, and means for swinging said pockets toward each other from a vertical to a horizontal position, the outer wall of each of said pockets serving as a compressor for the bags as they are moved into the horizontal position; substantially as described.

13. In a machine for packaging paper bags, a device for assembling in a single pile two separate sets of bags fed thereto upon edge, said device comprising two receiving pockets, means for swinging said pockets toward each other from a vertical to a horizontal position, the outer wall of each of said pockets serving as a compressor for the bags as they are moved into the horizontal position, and one of said compressor walls being provided with an auxiliary compressor arm extending outwardly therefrom so as to bear upon the overlapping bags at a point beyond their center; substantially as described.

14. In a machine for packaging paper bags, a device for assembling in a single pile two separate sets of bags fed thereto upon edge, said device comprising two receiving pockets, means for swinging said pockets toward each other from a vertical to a horizontal position, each of said pockets having a movable outer compressor wall, and a link connecting said compresser wall with a fixed fulcrum, so that when the pockets are raised to the horizontal position the compressor walls will be automatically operated; substantially as described.

15. In a machine for packaging paper bags, a device for assembling in a single pile two separate sets of bags fed thereto upon edge, said device comprising two receiving pockets, means for swinging said pockets toward each other from a vertical to a horizontal position, and an expelling slide for discharging the horizontal pile of bags from the turn-over; substantially as described.

16. In a machine for packaging paper bags, a device for assembling in a single pile two separate sets of bags fed thereto upon edge, said device comprising two receiving pockets, means for swinging said pockets toward each other from a vertical to a horizontal position, and an expelling slide for discharging the horizontal pile of bags from the turn-over, said expelling slide being provided with an upright, a cross piece and having fingers upon the cross piece.

17. In a machine for packaging paper bags, a device for feeding a band of paper and applying paste thereto, said device comprising feed mechanism for the paper band, a revoluble paste disk, means for supplying paste to the paste disk, and devices actuated by the feed mechanism for causing the paper band to contact the paste disk at appropriate intervals; substantially as described.

18. In a machine for packaging paper bags, a device for feeding a band of paper and applying paste thereto, said device comprising feed rolls having peripheral grooves which afford clearance for the portions of the paper band to which paste is applied, a revoluble paste disk, means for supplying paste to the paste disk, suitable mechanism for driving the feed rolls and paste disk, and a clutch controlling the operation of said rolls and disk; substantially as described.

19. In a machine for packaging paper bags, a device for feeding a band of paper and applying paste thereto, said device comprising mechanism for feeding the paper band, mechanism for applying paste to said paper band, driving mechanism for the feeding and paste applying mechanisms, a clutch interposed between the driving mechanism and said feeding and paste applying mechanisms, and mechanism controlled by the package to be encircled by the paper band whereby the clutch may be actuated to cause the band to be fed only at such intervals and in such lengths as is necessary to encircle the packages passing through the machine; substantially as described.

20. In a machine for packaging paper bags, a device for feeding a band of paper and applying paste thereto, said device comprising feed rolls for the paper band, a paste disk revolubly mounted upon a paste box, a paste box, a pivotally mounted plate extending over the paste disk and adapted to be intermittently actuated by a feed roll to cause the paper band to be pressed into contact with the paste disk, driving mechanism for the feed rolls and paste disk, a clutch mechanism controlling the operation of said feed rolls and paste disk, and mechanism controlled by the package to be encircled by the paper band whereby the clutch may be actuated to cause the band to be fed only at such intervals and in such lengths as is necessary to encircle the packages passing through the machine, said mechanism controlled by the package comprising a pivotally mounted lever having a cam roll, a revoluble cam adapted to permit the said lever to be actuated to predetermined intervals corresponding to the length of paper band necessary to encircle a package, means operatively connected to said lever for actuating the clutch, an arm adjustably mounted upon said lever and tending to move into the path of the packages of bags, and means for actuating said lever to cause the cam roll thereof to follow the face of the revoluble cam when the said adjustably mounted arm moves into the path of the packages; substantially as described.

21. In a machine for packaging paper bags, in combination with a drying box and means for ejecting a package of bags therefrom, mechanism for applying paste to a band of paper, means for feeding the said band across the face of the drying box in the path of the package as it is ejected, and a knife for cutting the band of paper so that it may be separated into suitable lengths to encircle a package; substantially as described.

22. In a machine for packaging paper bags, in combination with a drying box and means for ejecting a package of bags therefrom, a horizontally reciprocating transfer case adapted to receive a package of bags from the drying box, means for applying paste to a band of paper, means for cutting the paper band so that it may be separated into suitable lengths to encircle a package, and means for feeding the paper band between the said drying box and transfer case, whereby the said band is caused to partially encircle the package as the latter is ejected from the drying-box; substantially as described.

23. In a machine for packaging paper bags, in combination with a drying box and means for ejecting a package of bags therefrom, mechanism for applying paste to a band of paper, a knife operative to cut the paper band so that a suitable length thereof may be detached as the package of bags is ejected from the drying box, mechanism for feeding the paper band across the path of the package, and a reciprocating transfer case adapted to receive a package of bags from the drying box, said transfer case being provided with a guide for the free end of the paper band and with means for holding the other end of the band fixed with respect to the drying box and case until the latter has received the package of bags, whereby the paper band is caused to partially encircle the package as the latter is ejected from the drying box; substantially as described.

24. In a machine for packaging paper bags, a device for encircling a package of bags with a paper band, said device comprising mechanism for applying paste to a band of paper, means for feeding the said band across the path of the package, a knife for cutting the band of paper so that it may be separated into suitable lengths to encircle a package, a case through which the package is adapted to be forced, said case being provided with a guide for the free end of the paper band, means for holding the other end of the band stationary with respect to the case while the package is being forced thereinto, means for forcing the package into the said case whereby the paper band is caused to partially encircle the package, means for ejecting the package from the said case, and tucking fingers adapted to engage the loose end of the paper band and complete the encircling of the package thereby, substantially as described.

25. In a machine for packaging paper bags, a device for encircling a package of bags with a paper band, said device comprising mechanism for applying paste to a band of paper, means for feeding the said band across the path of the package, a knife for cutting the band of paper so that it may be separated into suitable lengths to encircle a package, a case through which the package is adapted to be forced, said case being provided with extended plates forming a guide for the free end of the paper band, means for holding the other end of the band stationary with respect to the case while the package is being forced thereinto, a horizontally movable slide for forcing the package into the case, mechanism for ejecting the package from the case, said ejecting mechanism comprising ejector fingers pivotally mounted upon a cam controlled slide and adapted to move upwardly to engage the package and then forwardly to eject the same from the case, and vertically movable tucking fingers adapted to engage the loose end of the paper band and complete the encircling of the package thereby; substantially as described.

26. In a machine for packaging paper bags, a device for assembling a predetermined number of individual packages of bags into a single pile, said device comprising a case adapted to receive a package of bags, means for delivering a package from the case to a piling plunger, and a vertically reciprocating piling plunger adapted to receive a package of bags and to elevate said package; substantially as described.

27. In a machine for packaging paper bags, a device for assembling a predetermined number of individual packages into a single pile, said device comprising a case through which a package of bags is adapted to be forced, a vertically movable piling plunger adapted to receive successive packages of bags as they are delivered from the case and to elevate said packages, means for ejecting a package of bags from said case, means for delivering the packages from the piling plunger, and mechanism actuated by the passage of a package through said case for controlling the means for delivering the packages from the piling plunger, whereby the predetermined number of packages are placed upon the piling plunger before being delivered therefrom; substantially as described.

28. In a machine for packaging paper bags, a device for assembling a predetermined number of individual packages into a single pile, said device comprising a vertically reciprocating piling plunger having a package receiving platform composed of spaced plates, a horizontally reciprocating case through which a package of bags is adapted to be forced, and means for ejecting a package of bags from said case, the top of said case being formed of spaced plates extending into the path of the piling plunger when said case is in position to deliver a package of bags, whereby when the piling plunger is in an elevated position the spaced plates of the case may pass between the spaced plates of the piling plunger and form a support for the packages of bags as the piling plunger lowers to receive a succeeding package of bags; substantially as described.

29. In a machine for packaging paper bags, a device for assembling a predetermined number of individual packages into a single pile, said device comprising mechanism for delivering successive packages to a piling plunger, a piling plunger for receiving successive packages of bags and subsequently elevating them, means for retaining the packages in an elevated position so that the piling plunger may receive another package, and means for delivering the packages from the piling plunger; substantially as described.

30. In a machine for packaging paper bags, a device for assembling a predetermined number of individual packages into a single pile, said device comprising mechanism for delivering successive packages to a piling plunger, a piling plunger for receiving successive packages of bags and subsequently elevating them, means for retaining the packages in an elevated position so that the piling plunger may receive another package, mechanism for delivering the packages from the piling plunger, and means for suppressing the operation of the mechanism for delivering the packages from the piling plunger, said suppressing means comprising a clutch and clutch controlling devices operative by the delivery of the packages to the said piling plunger; substantially as described.

31. In a machine for packaging paper bags, a device for assembling a predetermined number of individual packages into a single pile, said device comprising a horizontally reciprocating case adapted to deliver successive packages of bags to a piling plunger, a vertically reciprocating piling plunger for receiving the packages delivered from the case and subsequently elevating them, mechanism for delivering the packages from the piling plunger, and means for suppressing the operation of the mechanism for delivering the packages from the piling plunger until the predetermined number of packages have been formed into a pile, said suppressing means comprising an arm movably mounted upon the case and adapted to move into the path of the packages, a hook movable with said arm and adapted when a package is within the case to engage one of the pins of a disk to drive the latter a portion of a revolution, a disk provided with regularly spaced pins corresponding in number to the number of packages to be formed into a single pile, means for maintaining the pins in position to be engaged by said hook, a cam driven by said disk, and a clutch actuated by said cam and controlling the mechanism by which the packages are delivered from the piling plunger; substantially as described.

32. In a machine for packaging paper bags, the combination with a vertically reciprocating piling plunger, of a horizontally reciprocating case adapted to deliver packages of bags to said piling plunger, and devices for delivering the packages from the piling plunger, said devices comprising a horizontally reciprocating slide having thereon means for engaging the reciprocating case after a predetermined number of packages have been delivered to the piling plunger and elevated by the latter, whereby the devices for delivering the packages from the piling plunger are actuated by the reciprocating case; substantially as described.

33. In a machine for packaging paper bags, the combination with a vertically reciprocating piling plunger, of a horizontally reciprocating case adapted to deliver packages of bags to said piling plunger, and devices for delivering the packages from the piling plunger, said devices comprising a horizontally reciprocating slide, hooks pivotally mounted upon said slide and adapted to engage the reciprocating case after a predetermined number of packages have been delivered to the piling plunger and elevated by the latter, a cam controlled lever system for normally holding said hooks out of engagement with said reciprocating case, mechanism actuated by the passage of packages through the case for actuating the lever system to cause the said hooks to engage the case and be drawn forward thereby after the predetermined number of packages have been delivered to the piling plunger, and devices upon the said slide adapted to be engaged by the case to cause said slide to be returned to its normal position after the packages have been delivered from the piling plunger; substantially as described.

34. In a machine for packaging paper bags, a device for compressing a pile of packages and retaining such pile under pressure until the application of strings and a wrapper to the bundle is completed, said device comprising a spring, a vertically reciprocating package support adapted to be successively actuated by independent mechanisms, independent actuating mechanisms for the package support, and means for controlling the said actuating mechanisms, said actuating mechanisms being adapted to independently elevate and lower the package support by successive operations, whereby the packages are compressed and retained under pressure until the bundle is completed and then subsequently lowered; substantially as described.

35. In a machine for packaging paper bags, a device for compressing a pile of packages and retaining such pile under pressure until the application of strings and a wrapper to the bundle is completed, said device comprising a vertically reciprocating platen supported only upon one side, a spring seated upon a fixed spring seat, a fixed spring seat, a shaft having cranks thereon, means actuated by the shaft for engaging the platen and causing it to be elevated and lowered, and actuating mechanism for the platen adapted to elevate and lower the latter independent of the movement of the said shaft; substantially as described.

36. In a machine for packaging paper bags, a device for compressing a pile of packages and retaining such pile under pressure until the application of strings and a wrapper to the bundle is completed, said device comprising a vertically reciprocating platen adapted to support a pile of packages, a spring arranged in the line of movement of the platen and interposed between a fixed spring seat and a movable spring seat, a fixed spring seat, a movable spring seat, a package follower adapted to engage the movable spring seat and to be supported upon the top of the pile of packages, a shaft having cranks thereon, hooks suspended from said cranks and adapted to engage the platen, means for actuating said shaft to cause the platen to be raised and lowered through said hooks, and actuating mechanism for the platen adapted to elevate and lower the latter independent of the movement of the said shaft; substantially as described.

37. In a machine for packaging paper bags, a device for compressing a pile of packages and retaining such pile under pressure until the application of strings and a wrapper to the bundle is completed, said device comprising a vertically reciprocating platen adapted to support a pile of packages, and independent cam controlled lever systems for actuating the platen, whereby the packages are compressed and retained under pressure and then subsequently lowered to a position in which they may be delivered; substantially as described.

38. In a machine for packaging paper bags, a device for applying a wrapper to a pile of packages, said device comprising mechanism for elevating the packages, mechanism for applying paste to the wrapper, mechanism for feeding the said wrapper across the path of the packages, a knife for cutting the wrapper into suitable lengths to encircle the pile, devices for causing the wrapper to be brought against the sides of the pile as the packages are elevated, means for causing one end of the wrapper to be carried under the pile, and devices adapted to engage the said end of the wrapper and cause it to be carried into engagement with the other end of said wrapper; substantially as described.

39. In a machine for packaging paper bags, a device for applying a wrapper to a pile of packages, said device comprising a vertically reciprocating platen for elevating the packages, means for actuating the platen, a knife for cutting the wrapper into suitable lengths, and mechanism for feeding the said wrapper across the path of the packages, said feeding mechanism comprising feed rolls and a horizontally reciprocating bridge adapted to move into the path of the platen when the latter is in its lowered position and to be withdrawn from the path of said platen prior to the elevation of the packages, whereby the wrapper is placed over the top of the pile as the packages are elevated; substantially as described.

40. In a machine for packaging paper bags, a device for applying a wrapper to a pile of packages, said device comprising a vertically reciprocating platen for elevating the packages, means for actuating the platen, mechanism for applying paste to the wrapper, a knife for cutting the wrapper into suitable lengths, intermittently revoluble rolls for feeding the said wrapper across the path of the packages, a horizontally reciprocating bridge adapted to move into and out of the path of the platen, means for leading the binding string across the path of the platen when the latter is in its lowered position, means for leading the string under the pile of packages after the same has been elevated by the platen to thereby carry the wrapper under the pile, and devices for engaging the wrapper and carrying it up the side of the pile to complete the encircling thereof by said wrapper; substantially as described.

41. In a machine for packaging paper bags, a device for applying a wrapper to a pile of packages, said device comprising a vertically reciprocating platen for elevating the packages, means for actuating the platen, mechanism for applying paste to the wrapper, a knife for cutting the wrapper into suitable lengths, a horizontally reciprocating bridge adapted to move into the path of the platen when the latter is in its lowered position and to be withdrawn from the path of said platen prior to the elevation of said packages, means for reciprocating the bridge, mechanism for feeding the wrapper over the reciprocating bridge, a package follower arranged in the path of the packages and adapted to hold the wrapper against the top of the pile of packages when the latter is elevated, stationary guides adapted to engage the wrapper as the pile of packages is elevated, knot tying devices for leading the binding string across the path of the platen when the latter is in its lowered position and for leading the string under the pile of packages after the said pile has been elevated, and a vertically movable slide having tucker rolls adapted to carry the wrapper up the side of the pile to complete the encircling thereof by said wrapper: substantially as described.

42. In a machine for packaging paper bags, the combination with a vertically reciprocating platen adapted to support a pile of packages, of feed rolls adapted to be intermittently actuated when the platen is in its lowered position to cause a corresponding feed of a web of paper across the path of the platen, a guide for receiving the web from the feed rolls, a horizontally reciprocating bridge adapted to guide said web across the path of the platen when the latter is in its lowered position, and lever actuated pawl and ratchet mechanism for actuating said feed rolls; substantially as described.

43. In a machine for packaging paper bags, the combination of mechanism for advancing a web of paper, to be thereafter severed into lengths to form wrappers, paste applying devices for applying paste to the web of paper adjacent its edges at the points where it is to be subsequently severed, a device for applying paste to portions of the web of paper intermediate of the ends of the pieces into which it is to be divided by severing it, whereby paste may be applied to the web of paper for the purpose of holding the ends of each piece together when the piece is formed around a pile of bags, and for affixing a label thereto, and mechanism for operating said paste applying devices intermittently and in proper time relation to the movement of the web of paper.

44. In a machine for packaging paper bags, a device for applying paste to a web of paper, said device comprising a revoluble paste disk journaled upon a paste box, a paste box secured to a cam controlled shaft and having a counterweight adapted to actuate said box to cause the paste disk to contact the web of paper, a cam controlled shaft, and a feed roll for the web of paper adjacent to the paste disk; substantially as described.

45. In a machine for packaging paper bags, a device for applying paste to a web of paper, said device comprising a plurality of revoluble members adapted to apply paste to the web of paper, one of said revoluble members being adapted to apply paste to the web at the point where it is to be severed and also at a suitable point for affixing a label, and means for causing the said revoluble members to contact the web of paper; substantially as described.

46. In a machine for packaging paper bags, a device for applying paste to a web of paper, said device comprising means for applying paste to the edges of the web, and mechanism for applying paste to the central portion of said web, said mechanism for applying paste to the central portion of the web comprising a revoluble paste roll having peripheral depressions, a pivotally mounted paste box upon which said roll is journaled and which is adapted to move toward and from the web of paper to cause the paste roll to contact the latter, a counterweight tending to move said paste box toward the web of paper, a cam controlled lever system for normally holding said box and paste roll out of contact with the web of paper, and a cam controlled by the web feeding mechanism whereby the paste roll is permitted to be moved into engagement with the web of paper to apply paste thereto at the point where said web is to be severed and also at a suitable point for affixing a label; substantially as described.

47. In a machine for packaging paper bags, mechanism for applying a web of paper to a package in combination with a device for applying a label to the web of paper, said device comprising a movable suction box adapted to receive a label and carry it to the web of paper, and feed rolls for the said web of paper, one of said feed rolls being adapted to move toward and from the suction box upon the periphery of the other feed roll to thereby cause the label to be drawn between the rolls and pressed upon the web of paper; substantially as described.

48. In a machine for packaging paper bags, mechanism for applying a web of paper to a package in combination with a device for applying a label to the web of paper, said device comprising a label box, a suction box adapted to withdraw a label from the label box and carry it to the web of paper, and feed rolls for the said web of paper, one of said feed rolls being adapted to move toward and from the suction box upon the periphery of the other feed roll to thereby cause the label to be drawn between the rolls and pressed upon the web of paper; substantially as described.

49. In a machine for packaging paper bags, mechanism for applying a web of paper to a package in combination with a device for applying a label to the web of paper, said device comprising a label box, a suction box adapted to withdraw a label from the label box and carry it to the web of paper, an air box operatively connected to the suction box to cause the label to be withdrawn from the label box by the said suction box and to be released when engaged by the feed rolls, and feed rolls for the said web of paper, one of said feed rolls being adapted to move forward and from the suction box upon the periphery of the other feed roll to thereby cause the label to be drawn between the rolls and pressed upon the web of paper; substantially as described.

50. In a machine for packaging paper bags, mechanism for applying a web of paper to a package in combination with a device for applying a label to the web of paper, said device comprising a label box having an opening therein through which a label is adapted to be withdrawn, a pivotally mounted suction box having a perforated portion adapted to come into alinement with the opening in said label box, said suction box being adapted to withdraw a label from the label box and carry it to the web of paper, a pivotally mounted air box adapted to contact and have a relative movement with respect to said suction box to thereby govern the operation of the latter upon the label, and feed rolls for the web of paper adapted to engage the label and press it upon the said web; substantially as described.

51. In a machine for packaging paper bags, mechanism for applying a web of paper to a package in combination with a device for applying a label to the web of paper, said device comprising a label box having an opening therein through which a label is adapted to be withdrawn, a pivotally mounted suction box having an interior chamber provided with a port adapted to be opened and closed by the relative movement of an adjacent air box, said suction box being also provided with a perforated portion adapted to come into alinement with the opening in said label box, a pivotally mounted air box having an interior chamber provided with a port adapted to register with the port of the said suction box while the latter is carrying the label to the web of paper, means for causing said suction box to engage and be frictionally driven by said air box, means for arresting the motion of the suction box as the air box continues to move to thereby close the port of the suction box and release the label, a lever system for actuating the air box, feed mechanism for the web of paper adapted to engage the label and press it upon the said web, and devices controlled by the feed mechanism for actuating said lever system; substantially as described.

52. In a machine for packaging paper bags, a device for placing a string around a pile of packages preparatory to tying a knot, said device comprising mechanism for elevating the packages, means arranged to one side of the path of travel of the packages for firmly holding the string, mechanism for leading the string across the path of the packages while they are in a lowered position and for leading the string under the packages after they have been elevated, and mechanism adapted to engage the string and carry it up the side of the pile after said string has been led under said pile; substantially as described.

53. In a machine for packaging paper bags, a device for placing a string around a pile of packages preparatory to tying a knot, said device comprising a vertically reciprocating platen adapted to support the packages, a twister arranged to one side of the path of travel of the packages and having relatively movable jaws adapted to engage and hold the string, a package follower adapted to be supported upon the top of the pile of packages, said follower being provided with rolls adapted to receive the string, a horizontally movable needle adapted to lead the string across the path of the packages so that said string will be engaged by the rolls upon the follower when the pile of packages is elevated, said needle being also adapted to lead the string under the pile of packages after it has been elevated, and a vertically movable slide having a roll adapted to engage and carry the string up the side of the pile after said string has been led under said pile, substantially as described.

54. In a machine for packaging paper bags, knot tying means, comprising mechanism for holding one end of the string, a shuttle, mechanism for looping the string running from the holding mechanism about the shuttle and for then slipping the loop off the shuttle, and mechanism for operating the holding mechanism to carry said end of the string through the loop formed about the shuttle, whereby when the loop slips off the shuttle a knot is formed in the string.

55. In a machine for packaging paper bags, a knot tying device, said device comprising means for holding one end of the string, mechanism for forming a loop in the string, said loop forming mechanism comprising a shuttle around which the string is adapted to be passed, a reciprocating and rotating needle adapted to pass the string around the shuttle to form a loop, and means for releasing the loop and permitting it to slip off the shuttle to form the knot; substantially as described.

56. In a machine for packaging paper bags, a knot tying device, said device comprising means for holding one end of the string, a shuttle about which the string is adapted to be passed to form a loop, means for passing the string around the shuttle to successively form independent loops, and means for releasing the loops and permitting them to slip off the shuttle to form the knots; substantially as described.

57. In a machine for packaging paper bags, a knot tying device, said device comprising a twister having jaws adapted to receive and hold one end of the string, means for opening the jaws of the twister to receive the string, mechanism for rotating the twister to cause the jaws thereof to engage the string, a needle adapted to bring the string into alinement with the jaws of the twister so that it may be engaged thereby, said needle being also adapted to pass the string around the shuttle to form a loop, a shuttle about which the string is adapted to be passed to form a loop, means for releasing the loop and permitting it to slip off the shuttle to form the knot, means for releasing the string from the jaws of the twister after the knot is tied, and devices for cutting the string between the twister and the package after said string has been engaged by the twister jaws; substantially as described.

58. In a machine for packaging paper bags, a knot tying device, said device comprising means for holding one end of the string, a package follower adapted to rest upon the top of the pile of packages about which the string is to be tied, said package follower being provided with spring controlled string rolls adapted to receive the string and to be actuated to permit the string to be disengaged therefrom, a vertically movable slide having a roll adapted to engage the string and support the loop as the latter is slipped off the shuttle, a shuttle about which the string is adapted to be passed to form a loop, means movable with respect to the shuttle for passing the string around said shuttle to form a loop, means for releasing the string and permitting it to slip off the shuttle to form the knot, mechanism for releasing the end of the string from its holding means, and devices for cutting said string to free the bundle of packages from the knotting devices, substantially as described.

59. In a machine for packaging paper bags, a knot tying device, said device comprising a twister suspended in a shuttle and having relatively movable jaws adapted to engage and hold one end of the string, a shuttle about which the string is adapted to be passed to form a loop, means for causing the shuttle to engage the twister to thereby open the jaws of the latter, means for passing the string around the shuttle to form a loop, and means for releasing the loop and permitting it to slip off the shuttle to form the knot; substantially as described.

60. In a machine for packaging paper bags, a knot tying device, said device comprising a revoluble twister suspended in a shuttle and having relatively movable jaws and a longitudinally extending slot adapted to receive the string, means for rotating the twister, a shuttle about which the string is adapted to be passed to form a loop, means for passing the string around the shuttle to form a loop, and means for releasing the loop and permitting it to slip off the shuttle to form the knot; substantially as described.

61. In a machine for packaging paper bags, a knot tying device, said device comprising a revoluble twister adapted to hold one end of the string, a shuttle having a pivotally mounted latch adapted to engage and permit said string to be formed into a loop, means for passing the string around the shuttle to form a loop, and means for actuating the latch to permit the loop to slip off the shuttle and form the knot; substantially as described.

62. In a machine for packaging paper bags, a knot tying device, said device comprising a revoluble twister provided with relatively movable jaws adapted to hold one end of the string, a shuttle having a pivotally mounted latch adapted to engage and permit said string to be formed into a loop, means for passing the string around the shuttle to form a loop, and a movable cam plate adapted to actuate the shuttle to cause the jaws of the twister to be opened and the pivotally mounted latch to be actuated; substantially as described.

63. In a machine for packaging paper bags, a knot tying device, said device comprising a twister provided with relatively movable jaws adapted to hold one end of the string, a shuttle having one of its sides higher than the other and having a pivotally mounted latch adapted to engage and permit said string to be formed into a loop means for passing the string around the shuttle to form a loop, and a movable cam plate adapted to actuate the shuttle; substantially as described.

64. In a machine for packaging paper bags, a knot tying device, said device comprising, means for holding one end of the string, a shuttle about which the string is adapted to be passed to form a loop, a needle adapted to pass the string around the shuttle to form the loop, said needle being adapted to rotate and to reciprocate bodily, means for rotating the needle, means for reciprocating the needle, and means for maintaining the string in engagement with said needle; substantially as described.

65. In a machine for packaging paper bags, a knot tying device, said device comprising means for holding one end of the string, a shuttle about which the string is adapted to be passed to form a loop, a rotatable needle mounted upon a reciprocating slide and adapted to pass the string around the shuttle to form a loop, said needle being formed of two arms meeting at substantially a right angle and being provided with pivotally mounted string guide rolls, a cam controlled lever system for actuating said reciprocating slide, and mechanism for rotating said needle; substantially as described.

66. In a machine for packaging paper bags, a knot tying device, said device comprising means for holding one end of the string, a shuttle about which the string is adapted to be passed to form a loop, means for passing the string around the shuttle to form the loop, devices for releasing the string and permitting it to slip off the shuttle to form the knot, and mechanism adapted to engage the string and take up the slack between the knot and the means for holding the end of the string, whereby the knot is pulled up tight; substantially as described.

67. In a machine for packaging paper bags, a knot tying device, said device comprising means for holding one end of the string, a shuttle about which the string is adapted to be passed to form a loop, said shuttle being provided with an opening adapted to permit the passage of a string take-up finger, means for passing the string around the shuttle to form the loop, devices for releasing the string and permitting it to slip off the shuttle to form the loop, and a string take-up finger adapted to enter the shuttle through the opening therein and engage the string, whereby the slack between the knot and the means for holding the end of the string is taken up and the knot is pulled up tight; substantially as described.

68. In a machine for packaging paper bags, a knot tying device, said device comprising a revoluble twister having jaws adapted to receive and hold one end of the string, a shuttle about which the string is adapted to be passed to form a loop, said shuttle being provided with a spring pressed tension strip between which and the said twister the string is drawn taut to permit the knife to sever said string, means for passing the string around the shuttle to form a loop, means for releasing the string and permitting it to slip off the shuttle to form the knot, mechanism for releasing the string from the twister jaws, and a knife operating to cut the string and free the bundle of packages from the knotting devices; substantially as described.

69. In a machine for packaging paper bags, in combination with a vertically reciprocating platen, a device for delivering a completed bundle of packages, said device comprising a horizontally reciprocating slide having ends adapted to engage the bundle of packages when the platen is in a lowered position, and a cam controlled lever system for actuating said slide to cause the bundle to be pushed off the said platen after the completed bundle has been lowered; substantially as described.

70. In a machine for packaging paper bags, in combination with a vertically reciprocating platen supported only upon one side, a device for delivering a completed bundle of packages, said device comprising slide actuating mechanism, and a horizontally reciprocating slide adapted to engage the bundle of packages upon the side adjacent to the platen support and to force said bundle off said platen, thereby permitting the said platen to slip out from between the bags and the paper wrapper; substantially as described.

71. In a machine for packaging paper bags, in combination with a vertically reciprocating platen supported only upon one side, a device for delivering a completed bundle of packages, said device comprising slide actuating mechanism, and a horizontally reciprocating slide having downwardly extending ends which when the platen is in a lowered position are adapted to engage the bundle of packages upon the side adjacent to the platen support, said slide actuating mechanism comprising a cam actuated lever system and means for causing said lever system to be intermittently actuated; substantially as described.

72. In a machine for packaging paper bags, the combination with mechanism for feeding the bags to bag assembling devices, of bag assembling devices adapted to receive the bags and to form them into separate sets, switching mechanism for diverting the bags from one assembling device to another, means for delivering the separate sets of bags from the bag assembling devices, a turn-over adapted to receive the separate sets of bags fed thereto upon edge and to assemble them into a single pile so that one set overlaps the other set, mechanism for discharging the pile of bags from the turnover, independent drying boxes arranged in a plurality of columns which are simultaneously movable in opposite directions, whereby successive drying boxes of one of the columns are caused to come into alinement with the turnover and to receive the bags ejected from the latter and whereby successive drying boxes of another column are caused to come into alinement with the transfer case which receives the bags ejected from the drying boxes, means for ejecting the bags from the drying boxes, mechanism for transferring the drying boxes from each column to the other column, mechanism for feeding a band of paper and applying paste thereto, mechanism for cutting the band of paper so that it may be separated into suitable lengths to encircle a package of bags, mechanism controlled by the package to be encircled by the paper band whereby the said band is caused to be fed only at such intervals and in such lengths as is necessary to encircle the packages passing through the machine, a transfer case adapted to receive the package of bags ejected from a drying box and to deliver said package to the piling plunger, mechanism for delivering a package from the said case to a piling plunger, means for causing the paper band to encircle the package as the latter is forced into and through the case, a reciprocating piling plunger adapted to receive successive packages of bags as they are delivered from the case and to assemble them into piles each containing a predetermined number of individual packages, means for delivering the pile of packages from the piling plunger, devices for compressing the pile of packages and retaining such pile under pressure until the application of strings and a wrapper to the bundle is completed, mechanism for applying a wrapper to the pile of packages, mechanism for placing a string around the pile of packages preparatory to tying a knot, means for feeding a wrapper to the mechanism by which such wrapper is formed around a pile of packages, devices for applying paste to the wrapper, mechanism for applying a label to the wrapper, devices for cutting the wrapper into suitable lengths to encircle a pile of packages, mechanism for knotting the string placed around the pile of packages, devices for cutting the string to permit the completed bundle of packages to be delivered from the machine, and means for delivering a completed bundle of packages from the machine; substantially as described.

73. In a machine for packaging paper bags, a device for assembling a predetermined number of individual packages into a single pile, said device comprising a case adapted to receive a package of bags, means for delivering a package from the case to the piling plunger, a vertically reciprocating piling plunger adapted to receive a package of bags and to elevate said package, and means for maintaining the alinement of the pile of packages while they are being assembled by said piling plunger; substantially as described.

74. In a machine for packaging paper bags, a device for assembling a predetermined number of individual packages into a single pile, said device comprising mechanism for delivering successive packages of bags to a piling plunger, a piling plunger for receiving successive packages of bags and subsequently elevating them, means for retaining the packages in an elevated position so that the piling plunger may lower to receive another package of bags, and devices for maintaining the alinement of said packages during their assembly, said alinement devices comprising a follower-weight adapted to rest upon the topmost package of bags until the predetermined number of packages have been assembled into a pile, a latch adapted to elevate and support the follower-weight while the packages are being delivered from the piling plunger, means for actuating said latch to cause it to engage and elevate said follower-weight, and means for tripping said latch to release the follower-weight and permit it to assume a position in which it may rest upon the topmost package of the next succeeding pile of packages.

75. In a machine for packaging paper bags, a platen K permanently supported at one end only, means for assembling the bags to form a single bundle on said platen, mechanism for wrapping and securing a band or bands about the bags and platen, and bundle delivery mechanism for moving the banded bundle off the free end of the platen.

76. In a machine for packaging paper bags, mechanism for rapidly advancing the bags one after another, two sets of bag assembling devices for assembling the bags in bundles, means for feeding the bags advanced first to one set of the assembling devices and then to the other, mechanism for taking each pair of bunches of bags thus formed in the assembling devices and laying them together with the tops of the bags overlapping to form a package of bags, and means for placing and securing a band about each package.

77. In a machine for packaging paper bags, mechanism for rapidly advancing the bags one after another, two sets of bag assembling devices for assembling the bags into bunches, means for feeding the bags advanced first to one set of the assembling devices and then to the other, mechanism for taking each pair of bunches of bags thus formed in the assembling devices and laying them together with the tops of the bags overlapping to form a package of bags, mechanism for assembling a predetermined number of packages together to form a bundle, and mechanism for tying a string band or bands about the bundle.

CHAS. B. STILWELL.

Witnesses:
ARNOLD KATZ,
D. STEWART.

Copies of this patent may be obtained for five cents each, by addressing the "Commissioner of Patents, Washington, D. C."